(12) United States Patent
Nakazawa et al.

(10) Patent No.: US 6,731,413 B1
(45) Date of Patent: May 4, 2004

(54) INK JET RECORDING METHOD AND APPARATUS FOR MONOCHROMATIC MEDICAL IMAGE

(75) Inventors: Masayuki Nakazawa, Hino (JP); Chika Honda, Hino (JP)

(73) Assignee: Konica Corporation (JP)

( * ) Notice: Subject to any disclaimer, the term of this patent is extended or adjusted under 35 U.S.C. 154(b) by 815 days.

(21) Appl. No.: 09/621,765

(22) Filed: Jul. 21, 2000

(30) Foreign Application Priority Data

Jul. 23, 1999 (JP) .......................................... 11-208315

(51) Int. Cl.$^7$ ............................ H04N 1/46; G06K 15/02
(52) U.S. Cl. .................... 358/502; 358/1.3; 358/1.9; 358/3.1; 358/504; 358/509; 347/5; 347/15; 347/19; 382/131; 382/132; 382/274
(58) Field of Search ........................ 358/1.3, 1.9, 480, 358/502, 504, 509, 3.1; 347/3, 5, 16, 15; 382/131, 132, 274

(56) References Cited

U.S. PATENT DOCUMENTS

| | | | | |
|---|---|---|---|---|
| 5,549,996 A | * | 8/1996 | Bollen ........................ | 430/21 |
| 5,883,985 A | * | 3/1999 | Pourjavid ................... | 382/274 |
| 5,984,446 A | * | 11/1999 | Silverbrook ................ | 347/3 |
| 6,020,976 A | * | 2/2000 | Fujita et al. ................. | 358/1.3 |
| 6,421,079 B1 | * | 7/2002 | Truc et al. .................... | 348/96 |
| 6,438,271 B1 | * | 8/2002 | Usami et al. ............... | 382/274 |

* cited by examiner

*Primary Examiner*—Edward Coles
*Assistant Examiner*—Chan Park
(74) *Attorney, Agent, or Firm*—Cantor Colburn LLP

(57) ABSTRACT

In an ink-jet recording apparatus, when an intensity of the energy of electromagnetic waves of a predetermined region is E and an optical density of the image recorded on a recording medium based on an image signal is D, a controller conducts the image recording such that a characteristic curve representing a change of the optical density D for a logarithm of the energy intensity E becomes a monotone increasing function or a monotone decreasing function. When $\gamma_1$, $\gamma_2$ and $\gamma_3$ are defined on the characteristic curve such that an inclination of a line connecting points corresponding to $E_1$ and $E_2$ is $\gamma_1$, an inclination of a line connecting points corresponding to $E_3$ and $E_4$ is $\gamma_2$, and an inclination of a line connecting points corresponding to $E_5$ and $E_6$ is $\gamma_3$, the characteristic curve is determined so as to satisfy the following formulas: $|\gamma_1|<|\gamma_2|$ and $|\gamma_3|<|\gamma_2|$. The image recording for the energy intensity E between $E_1$ and $E_2$ is conducted based on $\gamma_1$, the image recording for the energy intensity E between $E_3$ and $E_4$ is conducted based on $\gamma_2$, and the image recording for the energy intensity E between $E_5$ and $E_6$ is conducted based on $\gamma_3$.

27 Claims, 51 Drawing Sheets

INK JET RECORDING METHOD AND APPARATUS FOR MONOCHROMATIC MEDICAL IMAGE

BACKGROUND OF THE INVENTION

The present invention relates to an ink jet recording method and an apparatus for that method, wherein image information is sensed by an image acquiring apparatus, and its energy is converted into image signals which are used for recording through ink-jetting.

There has so far been employed a method wherein electromagnetic waves (visible light, X-rays etc.) arriving from an object are sensed by silver halide light-sensitive materials which are then subjected to prescribed processing, and images are recorded on the silver halide light-sensitive material itself or on another silver halide light-sensitive material.

In recent years, the electromagnetic waves (visible light, X-rays etc.) arriving from an object are made temporarily to be image signals showing images by an image acquiring apparatus (for example, an electronic camera, or an apparatus which takes out radiographic image information as electric signals), and the image signals thus obtained are used to record images.

As a method to record images by using the obtained image signals, there is given a recording method to record images by using a recording medium represented by a silver halide light-sensitive material or an ink jet recording method to record by jetting ink.

As stated above, it has been conducted in recent years that energy of electromagnetic waves arriving from an object is acquired temporarily by an image acquiring apparatus as image signals showing images, and images are recorded by an ink jet recording apparatus based on the acquired image signals.

Compared with a silver halide light-sensitive material recording system, this ink jet recording system has an advantage that a recording means which is not restricted in terms of installation position and is extremely easy to operate can be provided because it has no steps for developing and fixing, and it requires neither facilities of water supply and water draining nor replenishment of developing solution to be free from an offensive odor.

On the other side, however, the ink jet system has been inferior to the silver halide light-sensitive material system on the point of image quality. A ground for the foregoing is that the characteristic curve for obtaining images with high image quality needs to be solved in the ink jet recording, in particular, although the characteristic curve for smooth image density change can easily be obtained.

Characteristics for recording in a conventional ink jet recording apparatus are shown in FIG. 49. The axis of abscissas represents image signal S to be inputted in an ink jet printer, while, the axis of ordinates represents optical density D recorded on a recording medium, and optical density D is reproduced in the linear relationship between image signal S and optical density D. On the other hand, in the example of a radiographic image acquiring apparatus employing stimulable phosphor which is an example of an acquiring apparatus, the relationship between a logarithmic value of energy of X-rays representing electromagnetic waves transmitted through an object and image signal S to be obtained proves to be one shown in FIG. 50. Therefore, the characteristics in the case of recording images by using both of them prove to be one shown in FIG. 51. It has been impossible, in the conventional ink jet recording, to obtain sufficient image quality in terms of image smoothness, graininess and sharpness.

It was further impossible to obtain image quality that is fit for diagnoses, when recording medical images, especially when recording monochromatic medical images, by using an ink jet recording apparatus.

The reason for the foregoing is as follows. Monochromatic medical images are usually recorded on a transparent or translucent medium, to be observed as a transmission image. In the case of a transmission image, it is difficult to realize high density because its optical density is observed to be low even when the same quantity of ink as on a reflection image is stuck on the transmission image, and moreover, image unevenness and graininess on the transmission image tend to be noticeable, compared with a reflection image. Since a hard copy of medical images is required to have delicate density gradation expression, graininess and density uniformity, even when the transmission image is more disadvantageous than the reflection image as stated above, it is extremely difficult to provide a hard copy that is fit for diagnoses.

SUMMARY OF THE INVENTION

The present invention has been achieved in view of the technical problems stated above, and its object is to provide a recording method and an apparatus for that recording method both for high image quality, in ink jet recording, and in particular, to provide an ink jet recording method and an apparatus for that recording method which can obtain monochromatic and medical image hard copies which are fit for diagnoses.

The problems mentioned above can be solved by the following structures indicated with number enclosed in parentheses.

(1-1) An ink-jet recording apparatus, comprises:
- an acquiring device to input an image signal obtained by converting energy of electromagnetic waves transmitting through a subject or energy of electromagnetic waves reflected from a subject for each predetermined region;
- an ink head to jet ink stored therein; and
- a controller to control the ink head so as to jet ink based on the image signal acquired by the acquiring device onto a recording medium on which an image is recorded,
- wherein when an intensity of the energy of electromagnetic waves of a predetermined region is E and an optical density of the image recorded on the recording medium based on the image signal is D, the controller conducts the image recording such that a characteristic curve representing a change of the optical density D for a logarithm of the energy intensity E becomes a monotone increasing function or a monotone decreasing function,
- wherein, energy intensities $E_1$ to $E_6$ are selected to be $E_1 < E_2 < E_3 < E_4 < E_5 < E_6$ and each energy intensity $E_i$ is defined to be an energy intensity corresponding to an optical density $D_i$ represented the following formula, $$D_i = k_i \cdot D_{max} + (1-k_i) \cdot D_{min},$$

where i is an integer of 1 to 6, when the characteristic curve is the monotone increasing function, $k_1=0.1$, $k_2=0.2$, $k_3=0.3$, $k_4=0.6$, $k_5=0.8$, and $k_6=0.9$, and when the characteristic curve is the monotone decreasing function, $k_1=0.9$, $k_2=0.8$, $k_3=0.6$, $k_4=0.3$, $k_5=0.2$, and $k_6=0.1$, wherein when $\gamma_1$, $\gamma_2$ and $\gamma_3$ are defined on the characteristic curve such that an inclination of a line connecting points corresponding to $E_1$ and $E_2$ is $\gamma_1$, an inclination of a line connecting points corresponding to $E_3$ and $E_4$ is $\gamma_2$, and an inclination of a line connecting points corresponding to $E_5$ and $E_6$ is $\gamma_3$, the characteristic curve is determined so as to satisfy the following formulas:

$|\gamma_1|<|\gamma_2|$ and $|\gamma_3|<|\gamma_2|$, and wherein the image recording for the energy intensity E between $E_1$ and $E_2$ is conducted based on $\gamma_1$, the image recording for the energy intensity E between $E_3$ and $E_4$ is conducted based on $\gamma_2$, and the image recording for the energy intensity E between $E_5$ and $E_6$ is conducted based on $\gamma_3$.

(1-2) In the ink-jet recording apparatus of (1-1), the controller conducts the image recording such that the characteristic curve representing the change of the optical density D for the logarithm of the energy intensity E becomes the simple increasing function.

(1-3) In the ink-jet recording apparatus of (1-1), the controller conducts the image recording such that the characteristic curve representing the change of the optical density D for the logarithm of the energy intensity E becomes the simple decreasing function.

(1-4) In the ink-jet recording apparatus of (1-1), the characteristic curve representing a change of the optical density D for a logarithm of the energy intensity E is the monotone decreasing function, the controller comprises a converter to convert an image signal S into an image signal S' and the converter makes a converting curve representing a change of the after-conversion image signal S' for the image signal S to be a monotone increasing function, wherein image signals $S_1$ to $S_6$ are selected to be $S_1<S_2<S_3<S_4<S_5<S_6$, and when $\alpha_1$, $\alpha_2$ and $\alpha_3$ are defined on the characteristic curve such that an inclination of a line connecting points corresponding to $S_1$ and $S_2$ is $\alpha_1$, an inclination of a line connecting points corresponding to $S_3$ and $S_4$ is $\alpha_2$, and an inclination of a line connecting points corresponding to $S_5$ and $S_6$ is $\alpha_3$, the characteristic curve is determined so as to satisfy the following formulas:

$|\alpha 1|<|\alpha_2|$ and $|\alpha_3|<|\alpha_2|$, and wherein the image conversion for the image signal S between $S_1$ and $S_2$ is conducted based on $\alpha_1$, the image conversion for the image signal S between $S_3$ and $S_4$ is conducted based on $\alpha_2$, and the image conversion for the image signal S between $S_5$ and $S_6$ is conducted based on $\alpha_3$.

(1-5) In the ink-jet recording apparatus of (1-1), the characteristic curve representing a change of the optical density D for a logarithm of the energy intensity E is the monotone decreasing function, the controller comprises a converter to convert an image signal S into an image signal S' and the converter makes a converting curve representing a change of the after-conversion image signal S' for the image signal S to be a monotone decreasing function, and wherein image signals $S_1$ to $S_6$ are selected to be $S_1<S_2<S_3<S_4<S_5<S_6$, and when $\alpha_1$, $\alpha_2$ and $\alpha_3$ are defined on the characteristic curve such that an inclination of a line connecting points corresponding to $S_1$ and $S_2$ is $\alpha_1$, an inclination of a line connecting points corresponding to $S_3$ and $S_4$ is $\alpha_2$, and an inclination of a line connecting points corresponding to $S_5$ and $S_6$ is $\alpha_3$, the characteristic curve is determined so as to satisfy the following formulas:

$|\alpha_1|<|\alpha_2|$ and $|\alpha_3|<|\alpha_2|$, and wherein the image conversion for the image signal S between $S_1$ and $S_2$ is conducted based on $\alpha_1$, the image conversion for the image signal S between $S_3$ and $S_4$ is conducted based on $\alpha_2$, and the image conversion for the image signal S between $S_5$ and $S_6$ is conducted based on $\alpha_3$.

(1-6) In the ink-jet recording apparatus of (1-2), the image recording is conducted with the number of density gradation steps of 16 or more in a range of $D_1 \leq D \leq D_2$.

(1-7) In the ink-jet recording apparatus of (1-2), the image recording is conducted with the number of density gradation steps of 32 or more in a range of $D_3 \leq D \leq D_4$.

(1-8) In the ink-jet recording apparatus of (1-1), the characteristic curve comprises a portion convex downward.

(1-9) In the ink-jet recording apparatus of (1-1), the characteristic curve comprises a portion convex upward.

(1-10) In the ink-jet recording apparatus of (1-1), the characteristic curve comprises a portion convex upward and another portion convex downward.

(1-11) In the ink-jet recording apparatus of (1-1), the characteristic curve comprises a point of inflection.

(1-12) In the ink-jet recording apparatus of (1-1), the electromagnetic waves are X-rays transmitting through the subject.

(1-13) In the ink-jet recording apparatus of (1-12), the image signals have a linear relationship with the intensity of the energy of X-rays.

(1-14) In the ink-jet recording apparatus of (1-12), the image signals have a linear relationship with the logarithm of the intensity of the energy of X-rays.

(1-15) In the ink-jet recording apparatus of (1-1), the range of $D_3<D<D_4$ is a range within which an image of the subject exists.

(1-16) In the ink-jet recording apparatus of (1-1), the range of $D_5<D<D_6$ is a range within which an image of the subject does not exist.

(1-17) In the ink-jet recording apparatus of (1-3), the image recording is conducted with the number of density gradation steps of 16 or more in a range of $D_1 \leq D \leq D_2$.

(1-18) In the ink-jet recording apparatus of (1-3), the image recording is conducted with the number of density gradation steps of 32 or more in a range of $D_3 \leq D \leq D_4$.

(1-19) In the ink-jet recording apparatus of (1-2), the characteristic curve representing a change of the optical density D for a logarithm of the energy intensity E is the monotone increasing function, and when the energy intensity E is within a range of $E_1<E<E_2$, the image recording is conducted with ink other than ink having a maximum density.

(1-20) In the ink-jet recording apparatus of (1-19), when the energy intensity E is within a range of $E_5<E<E_6$, the image recording is conducted by using ink having a maximum density with an amount of 50% or more of the total amount of ink used for the image recording.

(1-21) In the ink-jet recording apparatus of (1-19), when the energy intensity E is within a range of $E_1<E<E_2$, the image recording is conducted by using ink having a minimum density with an amount of 50% or more of the total amount of ink used for the image recording.

(1-22) In the ink-jet recording apparatus of (1-3), the characteristic curve representing a change of the optical density D for a logarithm of the energy intensity E is the monotone decreasing function, and when the energy intensity E is within a range of $E_5<E<E_6$, the image recording is conducted with ink other than ink having a maximum density.

(1-23) In the ink-jet recording apparatus of (1-22), when the energy intensity E is within a range of $E_1<E<E_2$, the image recording is conducted by using ink having a maximum density with an amount of 50% or more of the total amount of ink used for the image recording.

(1-24) In the ink-jet recording apparatus of (1-22), when the energy intensity E is within a range of $E_5<E<E_6$, the image recording is conducted by using ink having a minimum density with an amount of 50% or more of the total amount of ink used for the image recording.

(1-25) An ink-jet recording method, comprises:

forming an image by jetting ink onto a recording medium based on image signals obtained by converting by converting energy of electromagnetic waves transmitting through a subject or energy of electromagnetic waves reflected from a subject for each predetermined region;

wherein when an intensity of the energy of electromagnetic waves of a predetermined region is E and an optical density of the image recorded on the recording medium based on the image signal is D, the image recording is conducted such that a characteristic curve representing a change of the optical density D for a logarithm of the energy intensity E becomes a monotone increasing function or a monotone decreasing function, wherein, energy intensities $E_1$ to $E_6$ are selected to be $E_1<E_2<E_3<E_4<E_5<E_6$ and each energy intensity $E_i$ is defined to be an energy intensity corresponding to an optical density $D_i$ represented the following formula, $$D_i = k_i \cdot D_{max} + (1-k_i) \cdot D_{min},$$

where i is an integer of 1 to 6, when the characteristic curve is the monotone increasing function, $k_1=0.1$, $k_2=0.2$, $k_3=0.3$, $k_4=0.6$, $k_5=0.8$, and $k_6=0.9$, and when the characteristic curve is the monotone decreasing function, $k_1=0.9$, $k_2=0.8$, $k_3=0.6$, $k_4=0.3$, $k_5=0.2$, and $k_6=0.1$, wherein when $\gamma_1$, $\gamma_2$ and $\gamma_3$ are defined on the characteristic curve such that an inclination of a line connecting points corresponding to $E_1$ and $E_2$ is $\gamma_1$, an inclination of a line connecting points corresponding to $E_3$ and $E_4$ is $\gamma_2$, and an inclination of a line connecting points corresponding to $E_5$ and $E_6$ is $\gamma_3$, the characteristic curve is determined so as to satisfy the following formulas:

$$|\gamma_1|<|\gamma_2| \text{ and } |\gamma_3|<|\gamma_2|, \text{ and}$$

wherein the image recording for the energy intensity E between $E_1$ and $E_2$ is conducted based on $\gamma_1$, the image recording for the energy intensity E between $E_3$ and $E_4$ is conducted based on $\gamma_2$, and the image recording for the energy intensity E between $E_5$ and $E_6$ is conducted based on $\gamma_3$.

(1-26) In the ink-jet recording method of (1-25), the characteristic curve representing a change of the optical density D for a logarithm of the energy intensity E is the monotone increasing function, and when the energy intensity E is within a range of $E_1<E<E_2$, the image recording is conducted with ink other than ink having a maximum density.

(1-27) In the ink-jet recording method of (1-25), the characteristic curve representing a change of the optical density D for a logarithm of the energy intensity E is the monotone decreasing function, and when the energy intensity E is within a range of $E_5<E<E_6$, the image recording is conducted with ink other than ink having a maximum density.

Further, the problems mentioned above may be solved by the following preferable structures.

(Structure 1) An ink jet recording method to form an image on a recording medium by jetting ink based on image signals obtained by converting energy of electromagnetic waves transmitted through an object and/or electromagnetic waves reflected on an object for each prescribed area, wherein recording is conducted so that a characteristic curve representing a change of optical density D of an image for a logarithmic value of the energy intensity E may be a monotone increasing function when assuming that energy intensity of electromagnetic waves in a given prescribed area is represented by E, and optical density of an image formed on a recording medium based on the energy intensity E is represented by D, while, recording is conducted with $\gamma_1$ when the energy intensity E is in a range of $E_1<E<E_2$, recording is conducted with $\gamma_2$ when the energy intensity E is in a range of $E_3<E<E_4$ and recording is conducted with $\gamma_3$ when the energy intensity E is in a range of $E_5<E<E_6$.

However, $E_1<E_2<E_3<E_4<E_5<E_6$ holds, and each energy intensity Ei is energy intensity corresponding to optical density Di of the following each image. (i is an integer representing each of 1–6)

$$Di = kiD\text{max} + (1-ki)D\text{min}$$

($k_1=0.1$, $k_2=0.2$, $k_3=0.3$, $k_4=0.6$, $k_5=0.8$, $k_6=0.9$)

An inclination of a straight line connecting two points on the characteristic curve at $E_1$ and $E_2$ is represented by $\gamma_1$, an inclination of a straight line connecting two points on the characteristic curve at $E_3$ and $E_4$ is represented by $\gamma_2$ and an inclination of a straight line connecting two points on the characteristic curve at $E_5$ and $E_6$ is represented by $\gamma_3$, and $|\gamma_1|<|\gamma_2|$ and $|\gamma_3|<|\gamma_2|$ hold.

(Structure 2) An ink jet recording method to form an image on a recording medium by jetting ink based on image signals obtained by converting energy of electromagnetic waves transmitted through an object and/or electromagnetic waves reflected on an object for each prescribed area, wherein recording is conducted so that a characteristic curve representing a change of optical density D of an image for a logarithmic value of the energy intensity E may be a monotone decreasing function when assuming that energy intensity of electromagnetic waves in a given prescribed area is represented by E, and optical density of an image formed on a recording medium based on the energy intensity E is represented by D, while, recording is conducted with $\gamma_1$, when the energy intensity E is in a range of $E_1<E<E_2$, recording is conducted with $\gamma_2$ when the energy intensity E is in a range of $E_3<E<E_4$ and recording is conducted with $\gamma_3$ when the energy intensity E is in a range of $E_5<E<E_6$.

However, $E_1<E_2<E_3<E_4<E_5<E_6$ holds, and each energy intensity Ei is energy intensity corresponding to optical density Di of the following each image. (i is an integer representing each of 1–6)

$$Di = kiD\text{max} + (1-ki)D\text{min}$$

($k_1=0.9$, $k_2=0.8$, $k_3=0.6$, $k_4=0.3$, $k_5=0.2$, $k_6=0.1$)

An inclination of a straight line connecting two points on the characteristic curve at $E_1$ and $E_2$ is represented by $\gamma_1$, an inclination of a straight line connecting two points on the characteristic curve at $E_3$ and $E_4$ is represented by $\gamma_2$ and an inclination of a straight line connecting two points on the characteristic curve at $E_5$ and $E_6$ is represented by $\gamma_3$, and $|\gamma_1|<|\gamma_2|$ and $|\gamma_3|<|\gamma_2|$ hold following structures.

(Structure 3) The ink jet recording method according to either one of the Structures 1 and 2, wherein the characteristic curve is one having therein a portion convex downward.

(Structure 4) The ink jet recording method according to either one of the Structures 1 and 2, wherein the characteristic curve is one having therein a portion convex upward.

(Structure 5) The ink jet recording method according to either one of the Structures 1–4, wherein the characteristic curve is one having therein a portion convex downward and a portion convex upward.

(Structure 6) The ink jet recording method according to either one of the Structures 1–5, wherein the characteristic curve has a point of inflection.

(Structure 7) The ink jet recording method according to either one of the Structures 1–6, wherein the electromagnetic waves are X-rays obtained through transmission through an object.

(Structure 8) The ink jet recording method according to Structures 7, wherein the image signals have linear relationship with the X-ray energy intensity.

(Structure 9) The ink jet recording method according to Structures 7, wherein the image signals have linear relationship with a logarithmic value of the X-ray energy intensity.

(Structure 10) The ink jet recording method according to either one of the Structures 7–9, wherein the range of $D_3<D<D_4$ is a range of an object image.

(Structure 11) The ink jet recording method according to either one of the Structures 7–9, wherein the range of $D_5<D<D_6$ is a range where no object image is present.

(Structure 12) The ink jet recording method according to either one of the Structures 1–11, wherein the recording medium is transparent or translucent.

(Structure 13) The ink jet recording method according to either one of the Structures 1–12, wherein the recording medium is one of a void type.

(Structure 14) The ink jet recording method according to either one of the Structures 7–9, wherein image recording is changed based on information showing whether the image signal is in linear relationship with an X-ray quantity or is in linear relationship with a logarithmic value of an X-ray quantity.

(Structure 2-15) The ink jet recording method according to either one of the Structures 1–14, wherein the image signal obtained is subjected to different image processing in accordance with a difference of recording characteristics of an ink jet recording apparatus.

(Structure 16) The ink jet recording method according to either one of the Structures 1–15, wherein recording is conducted with recording density gradation number of 16 or more in a range of $D_1 \leq D \leq D_2$.

(Structure 17) The ink jet recording method according to either one of the Structures 1–16, wherein recording is conducted with recording density gradation number of 32 or more in a range of $D_3<D<D_4$.

(Structure 18) An ink jet recording apparatus to form an image on a recording medium by jetting ink based on image signals obtained by converting energy of electromagnetic waves transmitted through an object and/or electromagnetic waves reflected on an object for each prescribed area, wherein recording is conducted so that a characteristic curve representing a change of optical density D of an image for a logarithmic value of the energy intensity E may be a monotone increasing function when assuming that energy intensity of electromagnetic waves in a given prescribed area is represented by E, and optical density of an image formed on a recording medium based on the energy intensity E is represented by D, while, recording is conducted with $\gamma_1$ when the energy intensity E is in a range of $E_1<E<E_2$, recording is conducted with $\gamma_2$ when the energy intensity E is in a range of $E_3<E<E_4$ and recording is conducted with $\gamma_3$ when the energy intensity E is in a range of $E_5<E<E_6$.

However, $E_1<E_2<E_3<E_4<E_5<E_6$ holds, and each energy intensity $E_i$ is energy intensity corresponding to optical density Di of the following each image. (i is an integer representing each of 1–6)

$$Di=kiD\max+(1-ki)D\min$$

($k_1=0.1$, $k_2=0.2$, $k_3=0.3$, $k_4=0.6$, $k_5=0.8$, $k_6=0.9$)

An inclination of a straight line connecting two points on the characteristic curve at $E_1$ and $E_2$ is represented by $\gamma_1$, an inclination of a straight line connecting two points on the characteristic curve at $E_3$ and $E_4$ is represented by $\gamma_2$ and an inclination of a straight line connecting two points on the characteristic curve at $E_5$ and $E_6$ is represented by $\gamma_3$, and $|\gamma_1|<|\gamma_2|$ and $|\gamma_3|<|\gamma_2|$ hold.

(Structure 19) The ink jet recording apparatus according to Structure 18, wherein a conversion means which converts the image signal S into image signal S' is provided, and the conversion means makes a conversion curve showing a change of the image signal S' after conversion from the image signal S to be a monotone increasing function, and an inclination of the conversion curve is made by the conversion means to be a1 when the image signal S is in a range of $S_1<S<S_2$, an inclination of the conversion curve is made by the conversion means to be $\alpha_2$ when the image signal S is in a range of $S_3<S<S_4$, and an inclination of the conversion curve is made by the conversion means to be $\alpha_3$ when the image signal S is in a range of $S_5<S<S_6$.

However, $S_1<S_2<S_3<S_4<S_5<S_6$ holds, and an inclination of a straight line connecting two points at $S_1$ and $S_2$ on the conversion curve is represented by $\alpha_1$, an inclination of a straight line connecting two points at $S_3$ and $S_4$ on the conversion curve is represented by $\alpha_2$, and an inclination of a straight line connecting two points at $S_5$ and $S_6$ on the conversion curve is represented by $\alpha_3$, and $|\alpha_1|<|\alpha_2|$ and $|\alpha_3|<|\alpha_2|$ hold.

(Structure 20) An ink jet recording apparatus to form an image on a recording medium by jetting ink based on image signals obtained by converting energy of electromagnetic waves transmitted through an object and/or electromagnetic waves reflected on an object for each prescribed area, wherein recording is conducted so that a characteristic curve representing a change of optical density D of an image for a logarithmic value of the energy intensity E may be a monotone decreasing function when assuming that energy intensity of electromagnetic waves in a given prescribed area is represented by E, and optical density of an image formed on a recording medium based on the energy intensity E is represented by D, while, recording is conducted with $\gamma_1$ when the energy intensity E is in a range of $E_1<E<E_2$, recording is conducted with $\gamma_2$ when the energy intensity E is in a range of $E_3<E<E_4$ and recording is conducted with $\gamma_3$ when the energy intensity E is in a range of $E_5<E<E_6$.

However, $E_1<E_2<E_3<E_4<E_5<E_6$ holds, and each energy intensity Ei is energy intensity corresponding to optical density Di of the following each image. (i is an integer representing each of 1–6)

$$Di=kiD\max+(1-ki)D\min$$

($k_1=0.9$, $k_2=0.8$, $k_3=0.6$, $k_4=0.3$, $k_5=0.2$, $k_6=0.1$)

An inclination of a straight line connecting two points on the characteristic curve at $E_1$ and $E_2$ is represented by $\alpha_1$, an inclination of a straight line connecting two points on the characteristic curve at $E_3$ and $E_4$ is represented by $\gamma_2$ and an inclination of a straight line connecting two points on the characteristic curve at $E_5$ and $E_6$ is represented by $\gamma_3$, and $|\gamma_1|<|\gamma_2|$ and $|\gamma_3|<|\gamma_2|$ hold.

(Structure 21) The ink jet recording apparatus according to Structure 21, wherein a conversion means which converts the image signal S into image signal S' is provided, and the conversion means makes a conversion curve showing a change of the image signal S' after conversion from the image signal S to be a monotone decreasing function, and an inclination of the conversion curve is made by the conversion means to be $\alpha_1$ when the image signal S is in a range of $S_1<S<S_2$, an inclination of the conversion curve is made by the conversion means to be $\alpha_2$ when the image signal S is in a range of $S_3<S<S_4$, and an inclination of the conversion curve is made by the conversion means to be $\alpha_3$ when the image signal S is in a range of $S_5<S<S_6$.

However, $S_1<S_2<S_3<S_4<S_5<S_6$ holds, and an inclination of a straight line connecting two points at $S_1$ and $S_2$ on the conversion curve is represented by $\alpha_1$, an inclination of a straight line connecting two points at $S_3$ and $S_4$ on the conversion curve is represented by $\alpha_2$, and an inclination of a straight line connecting two points at $S_5$ and $S_6$ on the conversion curve is represented by $\alpha_3$, and $|\alpha_1|<|\alpha_2|$ and $|\alpha_3|<|\alpha_2|$ hold.

(Structure 22) The ink jet recording apparatus according to either one of the Structures 18–21, wherein recording is conducted with recording density gradation number of 16 or more in a range of $D_1 \leq D \leq D_2$.

(Structure 23) The ink jet recording apparatus according to either one of the Structures 18–22, wherein recording is conducted with recording density gradation number of 32 or more in a range of $D_3 \leq D \leq D_4$.

(Structure 24) An ink jet recording method to form an image on a recording medium by jetting ink based on image signals obtained by converting energy of electromagnetic waves transmitted through an object and/or electromagnetic waves reflected on an object for each prescribed area, wherein aforesaid ink represents plural ink groups each having different optical density, and recording is conducted so that a characteristic curve representing a change of optical density D of an image for a logarithmic value of the energy intensity E may be a monotone increasing function when assuming that energy intensity of electromagnetic waves in a given prescribed area is represented by E, and optical density of an image formed on a recording medium based on the energy intensity E is represented by D, while, recording is conducted with $\gamma_1$ by the use of ink other than the highest density ink when the energy intensity E is in a range of $E_1<E<E_2$, recording is conducted with $\gamma_2$ when the energy intensity E is in a range of $E_3<E<E_4$ and recording is conducted with $\gamma_3$ when the energy intensity E is in a range of $E_5<E<E_6$.

However, $E_1<E_2<E_3<E_4<E_5<E_6$ holds, and each energy intensity Ei is energy intensity corresponding to optical density Di of the following each image. (i is an integer representing each of 1–6)

$$Di = kiD\max + (1-ki)D\min$$

($k_1=0.1$, $k_2=0.2$, $k_3=0.3$, $k_4=0.6$, $k_5=0.8$, $k_6=0.9$)

An inclination of a straight line connecting two points on the characteristic curve at $E_1$ and $E_2$ is represented by an inclination of a straight line connecting two points on the characteristic curve at $E_3$ and $E_4$ is represented by $\gamma_2$ and an inclination of a straight line connecting two points on the characteristic curve at $E_5$ and $E_6$ is represented by $\gamma_3$, and $|\gamma_1|<|\gamma_2|$ and $|\gamma_3|<|\gamma_2|$ hold.

(Structure 25) The ink jet recording method according to Structure 24, wherein recording is conducted by using the highest density ink in quantity of 50% or more of the total quantity of ink used when the energy intensity E is in a range of $E_5<E<E_6$.

(Structure 26) The ink jet recording method according to Structure 25, wherein recording is conducted by using the lowest density ink in quantity of 50% or more of the total quantity of ink used when the energy intensity E is in a range of $E_1<E<E_2$.

(Structure 27) An ink jet recording method to form an image on a recording medium by jetting ink based on image signals obtained by converting energy of electromagnetic waves transmitted through an object and/or electromagnetic waves reflected on an object for each prescribed area, wherein aforesaid ink represents plural ink groups each having different optical density, and recording is conducted so that a characteristic curve representing a change of optical density D of an image for a logarithmic value of the energy intensity E may be a monotone decreasing function when assuming that energy intensity of electromagnetic waves in a given prescribed area is represented by E, and optical density of an image formed on a recording medium based on the energy intensity E is represented by D, while, recording is conducted with $\gamma_1$ when the energy intensity E is in a range of $E_1<E<E_2$, recording is conducted with $\gamma_2$ when the energy intensity E is in a range of $E_3<E<E_4$ and recording is conducted with $\gamma_3$ and by using the highest density ink when the energy intensity E is in a range of $E_5<E<E_6$.

However, $E_1<E_2<E_3<E_4<E_5<E_6$ holds, and each energy intensity Ei is energy intensity corresponding to optical density Di of the following each image. (i is an integer representing each of 1–6)

$$Di = kiD\max + (1-ki)D\min$$

($k_1=0.9$, $k_2=0.8$, $k_3=0.6$, $k_4=0.3$, $k_5=0.2$, $k_6=0.1$)

An inclination of a straight line connecting two points on the characteristic curve at $E_1$ and $E_2$ is represented by $\gamma_1$, an inclination of a straight line connecting two points on the characteristic curve at $E_3$ and $E_4$ is represented by $\gamma_2$ and an inclination of a straight line connecting two points on the characteristic curve at $E_5$ and $E_6$ is represented by $\gamma_3$, and $|\gamma_1|<|\gamma_2|$ and $|\gamma_3|<|\gamma_2|$ hold.

(Structure 28) The ink jet recording method according to Structure 27, wherein recording is conducted by using the highest density ink in quantity of 50% or more of the total quantity of ink used when the energy intensity E is in a range of $E_1<E<E_2$.

(Structure 29) The ink jet recording method according to Structure 28, wherein recording is conducted by using the lowest density ink in quantity of 50% or more of the total quantity of ink used when the energy intensity E is in a range of $E_5<E<E_6$.

(Structure 30) The ink jet recording method according to either one of Structures 24–29, wherein aforesaid ink represents black ink having different optical density.

(Structure 31) The ink jet recording method according to either one of Structures 24–30, wherein optical density of aforesaid ink satisfies the following relational expression;

$$d_n - d_{n-1} > d_{n-1} > d_{n-2} \geq \ldots \geq d_2 - d_1 \text{ ($n$ represents integers of 4 and over)}$$

wherein, $d_n$ is optical density of each ink under the condition of $d_n < d_{n+1}$.

(Structure 32) The ink jet recording method according to Structure 31, wherein optical density of aforesaid ink satisfies the following relational expression.

$$d_n-d_{n-1}>d_{n-1}>d_{n-2}\geq \ldots \geq d_2-d_1\geq d_1 \text{ (}n\text{ represents integers of 4 and over)}$$

(Structure 33) The ink jet recording method according to either one of Structures 24–32, wherein aforesaid ink represents four types of ink each having different optical density, and $d_4-d_3>d_3-d_2\geq d_2d_1\geq d_1$ is satisfied when each optical density of ink represents each of $d_1$, $d_2$, $d_3$ and $d_4$ ($d_1<d_2<d_3<d_4$).

(Structure 34) The ink jet recording method according to either one of Structures 24–30, wherein aforesaid ink represents three types of ink each having different optical density, and $d_3-d_2>d_2-d_1\geq d_1$ is satisfied when each optical density of ink represents each of $d_1$, $d_2$ and $d_3$ ($d_1<d_2<d_3$).

(Structure 35) The ink jet recording method according to either one of Structures 24–34, wherein optical density of aforesaid ink satisfies the following relational expression;

$$d_n=d_{n-1}\cdot r(r<1)$$

wherein, $d_n$ is optical density of each ink under the condition of $d_n<d_{n+1}$.

(Structure 36) The ink jet recording method according to Structures 35, wherein the expression of r=½ holds.

(Structure 37) The ink jet recording method according to either one of the Structures 24–36, wherein recording is conducted with recording density gradation number of 16 or more in a range of $D_1\leq D\leq D_2$.

(Structure 38) The ink jet recording method according to either one of the Structures 24–36, wherein recording is conducted with recording density gradation number of 32 or more in a range of $D_3\leq D\leq D_4$.

(Structure 39) An ink jet recording method to record on a recording medium by jetting ink, wherein four or more types of ink each having different optical density are used to express recording density gradation number N ranging from 256 to 16384.

(Structure 39') The ink jet recording method according to Structures 39, wherein N is 1024 or more.

(Structure 39") The ink jet recording method according to Structures 39', wherein N is 4096 or more.

(Structure 40) An ink jet recording apparatus to record on a recording medium by jetting ink, wherein n-types of ink each having different optical density are used, and when N represents the recording density gradation number, N is equal to and greater than 81, and n is in a range from fourth power root of N to (fourth power root of N)×3. (provided, however, that N is 81 or more)

(Structure 41) An ink jet recording method to record on a recording medium by jetting ink, wherein n-types of ink each having different optical density are used, and when N represents the recording density gradation number, N is equal to and greater than 81, and minimum recording density a is in a range from ((square root of N)/n)×80 dpi to ((square root of N)/n)×640 dpi.

(Structure 42) The ink jet recording method according to either one of Structures 39–40, wherein when n represents the number of types of optical density of ink used and N represents the recording density gradation number to be expressed, minimum recording density a is in a range from ((square root of N)/n)×80 dpi to ((square root of N)/n)×640 dpi.

(Structure 43) The ink jet recording method according to either one of Structures 39–42, wherein optical density of aforesaid ink satisfies the following relational expression;

$$d_n-d_{n-1}>d_{n-1}>d_{n-2}\geq \ldots \geq d_2-d_1 \text{ (}n\text{ represents integers of 4 and over)}$$

wherein, $d_n$ is optical density of each ink under the condition of $d_n<d_{n+1}$.

(Structure 44) The ink jet recording method according to Structure 43, wherein optical density of aforesaid ink satisfies the following relational expression.

$$d_n-d_{n-1}>d_{n-1}>d_{n-2}\geq \ldots \geq d_2-d_1 \text{ (}n\text{ represents integers of 4 and over)}$$

(Structure 45) The ink jet recording method according to either one of Structures 39–44, wherein aforesaid ink represents four types of ink each having different optical density, and $d_4-d_3>d_3-d_2\geq d_2d_1\geq d_1$ is satisfied when each optical density of ink represents each of $d_1$, $d_2$, $d_3$ and $d_4$ ($d_1<d_2<d_3<d_4$).

(Structure 46) The ink jet recording method according to either one of Structures 40–42, wherein aforesaid ink represents three types of ink each having different optical density of ink, and $d_3-d_2>d_2-d_1\geq d_1$ is satisfied when each optical density of ink represents each of $d_1$, $d_2$ and $d_3$ ($d_1<d_2<d_3$).

(Structure 47) The ink jet recording method according to either one of Structures 39–46, wherein optical density of aforesaid ink satisfies the following relational expression;

$$d_n=d_{n-1}\cdot r(r<1)$$

wherein, $d_n$ is optical density of each ink under the condition of $d_n<d_{n+1}$.

(Structure 48) The ink jet recording method according to Structures 47, wherein the expression of r=½ holds.

(Structure 49) An ink jet recording method to record on a recording medium by jetting ink, wherein when N represents the recording density gradation number to be expressed, N is equal to and greater than 81, and minimum recording density a is not less than (fourth power root of N)×80 dpi.

(Structure 50) The ink jet recording method according to either one of Structures 40–42, wherein N is in a range from 256 to 16384.

(Structure 50') The ink jet recording method according to Structures 50, wherein N is in a range from 1024 to 16384.

(Structure 50") The ink jet recording method according to Structures 50', wherein N is in a range from 4096 to 16384.

(Structure 51) The ink jet recording method according to either one of Structures 39–50, wherein a monochromatic image is recorded on the recording medium stated above.

(Structure 52) The ink jet recording method according to Structure 40, wherein aforesaid n is in a range from cubic root of N to (fourth power root of N)×3.

(Structure 53) The ink jet recording method according to either one of Structures 39–52, wherein the number of density gradation is square root of N/2 or more per minimum recording unit.

(Structure 54) The ink jet recording method according to either one of Structures 39–53, wherein the number of density gradation per minimum recording unit is L ($L\leq N/2$), and the recording density gradation number mentioned above is expressed through an error diffusion method.

(Structure 55) The ink jet recording method according to either one of Structures 39–54, wherein the number of density gradation per minimum recording unit is L ($L\leq N/2$), and a super pixel containing plural sub-pixels each representing the minimum recording unit is defined, and the aforesaid recording density gradation number is expressed for each super pixel.

(Structure 56) The ink jet recording method according to either one of Structures 39–55, wherein M density gradation (M≦N/2) is expressed by super pixel unit, and an error diffusion method is further used to express the density gradation number.

(Structure 57) The ink jet recording method according to Structures 55 and 56, wherein the super pixel is composed of six or more sub-pixels.

(Structure 58) The ink jet recording method according to either one of Structures 55–57, wherein the super pixel is composed of nine or more sub-pixels.

(Structure 59) The ink jet recording method according to either one of Structures 55–58, wherein one side of the super pixel is 110 μm or less in length.

(Structure 60) An ink jet recording method to record images by jetting ink based on image signals, wherein plural types of ink each having different optical density are used as the aforesaid ink, and in a density gradation curve showing the relationship between a density gradation level reproducible with the minimum recording unit and optical density D of an image formed in accordance with each density gradation level, the expression $\beta_1 \leq \beta_2$ holds when $\beta_1$ represents an inclination of a straight line connecting two points on the density gradation curve corresponding respectively to density gradation levels $N_1$ and $N_2$ and $\beta_2$ represents an inclination of a straight line connecting two points on the density gradation curve corresponding respectively to density gradation levels $N_3$ and $N_4$.

In the foregoing, $N_1<N_2<N_3<N_4$ is an assumption for the density gradation level.

(Structure 61) The ink jet recording method according to Structure 60, wherein optical density of the ink satisfies the following relational expression;

$$d_n-d_{n-1}>d_{n-1}>d_{n-2}\geq \ldots \geq d_2-d_1 \text{ (}n\text{ represents integers of 4 and over)}$$

wherein, $d_n$ is optical density of each ink under the condition of $d_n<d_{n+1}$.

(Structure 62) The ink jet recording method according to either one of Structures 60 and 61, wherein optical density of the ink satisfies the following relational expression.

$$d_n-d_{n-1}>d_{n-1}>d_{n-2}\geq \ldots \geq d_2-d_1 \geq d_1 \text{ (}n\text{ represents integers of 4 and over)}$$

(Structure 63) The ink jet recording method according to either one of Structures 60–62, wherein the aforesaid ink includes four types of ink each having different optical density, and the expression of $d_4-d_3>d_3-d_2\geq d_2-d_1 d_1 \geq d_1$ holds when each optical density of the ink is represented by each of $d_1$, $d_2$, $d_3$, $d_4$ ($d_1<d_2<d3<d_4$).

(Structure 64) The ink jet recording method according to Structure 60, wherein the expression of $d_3-d_2 \geq d_2-d_1 \geq d_1$ holds when each optical density of the ink is represented by each of $d_1$, $d_2$, and $d_3$ ($d_1<d_2<d3$).

(Structure 65) The ink jet recording method according to either one of Structures 60–64, wherein optical density of the ink satisfies the following relational expression;

$$d_n=d_{n-1}\cdot r(r<1)$$

wherein di represents optical density of each ink, and it is assumed to be $d_n<d_{n+1}$.

(Structure 66) The ink jet recording method according to Structure 65, wherein the expression of r=½ holds.

DETAILED DESCRIPTION OF THE PREFERRED EMBODIMENT

Figure 1:
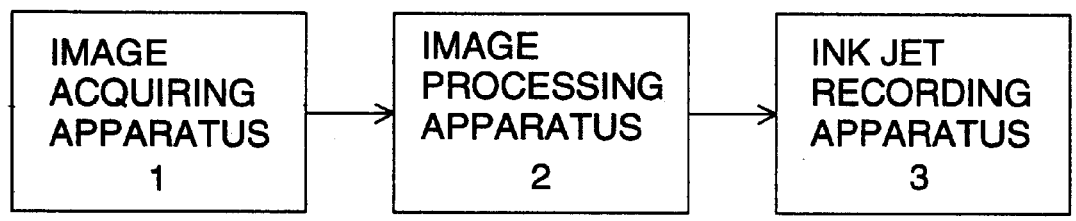
FIG. 1 is a diagram illustrating an outline of a recording apparatus related to the invention.

In the invention, an image acquiring apparatus (for example, an electronic camera, or an apparatus to take out radiograph image information as electric signals) is used to obtain energy of electromagnetic waves transmitted through an object and/or energy of electromagnetic waves reflected on an object, as an image signal which expresses an image temporarily.

In this case, in the electronic camera or in the apparatus to take out radiograph image information as electric signals, the upper limit and the lower limit of an energy value which transforms energy of incident electromagnetic waves into an electric signal are determined by a specific character of the apparatus. Namely, electromagnetic waves taken out as electric signals are only those having energy values within a certain range. Thus, electric signals having an intensity which generally corresponds to energy of incident electromagnetic waves linearly (linear relationship) are taken out as image information.

An object in the invention means all objects photographed by a conventional camera such as human figures for a portrait, scenes and various records. There are further included simple photographs for medical use, X-ray CTs, MRI images, retinal photographs and those obtained through an electronic endoscope. Further, an image of an object is not limited to a two-dimensional image but it may also be a three-dimensional image.

Further, the electromagnetic wave means a wave which represents a phenomenon wherein an oscillation of an electromagnetic field is transmitted through a vacuum or through materials. Electromagnetic waves represent, depending on their oscillation frequency, X-rays, visible light and infrared rays. The electromagnetic wave in the invention is not limited to any particular one, and it includes visible light, electromagnetic waves in the vicinity of the visible light, and X-rays. Visible light represents electromagnetic waves which correspond to visibility of human eyes in a wavelength region of about 400 nm–700 nm. X-rays, on the other hand, are those whose wavelength is about 1 Å among electromagnetic waves, and they have capability to be transmitted through objects such as human bodies and structures.

These electromagnetic waves reach the acquiring apparatus in the later stage either after being transmitted through an object, or after being reflected on an object, or after being transmitted and reflected.

An acquiring apparatus which senses electromagnetic waves and transforms them into electric signals in the invention represents the so-called digital camera having therein CCD and a CMOS sensor in the case of photographing portrait images and scenes, and it represents an imaging plate employing an stimulable phosphor and its reading apparatus, a flat panel X-ray detector wherein TFT switching is combined with X-ray phosphor or with X-ray photoconductive substances, and an X-ray image detecting apparatus wherein X-ray phosphor is combined with CCD or with a CMOS sensor, all in the case of X-ray images. In these camera and apparatus, it is characterized that image information is digitized.

These acquiring apparatuses transform energy of electromagnetic waves they receive for each prescribed region, and thereby obtain electric signals.

The prescribed region means each region which is split when reading image information by splitting two-dimensional plane through which energy of electromagnetic waves are inputted. For example, the prescribed region is each pixel representing the minimum region in the case of converting energy (light in this case) of electromagnetic waves into electric signals, in the case of CCD and a CMOS sensor, the prescribed region is a reading region formed by combination of X-ray photoconductive substance and TFT switching in the case of a flat panel X-ray detector, and it is a reading region for reading stimulated emission by the use of a laser in the case of an imaging plate employing a stimulable phosphor and its reading apparatus. Incidentally, this prescribed region does not always need to be fixed, and in the case of reading using a laser, in particular, it is also possible to arrange so that a size of the region may be changed properly.

It is preferable that image information obtained here is subjected to logarithmic conversion, because the image information is in the linear relationship with sensed energy. In the case of a simple radiography, for example, it is possible to conduct image processing which gives most appropriate density gradation to printed images, for the radiographing region such as a breast region and an abdominal region, and it is possible to conduct the so-called frequency processing to make an edge-emphasized image.

Next, images are recorded by the use of image signals obtained. In this case, intensity of electric signals is adjusted voluntarily (image processing) for recording excellent images to be recorded, so that it is possible to be more fitted for an object to use recorded images, and for capacity and efficiency of an image recording apparatus (for example, a range of recordable image density, types of usable ink optical density, and the number of droplets jetted per pixel).

In this case, for the purpose of obtaining ink jet recorded images with high image quality, it is important to determine the type of a characteristic curve owned by an image to be recorded, the characteristic curve being suitable for energy of electromagnetic waves entering from an object.

The characteristic curve in the invention means a curve that indicates which optical density D should be used for recording when recording images for the logarithmic value of energy intensity E of electromagnetic waves. Namely, the characteristic curve means a form of function F showing the following relationship between optical density D and logarithmic value log E of energy intensity E of electromagnetic waves;

$$D=F(\log E) \quad (1)$$

and the invention is characterized by the function form of F (log E) shown with the expression (1) above.

Incidentally, logarithm log used in the invention is a common logarithm, and the expression described simply as "log" hereafter means a common logarithm. Further, optical density D mentioned here is a value showing a quantity of light transmitted through an object, and it is defined by Optical density $D=\log(I_0/I)$ When $I_0$ represents intensity of incident light and I represents intensity of light transmitted through an object.

In the case of a reflection image, the definition is the same if I represents intensity of reflected light. In the actual measurement, images are recorded uniformly in a prescribed area, and the optical density is defined as mean density in an area which can be measured by a densitometer available on the market.

Dmax is maximum density, and it is the maximum optical density of an image which can be recorded on a recording medium by jetting ink from an ink jet recording apparatus, while, Dmin is minimum density, and it is density of a recording medium itself, or the minimum density which can be recorded by jetting ink from an ink jet recording apparatus, whichever is smaller.

It is common that density of a recording medium itself is lower than the minimum density which can be recorded by jetting ink from an ink jet recording apparatus. However, when the surface of a recording medium having high turbidity is smoothed by jetting transparent ink, for example, the minimum density which can be recorded by jetting ink from an ink jet recording apparatus is sometimes smaller than density of a recording medium itself.

On the other hand, with regard to how human eyes discriminate density when image density varies, there are given the following results of scientific measurement in "Frequency Dependence of Minimum Perceptible Contrasts of Radiographs and MTF of the Eye" by Y. Ozaki (The Journal of Photographic Science, Vol. 41, pp. 96–97, 1993), for example. Namely, when the image density is lower, in other words, when the image is brighter, a difference of image density which can be discriminated by human eyes is smaller. In other words, it is possible to discriminate in the region where image density is low, even when image contrast is low.

In accordance with a conception of this kind, it is possible to keep the contrast low in the region where image density to be described is low, and by broadening a range of entering energy to be depicted by keeping the contrast low, it is possible to describe much image information. In the high density portion, if density is too high, a range of detection by human eyes is exceeded. It is therefore preferable to increase a quantity of image information by broadening a range of entering energy to be depicted by describing with the mildest possible contrast.

It is common that an image on a region which is watched with deepest concern by an image observer is formed on the intermediate density section, namely, in the vicinity of optical density 1.0. In this region, therefore, it is preferable to enhance describing power by raising the contrast.

In the invention, therefore, a hard copy with high describing power covering from a low density section to a high density section is obtained by making absolute values of inclinations of the low density portion and of the high density portion in a characteristic curve to be small, and by raising the absolute value of the inclination on the intermediate density portion.

Further, black ink means ink wherein a ratio of the maximum value to the minimum value (the maximum value/the minimum value) for transmission density at each of the wavelengths of 450 nm, 550 nm and 630 nm is not more than 2, and it does not always need to be black in a strict sense. It is preferable that the ratio of the maximum value to the minimum value (the maximum value/the minimum value) is not more than 1.5.

In this case, ink is a solution wherein dyes and pigments are dissolved in a solvent such as water.

Then, density of ink means optical density (absorbance) which is shown after light with a prescribed wavelength is transmitted through a unit distance in an ink solution. It is not containing density of dyes or pigments contained in ink. When $I_0$ represents intensity of incident light, and I represents intensity of light transmitted through an object, optical density (absorbance) is defined to be $\log(I_0/I)$, and when the subject to be measured is a solution, it is common to define with absorbance per 1 cm in its optical path. Actually, absorbance per 1 cm is sometimes too great to be measured, and in that case, the absorbance is measured by attenuating with prescribed magnification, and it is possible to obtain through calculation from the results of the measurement and from the attenuating magnification. Ink with the maximum density means ink wherein the integrated value of spectral transmission density for the wavelength range of 400–700 nm is greatest.

Embodiment of the ink jet recording method and the ink jet recording apparatus, to which the invention is applied, will be explained as follows.

As an ink jet recording apparatus mentioned in the invention, there can be applied a piezo-system wherein pressurized liquid ink is supplied to a nozzle, and the so-called piezoelectric effect owned by a crystal is utilized, and one wherein ink is jetted continuously or intermittently through the so-called bubble jet system which generates jetting force caused by bubbles which are generated by giving heat suddenly to a part of ink, and thereby images and characters are recorded on a recording medium based on impressed image information. It is possible to use either some types of black ink each having different density or the three primary colors of yellow (Y), magenta (M) and cyan (C), or those wherein black is added to the three primary colors, as ink. Or, it is possible to use the one employing the so-called solid ink jet which is solid at the normal temperature and is increased in terms of temperature in the course of image jetting to be liquid.

It is possible to use Direct Black 19 and Sulfur Black 1 as a black dye to be used for ink, and to use a carbon-black-dispersed solution as black pigment. Direct Blue 199 and Direct Yellow 86 are available respectively as a blue dye and a yellow dye. In the case of a solid ink jet, those wherein carbon black and aniline black are dispersed in paraffin can be used.

(First Embodiment)

First, an example of an ink jet recording method and an ink jet recording apparatus wherein inventions in Structure (1) and Structure (8) are applied will be explained.

In the present embodiment, an example wherein X-rays are used as electromagnetic waves will be explained. First, an overall outline will be explained, referring to FIG. 1. The numeral 1 represents an image acquiring apparatus capable of obtaining X-rays generated from an object, as image signals. An example of image acquiring apparatus 1 for acquiring an X-ray image includes an apparatus wherein an imaging plate mainly composed of the stimulable phosphor like that stated earlier is used, and X-ray images are stored temporarily, and then, are taken out as stimulation emitted light by the use of excited light, and this stimulation emitted light is subjected to photoelectric conversion to obtain image signals, or a flat panel X-ray detector for obtaining image signals from X-ray images by combining an X-ray phosphor or an X-ray photoconductor with a TFT switching element.

The image acquiring apparatus 1 transforms X-ray images into electric signals for each prescribed region, in other words, for each element in prescribed size. The numeral 2 represents an image processing apparatus wherein these inputted image signals are subjected to image processing properly, and 3 represents an ink jet recording apparatus 3 which conducts image recording by the use of the image signals which have been subjected to image processing. Incidentally, the image processing apparatus 2 may be provided either separately from, or solidly with ink jet recording apparatus 3, or, it may be provided in both ways.

Figure 2:
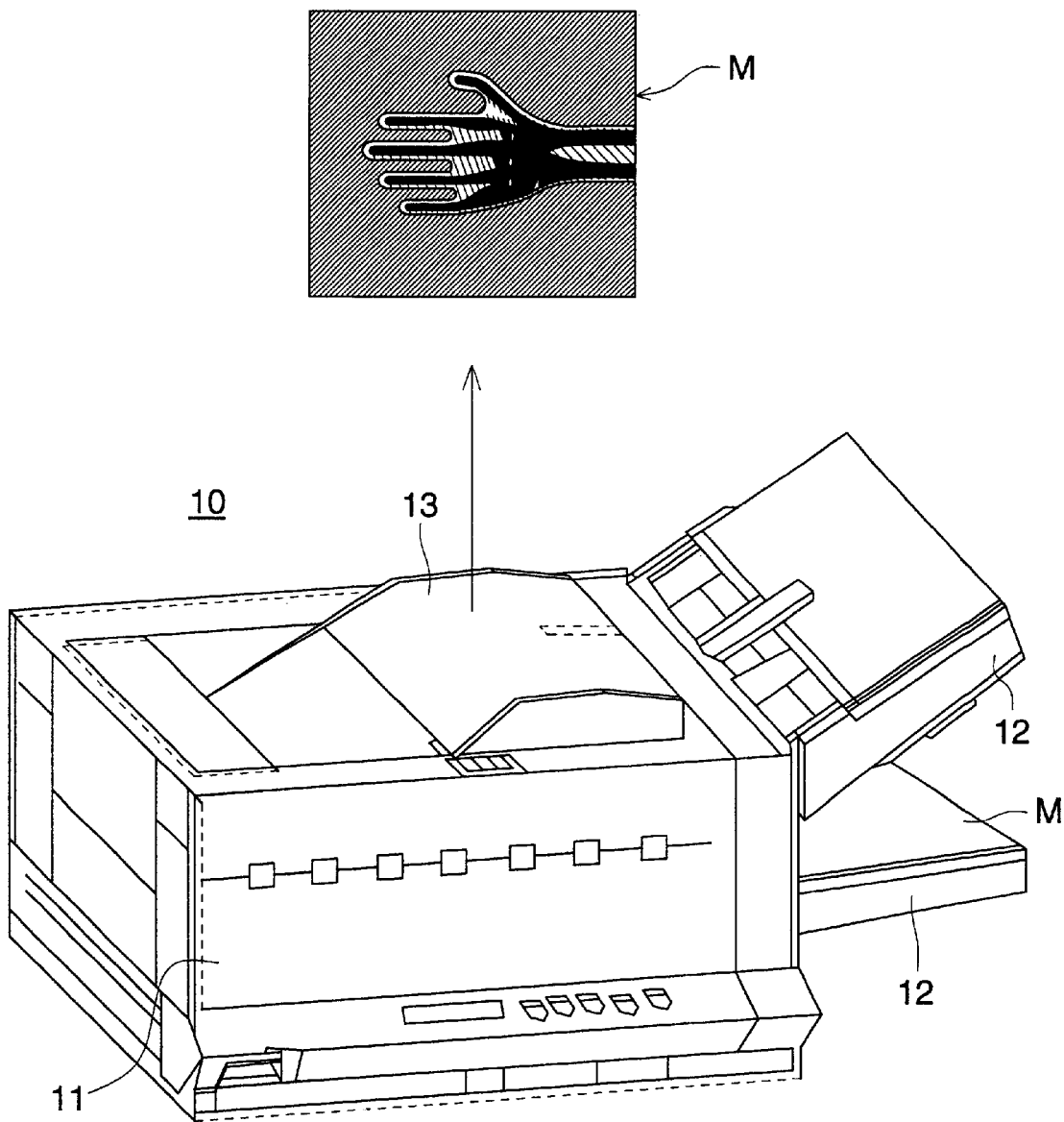
FIG. 2 is a diagram illustrating an outline of an ink jet printer related to the invention.

FIG. 2 represents an appearance of the ink jet recording apparatus 3 shown in FIG. 1. Ink jet recording apparatus 10 can form an image having intermediate contrast by sticking ink on a recording medium through an ink jet system. On the ink jet recording apparatus 10, there are provided feed trays 12 to be in two steps, for example, on apparatus main body 11, and recording medium M set in either one of the two feed trays, for example, in lower feed tray 12, is fed into the apparatus main body 11, and the recording medium M on which an image has been formed is taken out to ejecting section 13.

Figure 3:
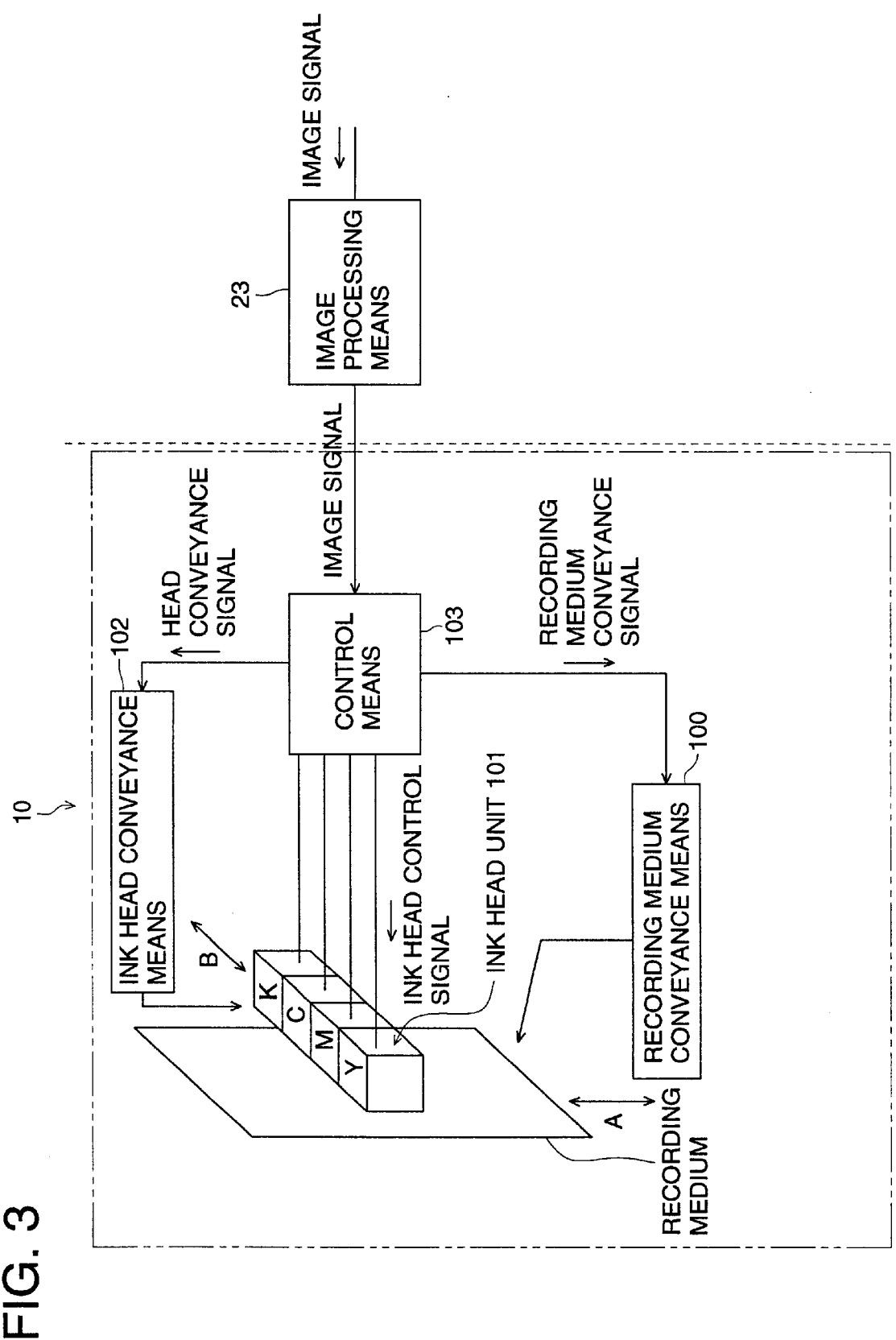
FIG. 3 is a block diagram of an ink jet printer related to the invention.

FIG. 3 is a block diagram showing schematic structure of ink jet recording apparatus 10. On the ink jet recording apparatus 10 in the present embodiment, there are provided recording medium conveyance means 100, ink head unit 101, ink head conveyance means 102 and control means 103.

The recording medium conveyance means 100 conveys recording medium M in the direction of arrow mark A based on recording medium conveyance signals. The ink head unit 101 is arranged to be capable of moving in the direction perpendicular to the conveyance direction for the recording medium M. On the ink head unit 101 in the present embodiment, ink heads respectively for yellow (Y), magenta (M), cyan (C) and black (K) are provided in a line. These heads may be provided either solidly or separately. The ink head conveyance means 102 moves an ink head in the direction of arrow mark B based on head conveyance signals, and each ink head forms an image on recording medium F based on ink head control signals. The numeral 23 represents an image processing means. Though it is provided on ink jet recording apparatus 10 in the present embodiment, it may also be provided separately from the recording apparatus. It is also possible to employ constitution wherein a length of the ink head unit is not less than a width of recording medium F (line head), and recording is conducted while the head is fixed.

Figure 4:
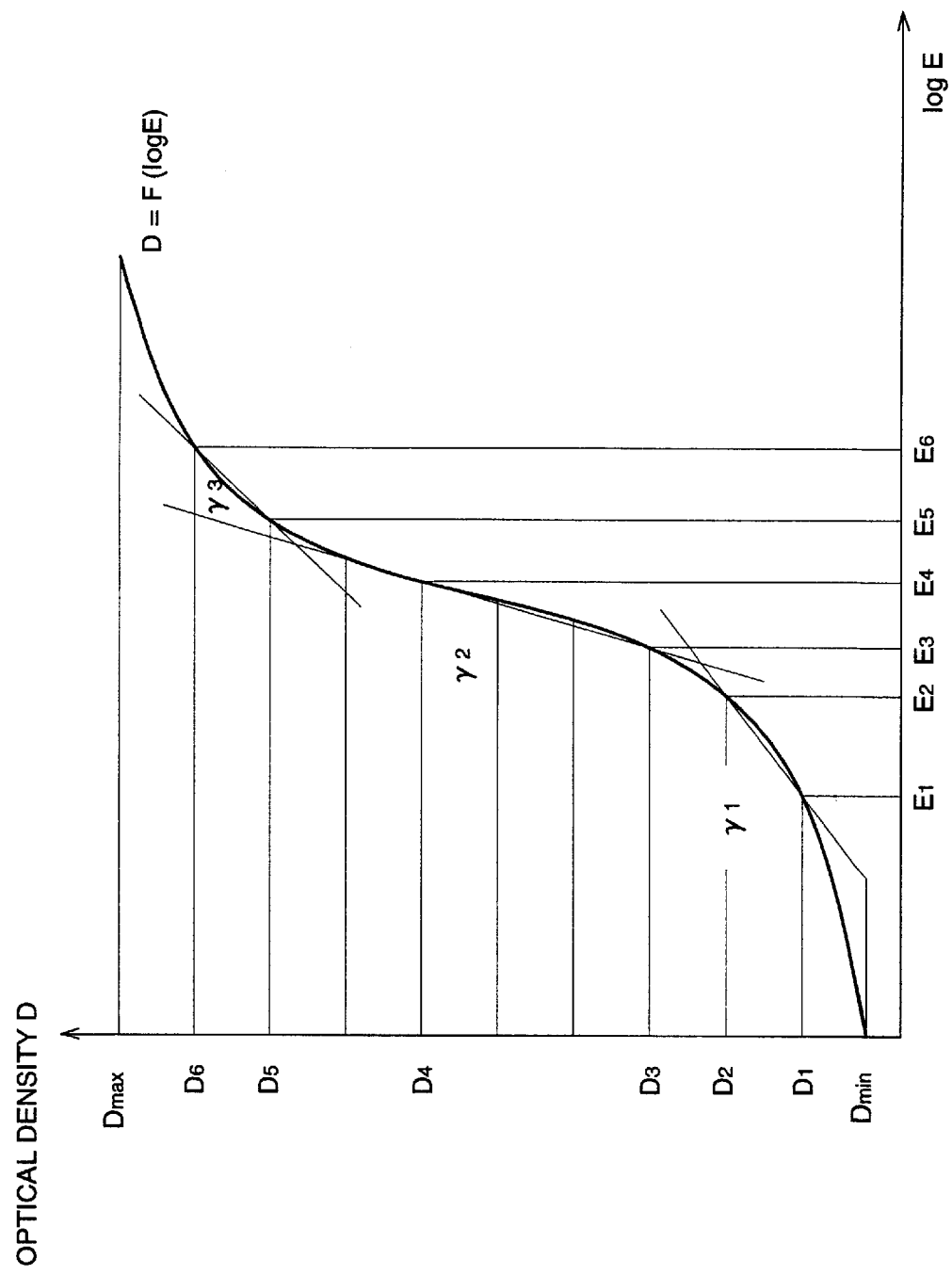
FIG. 4 is a diagram illustrating a characteristic curve related to the invention.

In the present embodiment, recording is conducted by the use of X-rays representing one of electromagnetic waves and an ink jet recording apparatus shown in FIG. 3, so that relationship between a logarithmic value of X-ray energy intensity and optical density D of an image on a recording medium, D=F (log E), may be the relationship shown in FIG. 4.

Namely, recording is conducted so that a characteristic curve showing a change of optical density D of an image for a logarithmic value of energy intensity E may be a monotone increasing function, and recording is conducted with $\gamma_1$ when X-ray energy intensity E is in a range of $E_1<E<E_2$, recording is conducted with $\gamma_2$ when X-ray energy intensity E is in a range of $E_5<E<E_6$ and recording is conducted with $\gamma_3$ when X-ray energy intensity E is in a range of $E_5<E<E_6$. In this case, $E_1<E_2<E_3<E_4<E_5<E_6$ holds, and each energy intensity Ei is energy intensity corresponding to each optical density Di of the following images. ((i is an integer representing each of 1–6.)

$$Di=kiD\max+(1-ki)D\min$$

($k_1=0.1$, $k_2=0.2$, $k_3=0.3$, $k_4=0.6$, $k_5=0.8$, $k_6=0.9$)

An inclination of a straight line connecting two points on a characteristic curve for $E_1$ and $E_2$ is represented by $\gamma_1$, an inclination of a straight line connecting two points on a characteristic curve for $E_3$ and $E_4$ is represented by $\gamma_2$ and an inclination of a straight line connecting two points on a characteristic curve for $E_5$ and $E_6$ is represented by $\gamma_3$, and relationship is shown by $|\gamma_1|<|\gamma_2|$ and $|\gamma_3|<|\gamma_2|$.

Incidentally, the monotone increasing function in this case means that optical density D is in relationship to increase when a logarithmic value of X-ray energy intensity increases. However, it also includes the relationship wherein optical density D partially remains to be a constant value when a logarithmic value of X-ray energy intensity increases.

By doing the recording like this, it is possible to obtain an image comparable to a photograph in terms of image quality, by the use of an ink jet recording apparatus. In particular, in the case of recording of images for medical use, it is possible to improve accuracy of diagnosis by increasing an inclination of D3–D4 representing the most important density range for diagnosis.

It is possible to enhance describing power by making $|\gamma_1|$, $|\gamma_2|$ and $|\gamma_3|$ to be respectively 0.8–2.2, 1.8–3.8 and 1.2–2.2, which is preferable.

Further effect can be obtained by recording a density range of $D_1 \leq D \leq D_2$ with the recording density gradation number of 16 or more and by recording a density range of $D_3 \leq D \leq D_4$ with the recording density gradation number of 32 or more, and still further effect can be obtained by recording with the recording density gradation number of 32 or more and with the recording density gradation number of 64 or more.

It is preferable that characteristic curve F varies its form smoothly, and it is preferable that the characteristic curve is a curve which is convex downward in an area where an inclination increases when energy intensity E increases, and it is a curve which is convex upward in an area where an inclination decreases when energy intensity E increases, as shown in FIG. 4. It is further preferable that the characteristic curve has only one inflection point representing a boundary between the curve portion which is convex downward the curve portion which is convex upward.

The invention can be applied to images obtained through various methods, and it is highly effective especially when recording images obtained from an object which is an image for medical use obtained by the use of X-rays. The basis for the foregoing is as follows. An X-ray image for medical use is a monochromatic transmission image which is basically based on black, and it is required to describe a lesion image which has delicate density fluctuation especially in an image whose density is about 1.0 or lower. The invention is excellent especially on the point of describing a monochromatic black image smoothly from a low density portion.

Incidentally, relationship with image signal S obtained for energy E of an electromagnetic wave sometimes varies depending on a means to obtain image signal S as stated above, and relationship between signal value S' given to a recording means in the case of recording on a recording medium through an ink jet system and recorded optical density D also varies sometimes depending on a recording means. In either case, recording has only to be conducted on a recording medium so that relationship between optical density D and logarithmic value log E of energy E of an electromagnetic wave may satisfy the necessary conditions of the invention.

Now, let it be assumed that image signal S and electromagnetic energy E are expressed by function f of $$S=f(E) \qquad (2)$$

and signal value S' to be given to a recording means and recorded optical density D are expressed by function F''' of $$D=F'''(S') \qquad (3)$$

For example, it is possible to obtain E from the relationship of $$E=f^{-1}(S) \ (f^{-1} \text{ is an inverse function of } f) \qquad (4)$$

and to record on a recording medium so that a logarithmic value of E and optical density D may be in the relationship of function F in expression (1). It is further possible to express again on a relational expression of image signal S and optical density D as in $$D=F(\log(f^{-1}(S)))=F'(S) \qquad (5)$$

by substituting expression (4) for expression (1), and thereby to record on a recording medium so that input signal S and optical density D may be in the relation function F'. Further, by using the relationship of $$S'=F'''^{-1}(D) \ (F'''^{-1} \text{ is an inverse function of } F''') \qquad (6)$$

and by substituting expression (5) for this, it is possible to send S' to a recording means after conducting signal processing so that image signal S obtained from an input means and signal S to be outputted to a recording means may be in the relationship of F''' as in $$S'=F'''^{-1}(D)=F'''^{-1}(F'(S))=F''''(S) \qquad (7)$$

and thereby to record on a recording medium so that relationship between optical density D and logarithmic value log E of electromagnetic wave energy E may satisfy the necessary conditions of the invention as a result.

Though it is possible to conduct operation each time in the case of signal processing, it is also possible to store functions of f, F, F' and F'''' as a table in advance and thereby to refer to the table, which is preferable because of its higher speed of processing.

Figure 5:
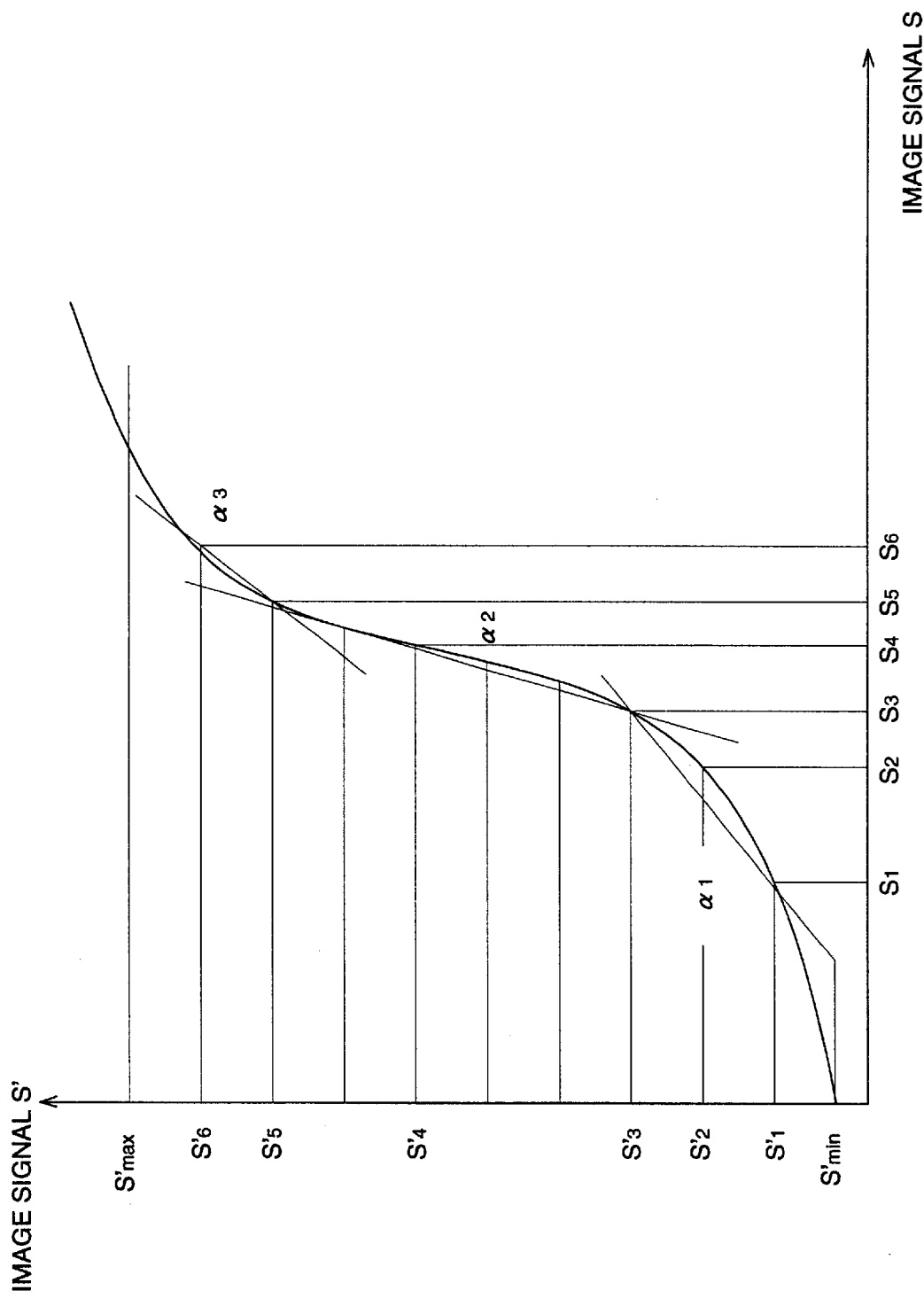
FIG. 5 is a diagram illustrating an example of image processing relating to the invention.

As an example of converting image signal S into image signal S', there is a conversion wherein a conversion curve indicating a change of converted image signal S' from image signal S is made to be a monotone increasing function as shown in FIG. 5, for example, and an inclination of the conversion curve is made to be $\alpha_1$, $\alpha_2$ and $\alpha_3$ when the image signal S is in a range respectively of $S_1<S<S_2$, $S_3<S<S_4$ and $S_5<S<S_6$. In this case, $S_1<S_2<S_3<S_4<S_5<S_6$ holds, and an inclination of a straight line connecting two points on the conversion curve for $S_1$ and $S_2$ is represented by $\alpha_1$, an inclination of a straight line connecting two points on a conversion curve for $S_3$ and $S_4$ is represented by $\alpha_2$ and an inclination of a straight line connecting two points on a conversion curve for $S_5$ and $S_6$ is represented by $\alpha_3$, and relationship is shown by $|\alpha_1|<|\alpha_2|$ and $|\alpha_3|<|\alpha_2|$. A means of this kind may be provided either on image processing section 23 or on another section.

Figure 6:
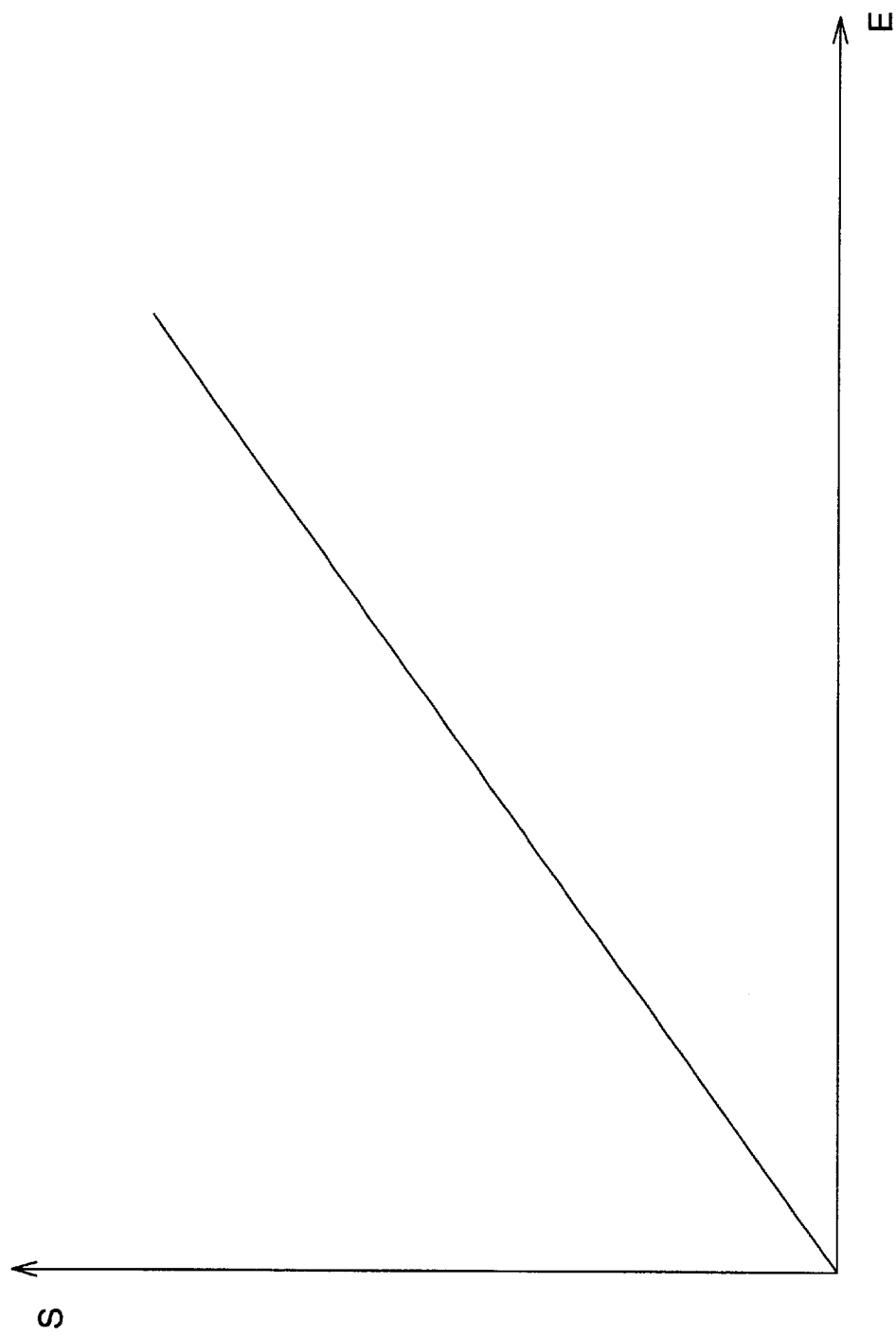
FIG. 6 is a diagram showing input and output characteristics of an input means.
Figure 7:
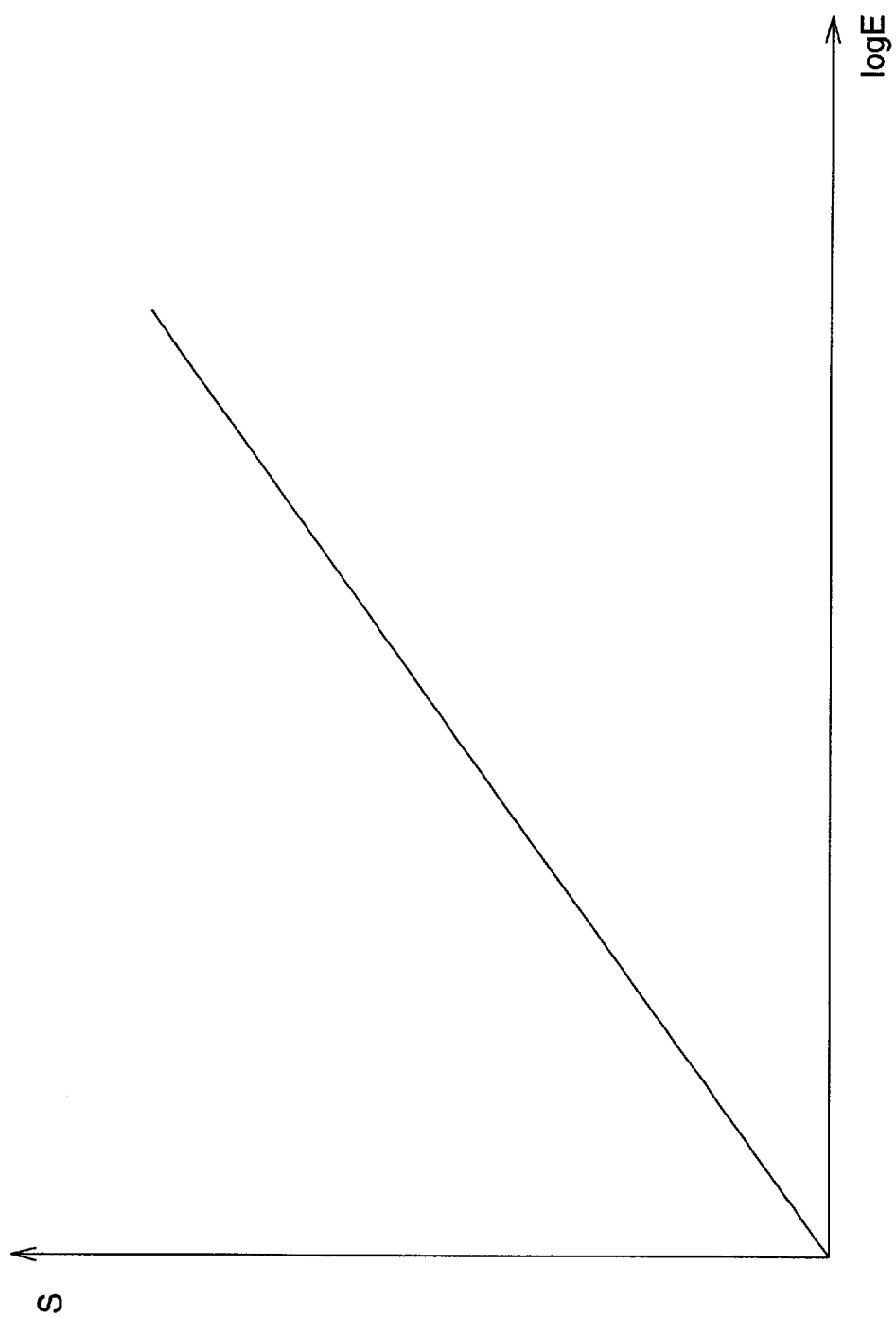
FIG. 7 is a diagram showing input and output characteristics of an input means.

In an example of obtaining image signal S by the use of a flat panel X-ray detector as image acquiring apparatus 1, the relationship of S=f (E) is one shown in FIG. 6, and in this case, image signal S is obtained as a value having linear relationship with X-ray energy intensity E. Further, in an example of obtaining image signal S by the use of an imaging plate employing a stimulable phosphor as image input apparatus 1, the relationship of S=f (E) is one shown in FIG. 7, and in this case, image signal S is obtained as a value having linear relationship with X-ray energy intensity E.

To record so that the characteristic curve of the invention may be satisfied by the use of these image signals S, it is required to conduct as stated above.

When both of image signals S obtained through plural input methods each having different function form of function f of image signal S for electromagnetic wave energy E are handled, it is possible to record on a recording medium so that the relationship between optical density D and logarithmic value log E of electromagnetic wave energy E may satisfy the necessary conditions of the invention, by conducting different signal processing based on information showing the input method through which the image signal has been obtained.

When recording through plural recording methods each having different function form of function F''' for optical density D recorded for signal S' to be given to a recording means, it is possible to record on a recording medium so that the relationship between optical density D and logarithmic value log E of electromagnetic wave energy E may satisfy the necessary conditions of the invention, by conducting the different signal processing based on information showing the recording method.

Though there have been shown some examples above, the invention is not limited to these examples, and various structures can further be employed, provided that the recording satisfies D=F (log E) representing the abovementioned characteristic curve. Even for the image processing, it can be conducted either outside or inside an ink jet recording apparatus, and it can further be conducted by adding another image processing, provided that the characteristic curve stated above is satisfied.

Further, in an ink jet recording apparatus, a method to obtain an image having characteristics shown in FIG. 4 includes various ones. For example, recording using yellow (Y), magenta (M) and cyan (C) ink can be conducted when X-ray energy intensity E for which the reproducibility of low density is required is in a range of $E_1<E<E_2$, and when X-ray energy intensity E for which density gradient is required is in a range of $E_2<E<E_5$, and recording using black ink (K) can be conducted when X-ray energy intensity E for which high density reproducibility is especially required is in a range of $E_5<E<E_6$. The especially preferable is that ink of yellow (Y), magenta (M) and cyan (C) are used in the ranges of $E_1<E<E_2$ and $E_3<E<E_4$ and black ink (K) is used in the range of $E_5<E<E_6$.

When a range of $D_3<D<D_4$ (corresponding to energy of electromagnetic wave $E_3<E<E_4$) is made to be a range of an object image, density gradation of the object image can further be enhanced, which is preferable. Further, when a range of $D_5<D<D_6$ (corresponding to energy of electromagnetic wave $E_5<E<E_6$) is made to be a range where no object image exists, it is possible to reproduce a solid density portion to be of high density and thereby to make it to be an image which is fitted to diagnosis, especially for an X-ray image, which is preferable.

A method to make a range of $D_3<D<D_4$ to be a range of an object image and to make a range of $D_5<D<D_6$ to be a range where no object image exists includes one wherein a typical signal value in an object region is obtained by analyzing image signals, and the image signals are corrected so that energy E of electromagnetic wave corresponding to the signal value may be equal to the prescribed standard energy. Or, the image signals may also be corrected so that indicated density of the typical signal value may be turned into the prescribed standard density.

When conducting image conversion as shown in FIG. 5, for example, it is also possible to correct the conversion curve in place of correcting the image signals. As a typical signal value in an object region, it is possible to use the maximum value, the minimum value, a mean value and a median value all within an object and to use a value obtained by combining the aforesaid values (such as an average value of the maximum and the minimum value). It is also possible to extract a region which is especially important for diagnosis in an object and thereby to use the maximum value, the minimum value, a mean value and a median value all in the region, or to use a value obtained by combining the values mentioned above.

Figure 8:
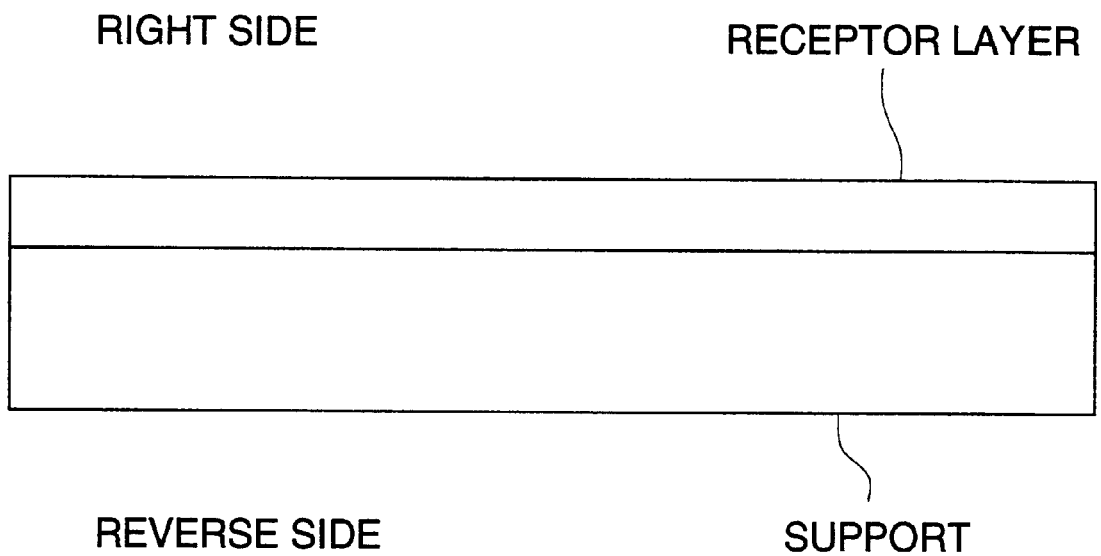
FIG. 8 is a diagram illustrating a recording medium.

Now, an example of a recording medium will be explained as follows, referring to FIG. 8. The recording medium in the present example is provided on the obverse side of a support, and it has at least one ink absorbing layer which easily absorbs ink. An image is recorded in the ink absorbing layer. It is also possible to form an ink absorbing layer on the reverse side and thereby to record an image even on the reverse side.

When a recording medium on which ink jet recording is conducted is made to be transparent or translucent, it is especially preferable when applying the invention to the diagnosis by means of an X-ray image for medical use.

When making a recording medium to be transparent, a support of the recording medium needs to be transparent, and as a transparent support for this purpose, those disclosed in TOKKAISHO No. 10-76751 are preferably used. When an illuminating light is located behind a support in the case of observing an image, a support which is transparent or translucent is preferable. A transparent support means a support whose transmission factor for visible light is high independently of an achromatic support or a chromatic support. In the preferable embodiment, the transmission factor is 70% or more. The transmission factor is defined as $$\text{Transmission factor}=(I/IO) \times 100\ (\%)$$

when assuming that IO represents intensity of light entering a substance, and I represents intensity of light which has passed the substance.

Translucence is represented by one whose transmission factor is less than 70% and is not less than 35%. When a support is translucent, it is preferable that turbidity is not less than 5% and is less than 90%. The further preferable is that turbidity is not less than 10% and is less than 80%. The turbidity in this case is a value obtained through measurement by a turbidity meter such as, for example, an integrating sphere photoelectric scattered light meter, and it is a rate of scattered light in the light transmitted through a substance. Namely, it is defined to be as follows.

$$\text{Turbidity}=(\text{scattered light intensity/transmitted light intensity}) \times 100\ (\%)$$

As a support for the transparent or translucent medium, it is possible to use polyester groups such as polyethylenephthalate, cellulose groups such as nitrocellulose and celluloseacetate, polyester groups such as polyethylene terephthalate, cellulose groups such as nitrocellulose and celluloseacetate, polysulfone, polyimide and polycarbonate. It is preferable that this sheet-shaped recording medium is tinted to be blue. The recording medium tinted to be blue shows an absorption spectrum having therein at least one absorption maximum in a zone of visible light with a wavelength of 560 nm or more. This blue tint has effects that dazzlement caused by excessive transmitted light coming from a non-image portion is prevented and a black image looks more preferable.

An ink absorbing layer is generally available in two types, one is a swelling type and the other is a void type, and it is preferable to provide an ink absorbing layer of a void type. The ink absorbing layer of a void type is a layer wherein voids are provided in the layer, a color material such as ink is absorbed in each void, and image is formed. This ink absorbing layer of a void type contains resins and fine grains. Fine grains themselves (namely, primary grains) or secondary grains representing cohering primary grains are connected with each other by resins to be formed. By adjusting the rate of fine grains and resins, voids are formed in a layer. An ink absorbing layer of a void type preferably has the rate of voids of 40 to 90%.

As fine grains, it is possible to use any grains provided that a layer can be formed, and fine grains formed from organic chemical compounds and inorganic fine grains can be used. However, for forming an excellent void, inorganic fine grains are preferable. For example, various types of natural or synthetic inorganic fine grains can be used in addition to silica, calcium carbonate, titanium oxide, zinc oxide, alumina, barium sulfate, magnesium carbonate and calcium silicate.

This fine grain may be either an independent fine grain or a fine grain whose surface is covered by various organic chemical compounds, for example, by cationic polymer. For forming an ink absorbing layer, silica or alumina is preferably used for its low refractive index.

As silica, there are preferably used colloidal silica, cation denaturated colloidal silica and silica synthesized through a gaseous phase method, among which, fine grain silica synthesized by the gaseous phase method in particular and cationic compound fine grains each being covered with cationic polymer on its surface are preferable because high voids can easily be obtained.

With regard to a mean grain size of fine grains, various mean grain sizes can be used provided that they are on the level which makes it possible to form an ink absorbing layer of a void type. As a mean grain size of fine grains, 300 nm or smaller is preferable. Though there is no restriction in particular for the lower limit of a grain size, 5 nm or more is preferable, and it is especially preferable that a mean grain size of fine grains is 5–80 nm.

As inorganic fine grains which form an ink absorbing layer of a void type, silica made by a gaseous phase method wherein a mean grain size of primary grains is 10 nm or less is preferable, and silica made by a gaseous phase method wherein a mean grain size of primary grains is 30 nm or less is especially preferable. A mean grain size of secondary grains representing cohering primary grains is 150 nm or less and it is preferably 100 nm or less.

In obtaining a mean grain size, grain sizes of given one hundred grains are obtained by observing the grains themselves and sections of void layers under an electron microscope, and the mean grain size is obtained as a simple mean value (average in the number). In obtaining a grain size of each grain, a projected area of the grain is measured, and a circle having an area that is the same as the aforesaid measured area is assumed, and the grain size is obtained as a diameter of the assumed circle.

It is preferable to use a binder for an ink absorbing layer of a void type, and a hydrophilic binder is especially preferable. As a hydrophilic binder to be used, there are used various types of hydrophilic binders which have been known in the past, and hydrophilic binder used preferably varies depending on whether inorganic fine grains are anionic or they are cationic.

When the surface of an inorganic fine grain is anionic, nonionic binders or anionic binders are used, while, when the surface of an inorganic fine grain is cationic, nonionic binders or cationic binders are used. These can also be used by combining two or more types. As an example of nonionic binders, there are given gelatin, polyvinyl alcohol, polyethylene oxide, polyacrylamide, polyvinyl pyrrolidone, hydroxyethyl cellulose, and dextran.

An anionic hydrophilic binder is a hydrophilic polymer having an anionic group such as carboxyl group and sulfo group, and there are given, for example, polyacrylic acid, carboxylmethylcellulose, agar, dextran sulfate.

As a cationic hydrophilic binder, there are given those wherein nonionic water-soluble polymer such as cation-denaturated polyvinylalcohol and cation-denaturated polyvinylpyrrolidone are cation-denaturated and water-soluble polymer having quaternary ammonium bases.

A ratio of fine grains to the hydrophilic binders is in a range of about 2–10 in weight percentage.

In the recording medium, it is preferable that the hydrophilic binder is hardened by hardening agents for preventing cracks. Hardening agents are generally chemical compounds having groups capable of reacting as the hydrophilic binder, or chemical compounds which accelerate reaction of different groups owned by the hydrophilic binder, and the hardening agents are selected in accordance with types of hydrophilic binders, to be used.

In the ink absorbing layer of a void type, it is preferable that a ratio by weight with fine grains is in a range from 1.2:1 to 12:1. Pores which substantially form voids have a mean diameter of 5–40 nm and pores forming voids have a pore capacity of 0.3–1 ml/g. It is preferable that inorganic fine grains represent inorganic silicic acid, the inorganic fine grain has 2–3 silanols per 1 $nm^2$ on its surface, and it is composed of a chain formed by coupling of secondary grains having a grain size of 10–300 nm representing cohering inorganic fine grains. It is preferable that the ink absorbing layer of a void type has specific surface area of 50–500 $m^2/g$.

When providing an ink absorbing layer, it is preferable that a support of a recording medium is subjected to corona discharging processing, flame processing and ultraviolet irradiation processing so that adhesive property of the support for the ink absorbing layer may be improved.

Further, for avoiding that sheet-shaped recording media are stuck to each other when they are superposed, it is also possible to scatter matting grains on the surface of the recording medium or to add surface active agents for antistatic purpose.

In the invention, it is also possible to use an ink recording medium of an opaque support having an ink absorbing layer. The opaque support means a medium for recording whose transmission factor is less than 35%. Resins wherein inorganic substances such as calcium carbonate are dispersed in a polyester base as well as paper are used. In the case of paper, it is also possible to use one which has been strengthened by conducting resin coating. It is preferable that at least one ink-receiving layer is provided on each of these opaque supports.

(Second Embodiment)

Next, there will be explained about an ink jet recording method and an ink jet recording apparatus to which the invention of Structure 24 is applied.

Fundamental structure is the same as that in First Embodiment.

In the present embodiment, ink having plural density, namely, at least two types of ink each being different in terms of density are used as ink for the ink jet recording apparatus.

An example of the ink jet recording apparatus will be explained as follows, referring to FIG. 9. Since bases of the ink jet recording apparatus are the same as those in the First Embodiment, explanation of the same portion will be omitted. In the structure of the present example, three types of black ink $K_1$, $K_2$ and $K_3$ are used in ink head unit 101 as an example of ink having different density. FIG. 10 shows an example of transmission density in each wavelength of ink $K_1$, $K_2$ and $K_3$.

Density d of each of these ink is in relationship of $d(K_1)<d(K_2)<d(K_3)$. Namely, $K_3$ is ink of highest density.

When conducting recording by using these ink, recording is conducted with $\gamma_1$ and by the use of $K_1$ ink or $K_2$ ink other than $K_3$ ink when X-ray energy intensity E is in a range of $E_1<E<E_2$, recording is conducted with $\gamma_2$ when X-ray energy intensity E is in a range of $E_3<E<E_4$, and recording is conducted with $\gamma_3$ when X-ray energy intensity E is in a range of $E_5<E<E_6$. In this case, relationship for each value is represented by $E_1<E_2<E_3<E_4<E_5<E_6$, and each energy intensity Ei is energy intensity corresponding to optical density Di of each following image. (i represents integers of 1–6)

$$Di = k_i Dmax + (1-k_i) Dmin$$

($k_1=0.1$, $k_2=0.2$, $k_3=0.3$, $k_4=0.6$, $k_5=0.8$, $k_6=0.9$)

The symbol $\gamma_1$ represents an inclination of a straight line connecting two points on a characteristic curve in $E_1$ and $E_2$, $\gamma_2$ represents an inclination of a straight line connecting two points on a characteristic curve in $E_3$ and $E_4$, and $\gamma_3$ represents an inclination of a straight line connecting two points on a characteristic curve in $E_5$ and $E_6$, and relationship thereof is as follows.

$$|\gamma_1|<|\gamma_2|, |\gamma_3|<|\gamma_2|$$

In the present embodiment, it is possible to improve image quality by improving reproducibility for a low density portion in the structure wherein recording is conducted by using ink other than $K_3$ ink with highest density, namely $K_1$ ink or $K_2$ ink, or using both $K_1$ ink and $K_2$ ink when energy intensity E is in a range of $E_1<E<E_2$.

In the present invention, it is preferable, from the viewpoint of image graininess, that a gray scale of a monochromatic image is expressed by the use of plural ink each having different density in an ink jet recording apparatus, and it is especially preferable to use plural black ink each having different density as ink.

In the present embodiment, there is employed a structure wherein recording is conducted by using ink other than ink with highest density when optical density D is in a range of $D_1<D<D_2$ (namely, energy intensity E is in a range of $E_1<E<E_2$). For expressing a low density portion by using dark ink, it is necessary to record ink thinly within a prescribed area. However, when recording thinly by the use of dark ink, image graininess (granular appearance) is worsened. Further, this granular appearance is more noticeable in a range of low density $D_1<D<D_2$ because density resolving power of a human eye is high. In a density range of $D_1<D<D_2$, therefore, ink with the highest density (ink $K_3$ in the present example) out of plural ink each having different density is not used but other ink only are used for recording, which make it possible to prevent deterioration of graininess.

Further, when a low density portion is expressed by using ink with the lowest density as much as possible among ink other than that with the highest density, graininess is further improved, and it is especially preferable that ink with the lowest density (ink $K_1$ in the present example) occupies 50% or more of ink used in density range of $D_1<D<D_2$.

On the contrary, in the high density area where optical density is in a range of $D_5<D<D_6$ (namely, energy intensity E is in a range of $E_5<E<E_6$), it is preferable that 50% or more of ink used is ink with the highest density (ink $K_3$ in the present example), because high density is expressed by relatively small amount of ink. If a large amount of ink with low density is used to express a high density area, a considerable period of time is required for recording, a recording medium can not absorb ink thoroughly, and overflowing ink spreads to cause an increase of image unevenness and a fall of sharpness, which results in deterioration of image quality for recorded images.

Though there has been explained with an example of ink density in three kinds, the number of kinds of density may also be four kinds, five kinds or more, provided that the number of kinds is plural, namely, is two kinds or more.

It is preferable that each ink density satisfies the following relational expression.

$$d_n - d_{n-1} > d_{n-1} > d_{n-2} \geq \ldots \geq d_2 - d_1 \text{ (} n \text{ represents integers of 4 and over)}$$

In the expression above, $d_n$ represents each ink density, and $d_n < d_{n+1}$ is satisfied.

It is preferable that each ink density satisfies the following relational expression.

$$d_n - d_{n-1} > d_{n-1} > d_{n-2} \geq \ldots \geq d_2 - d_1 \text{ (} n \text{ represents integers of 4 and over)}$$

When ink is made to be in four types each having different density, and when each ink density is represented respectively by $d_1$, $d_2$, $d_3$ and $d_4$ ($d_1<d_2<d_3<d_4$), it is preferable that the expression of $d_4-d_3>d_3-d_2 \geq d_2-d_1 \geq d_1$ holds.

When ink is made to be in three types each having different density, and when each ink density is represented respectively by $d_1$, $d_2$, and $d_3$ ($d_1<d_2<d_3$) it is preferable that the expression of $d_3-d_2>d_2-d_1 \geq d_1$ holds.

It is preferable that each ink density satisfies the following relational expression.

$$d_n = d_{n-1} \cdot r (r<1)$$

In the expression above, $d_n$ represents each ink density, and $d_n<d_{1+1}$ holds. The expression of $r=\frac{1}{2}$ is further preferable.

(Third Embodiment)

Next, there will be explained about an ink jet recording method and an ink jet recording apparatus to which the invention of Structures 2 and 20 are applied.

Fundamental structure is the same as that in First Embodiment.

In the present embodiment, there is obtained a reversal image which is different from an image obtained in the first embodiment and the second embodiment. In other words, an image having opposite density is obtained.

Figure 11:
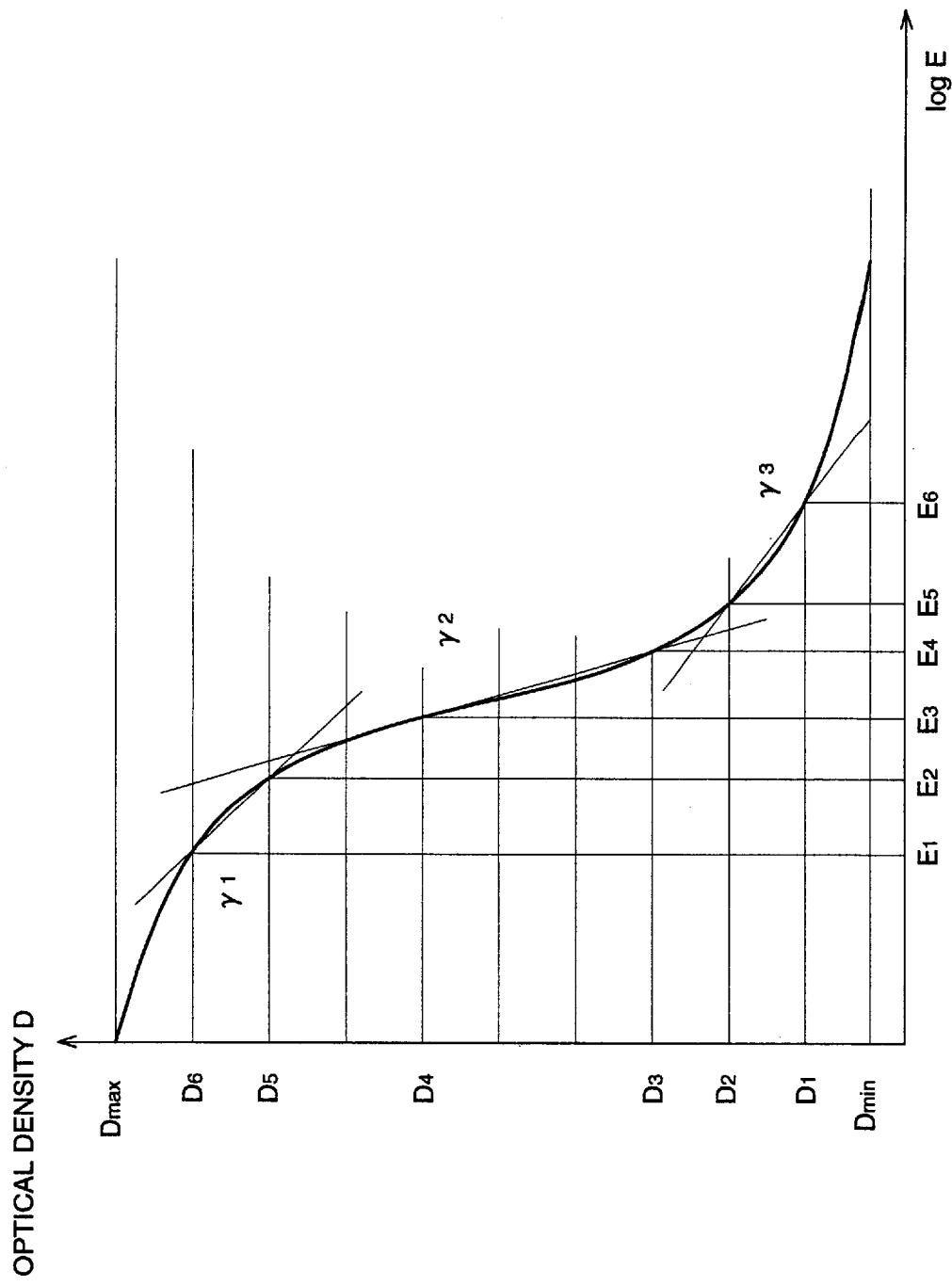
FIG. 11 is a diagram illustrating a characteristic curve related to the invention.

In detail, the ink jet recording apparatus is used to conduct recording so that the characteristic curve indicating the change of optical density D of an image corresponding to a logarithmic value of energy intensity E may be a monotone decrease function as shown in FIG. 11, and recording is conducted with $\gamma_1$ when energy intensity E is in a range of $E_1<E<E_2$, recording is conducted with $\gamma_2$ when energy intensity E is in a range of $E_3<E<E_4$, and recording is conducted with $\gamma_3$ when energy intensity E is in a range of $E_5<E<E_6$ However, the relationship of each value is represented by $E_1<E_2<E_3<E_4<E_5<E_6$, and each energy intensity Ei is energy intensity corresponding to optical density Di of each following image. (i represents integers of 1–6)

$$Di = k_i Dmax + (1-k_i) Dmin$$

($k_1=0.9$, $k_2=0.8$, $k_3=0.6$, $k_4=0.3$, $k_5=0.2$, $k_6=0.1$)

The symbol $\gamma_1$ represents an inclination of a straight line connecting two points on a characteristic curve in $E_1$ and $E_2$, $\gamma_2$ represents an inclination of a straight line connecting two points on a characteristic curve in $E_3$ and $E_4$, and $\gamma_3$ represents an inclination of a straight line connecting two points on a characteristic curve in $E_5$ and $E_6$, and relationship thereof is as follows.

$$|\gamma_1|<|\gamma_2|, |\gamma_3|<|\gamma_2|$$

Incidentally, the monotone decrease function in this case means the relationship wherein optical density D decreases when a logarithmic value of electromagnetic wave, namely of X-ray energy intensity in the present example, increases.

However, the relationship wherein optical density D partially becomes a constant value when a logarithmic value of X-ray energy intensity increases is also included.

Figure 12:
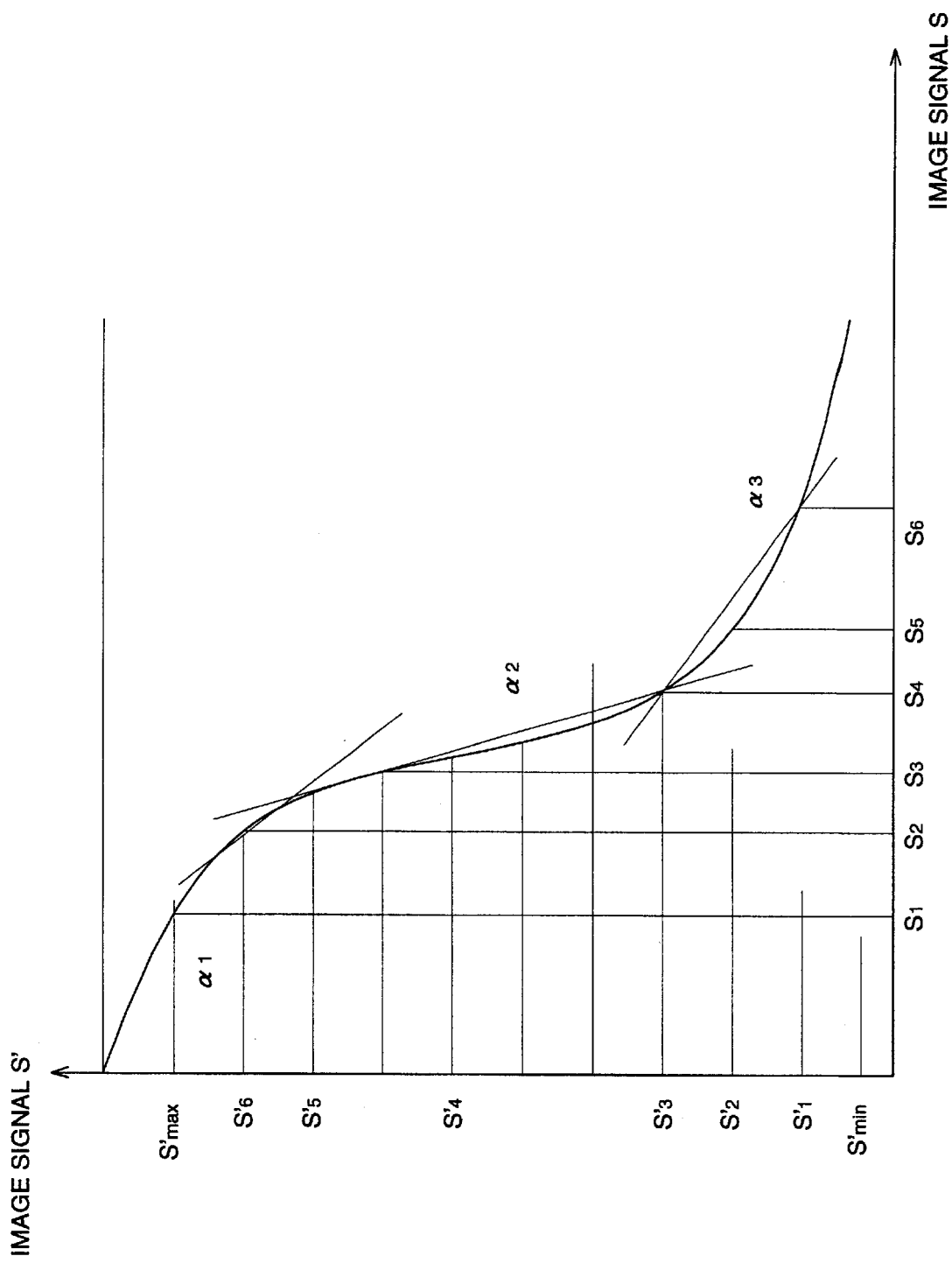
FIG. 12 is a diagram illustrating an example of image processing relating to the invention.

The structure for conducting the image recording stated above may also include a structure wherein image signal S' obtained by converting image signal S obtained by image acquiring apparatus 1 in FIG. 1 as shown in FIG. 12 and recording is conducted by the ink jet recording apparatus with the image signal S' serving as an input signal, or image signal S is inputted in the ink jet recording apparatus and image recording satisfying the aforesaid characteristic curve is conducted based on the inputted image signal S.

(Fourth Embodiment)

Next, there will be explained about an ink jet recording method and an ink jet recording apparatus to which the invention of Structure 27 is applied.

The fundamental structure in the present embodiment is the same as that in Third Embodiment.

In the present embodiment, at least two types of ink each having different density are used for recording. In this case, three types of ink $K_1$, $K_2$ and $K_3$ each having different density are used, and when assuming that their optical density are in relationship of $d(K_1)<d(K_2)<d(K_3)$, recording is conducted with $\gamma_1$ when energy intensity E is in a range of $E_1<E<E_2$, recording is conducted with $\gamma_2$ when energy intensity E is in a range of $E_3<E<E_4$, and recording is conducted with $\gamma_3$ and by using ink other than ink with the highest density, namely, $K_1$ or $K_2$, in quantity of 50% or more of the total amount of ink used, when energy intensity E is in a range of $E_5<E<E_6$. However, the relationship of each value is represented by $E_1<E_2<E_3<E_4<E_5<E_6$, and each energy intensity Ei is energy intensity corresponding to optical density Di of each following image. (i represents integers of 1–6)

$$Di = kiD\max + (1-ki)D\min$$

($k_1=0.9$, $k_2=0.8$, $k_3=0.6$, $k_4=0.3$, $k_5=0.2$, $k_6=0.1$)

The symbol $\gamma_1$ represents an inclination of a straight line connecting two points on a characteristic curve in $E_1$ and $E_2$, $\gamma_2$ represents an inclination of a straight line connecting two points on a characteristic curve in $E_3$ and $E_4$, and $\gamma_3$ represents an inclination of a straight line connecting two points on a characteristic curve in $E_5$ and $E_6$, and relationship thereof is as follows.

$$|\gamma_1|<|\gamma_2|, |\gamma_3|<|\gamma_2|$$

By conducting this recording, it is possible to obtain the recording wherein optical density D is reduced as energy intensity E of an electromagnetic wave increases, namely, it is possible to obtain images with high image quality even in the case of reversal recording.

(Fifth Embodiment)

Next, there will be explained about an ink jet recording method and an ink jet recording apparatus to which the invention of Structures 40 and 41–49 are applied.

Figure 9:
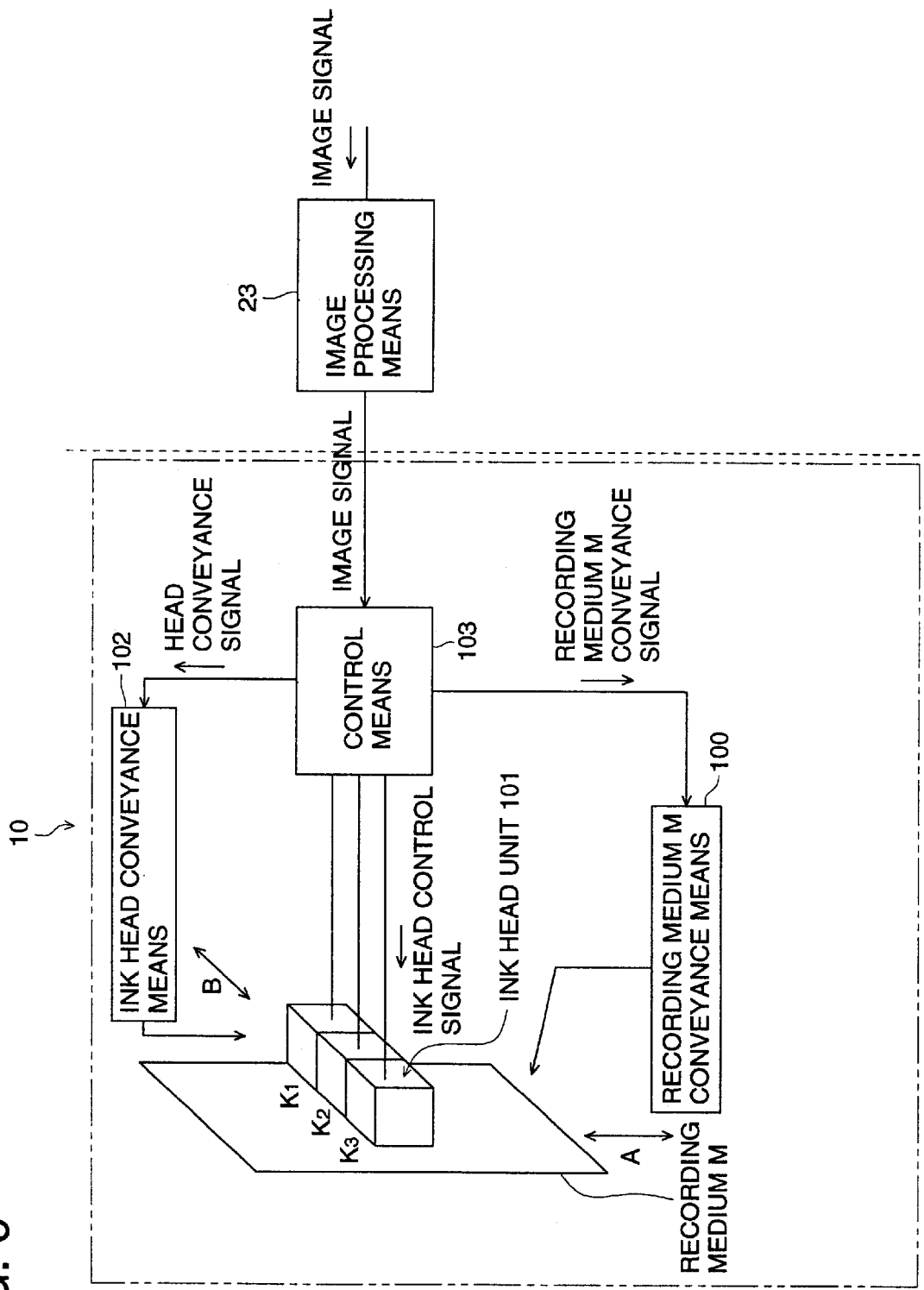
FIG. 9 is a block diagram of an ink jet printer related to the invention.
Figure 10:
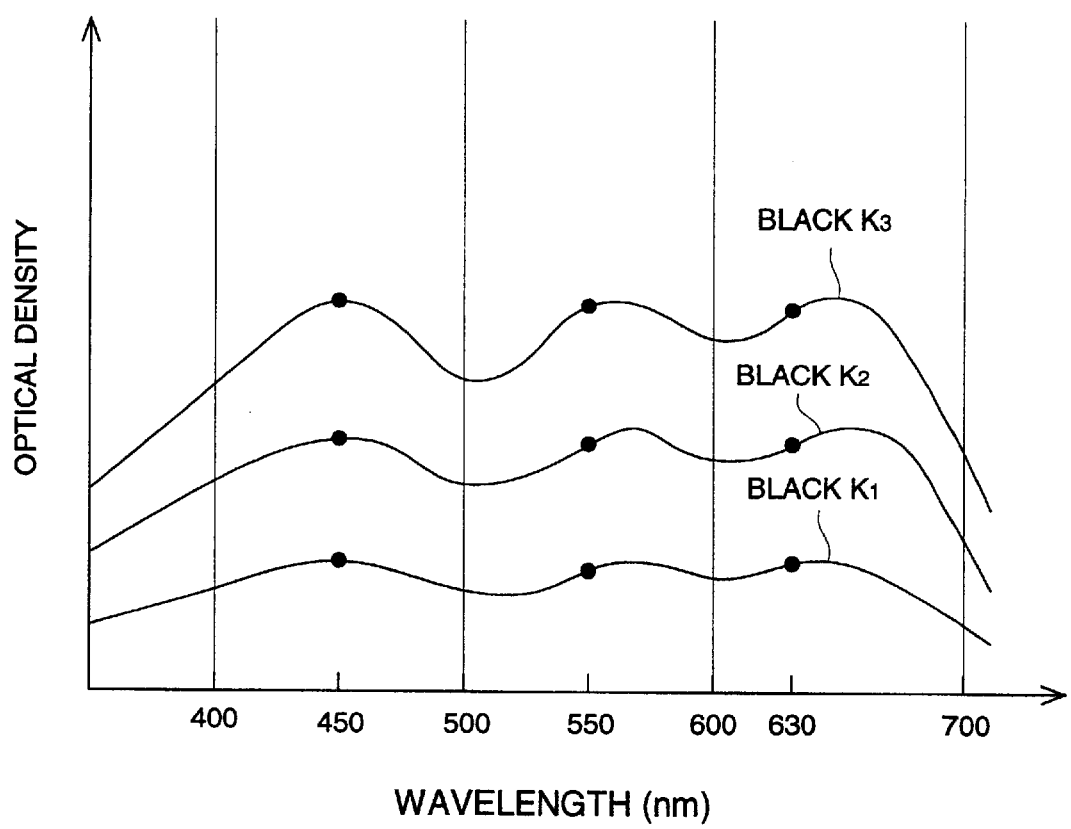
FIG. 10 is a diagram showing transmission optical density characteristics of ink.

The basic structure of the ink jet recording apparatus in the present embodiment is the same as that in FIG. 9 used in the Second Embodiment. The present embodiment employs the structure wherein the number of recording density gradation (N=) 81 is expressed by using (n=) 3 types of ink each having different density. The minimum recording density (a=) is made to be 640 dpi.

Incidentally, the present embodiment does not employ the structure like that employed in the second embodiment wherein recording with each $\gamma$ corresponding to each X-ray energy intensity E and recording by using each ink having different optical density selectively are conducted. However, the present embodiment may also employ the aforesaid structure.

By conducting this recording, it is possible to obtain images with high image quality.

Though an example has been shown above, the number n of types of ink each having different optical density, the number N of recording density gradations and minimum recording density a are not limited to those shown above.

In this case, the number of density gradations means the number of expressible different density. The number of density gradations of image signal basically means the number of different signal values corresponding to the aforesaid number of density gradations. Both of them do not need to be on a one-to-one correspondence. A value of an expressible different density, or a value corresponding to or representing that value is called a density gradation level.

Incidentally, for the purpose of recording X-ray images for medical use, it is more preferable to express 256 (8 bit)–16384 (14 bit) as a recording density gradation number. In particular, when recording images for medical use obtained by an apparatus which acquires simple X-ray radiographed images, like those in the case of an apparatus in which energies transmitted through an object are converted into digital signals by a flat panel detector composed of a two-dimensional semiconductor detector, and an apparatus in which energies transmitted through an object are detected by a stimulative phosphor detector and are converted into digital signals, there is required high density resolving power. It is therefore more preferable to be capable of expressing 1024–16384 as a recording density gradation number, and it is much more preferable to be capable of expressing 4096–16384. In other words, it is possible to obtain preferable images by making the recording density gradation number to be 1024–16384, independently of an acquiring apparatus or acquiring conditions, and the more preferable is 4096–16384.

In the case of an ink jet printer, however, it is difficult to control density on a microscopic area with such multivalued density gradation number as this, although it is not impossible. Accordingly, it is necessary to express density gradation macroscopically by combining a density-modulation system with an area-modulation system on the assumption that observation is made through a distance of a certain extent. The area-modulation system is to control an impact area for ink and thereby to express medium density gradation falsely with an area ratio of a white background to an inked portion, and this is realized by utilizing halftoning.

In the present specification, a density gradation number which can be finally controlled by a recording apparatus is described as a recording density gradation number. Therefore, in a recording apparatus which is structured to control further more density gradation numbers macroscopically by employing density gradation numbers which can be controlled microscopically and employing halftoning such as dithering method and mirror diffusing method, a macroscopic density gradation number which can be controlled after being subjected to a false half tone expression corresponds to a recording density gradation number.

On the other hand, it is assumed that a controllable gradation number per unit is shown regarding a density gradation number which can be controlled microscopically by the recording apparatus, and it is described as "density gradation number per. . . " . It is sometimes described simply as a microscopic density gradation number. In the case of a recording apparatus using no false half tone expression, a microscopic density gradation number per recording density corresponds to a recording density gradation number.

Figure 13:
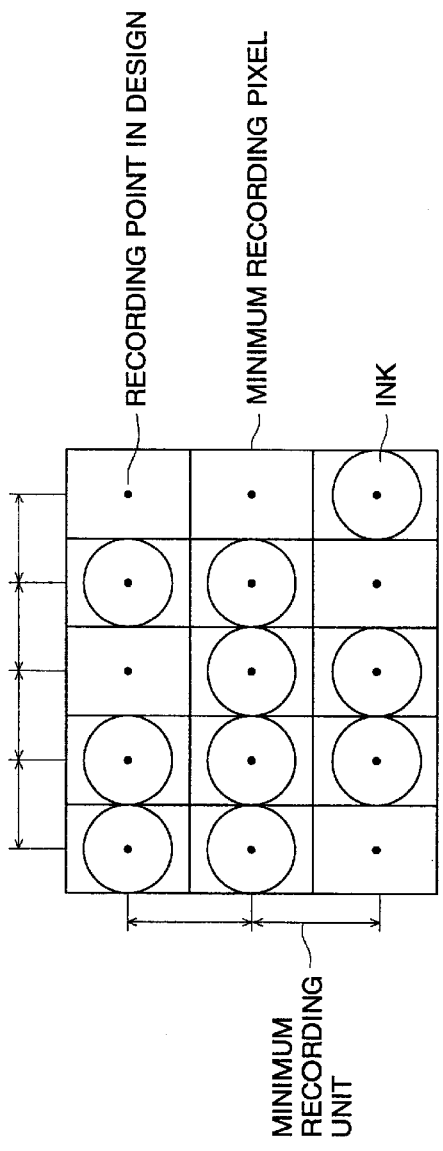
FIGS. 13(a) and 13(b) are diagrams illustrating a recording pixel related to the invention.
Figure 13:
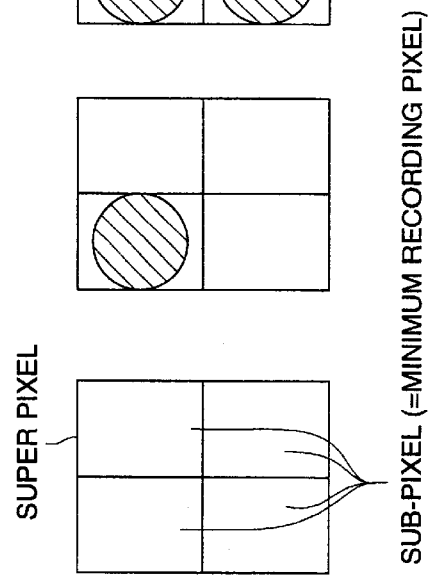

For the sake of simplicity, explanation will be made with an example wherein the number of density gradations for the minimum recording pixel is binary. As shown in FIG. 13(a), when recording images, whether to jet ink to the designed recording points arranged at intervals of the minimum recording unit or not is controlled. In this case, the minimum distance which makes it possible to control whether to jet ink or not is called a minimum recording unit. The greatest number of dots dotted in a unit length of a recording medium by an ink jet printer is called minimum recording density, and it is indicated by the number of droplets dotted in one inch (dpi). For example, if the minimum recording density is designed to be 720 dpi, the minimum recording unit is 35 μm because it is possible to control whether to jet ink at intervals of about 35 μm or not. In this case, the minimum recording unit in the longitudinal direction is not always the same as that in the lateral direction. Further, the minimum recording unit does not necessarily agree with a dot diameter of ink jetting. Here, a rectangle wherein its center is a designed recording point and its one side is the minimum recording unit is called a minimum recording pixel.

As shown in FIG. 13(b), the minimum recording pixel is made to be a sub-pixel, and a unit to express density gradation composed of 2×2 sub-pixels is called a super pixel. For example, when controlling whether not to jet ink of one type for each minimum recording unit or to jet only one droplet, the number of density gradations per sub-pixel (minimum recording pixel) is a binary for ink whether to impact or not.

As shown in FIG. 13(b), in the super pixel, there are obtained five combinations of density gradations ranging from an occasion where ink impacts none of sub-pixels to an occasion where ink impacts all sub-pixels. Further, when the number of sub-pixels in the super pixel is increased to 3×3, 4×4 . . . n×n, it is possible to express the number of density gradations of $n^2+1$ in the super pixel unit even when the number of density gradations per sub-pixel is binary. Namely, the density gradation number ($n^2+1$) per a super pixel representing the macroscopic density gradation number corresponds to recording density gradation number in this case.

However, when trying to express 256 density gradations macroscopically, for example, the super pixel composed of 16×16 sub-pixels is needed. When the minimum recording unit is 35 μm, one side of the super pixel is as long as 560 μm and high frequency component of the image can not be reproduced.

On the other hand, if the number of ink droplets impacting on a sub-pixel is increased up to plural droplets in addition to one droplet, the number of density gradations per sub-pixel can be increased. It is therefore possible to increase the number of density gradations per super pixel.

However, it takes a considerable recording time to make many droplets of ink to impact on the same spot, and when the number of droplets is too large, the recording medium can not absorb ink thoroughly, causing unevenness and bleeding of ink, which results in a problem of deterioration of image quality.

Therefore, there is a limit for the number of expressible density gradations, and it is difficult to express macroscopically with the number of density gradations of 256 or more for images of medical use by increasing the number of ink droplets hitting an area of the sub-pixel, and thereby to obtain images which can be put to practical use.

It is possible to express macroscopically with the density gradation number of 256 or more by increasing the number of density gradations per sub-pixel without increasing the number of droplets of ink sharply, and by using plural types of ink each having different density.

For example, if the structure is arranged so that three types of ink each having different density may be jetted independently, and if each ink is controlled so that up to two droplets of each ink per sub-pixel may be dotted, it is possible to express 27 density gradations per sub-pixel. When density gradation for this is expressed with a super pixel composed of 2×2 sub-pixels, it is possible to express 105 density gradations per super pixel. When the number of ink density is less and/or the number of density gradations per sub-pixel is less, granular appearance of the image is noticeable, which is not preferable. By using ink in three types or more each having different density, it is possible to make halftone expression where granular appearance is not noticeable to be compatible with recording speed. It is more preferable to use ink in four types or more each having different density. When assuming that the recording density gradation number is represented by N, it is preferable that number of density gradations per sub-pixel L is greater than a square root of (N/2).

Though the so-called dithering method wherein density gradation is expressed for each super pixel has been explained above, the invention is not limited to this as an area density gradation method, and an area modulation method such as a digital screening method and a blue noise mask method may also be used. When an error diffusion method is used, dot intervals are narrowed and resolution is maintained on the portion where image frequency is high, while on the contrary, dots are dispersed and the number of density gradations is maintained on the portion of low frequency component, thus, both of resolution and the number of density gradations are made to be compatible with each other, which is preferable.

Further, if M density gradations per super pixel are expressed in the dithering method and an error diffusion method is applied on a super pixel unit, density gradation with less granular appearance can be expressed even when number of density gradations per minimum recording pixel (sub-pixel) L is relatively small.

From the viewpoint that the number of expressible density gradations may be made large, it is preferable that the super pixel is composed of six or more sub-pixels, and it is more preferable that the super pixel is composed of nine or more sub-pixels. On the contrary, from the viewpoint that the resolution is not lowered, it is preferable that a side of the super pixel is not more than 110 μm.

On the other hand, when expressing sufficient halftone without employing the combination with an area modulation method, it is necessary to express 256–16384 density gradations for each minimum recording unit. By using ink in four types or more each having different density, it is possible to realize 256–16384 density gradations without noticeable granular appearance.

Figure 15:
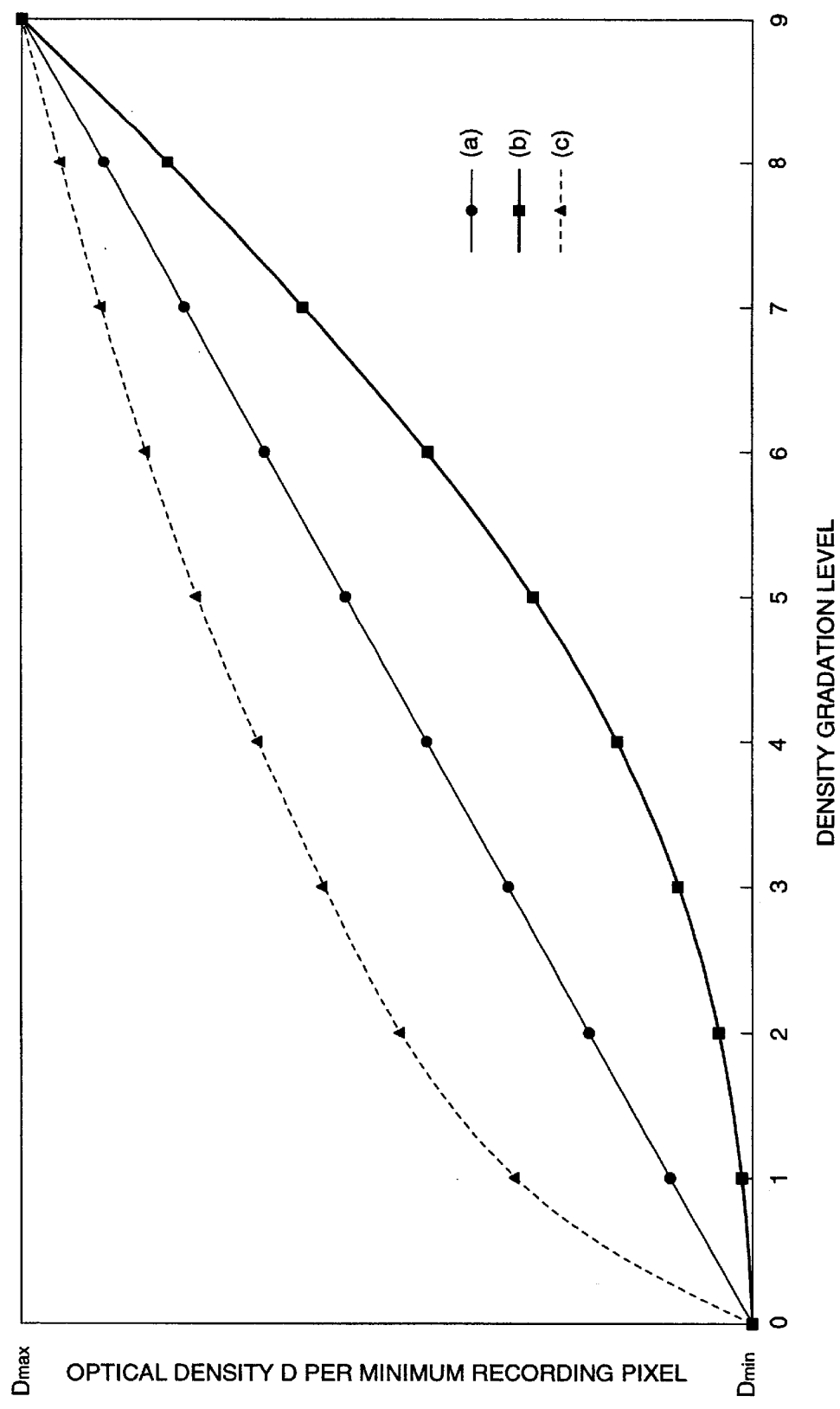
FIG. 15 is a diagram illustrating an example of density gradation characteristics relating to the invention.

In this case, density gradation expression per minimum recording pixel can be made, for example, to be those shown with (a), (b) and (c) in FIG. 15. FIG. 15 shows an example wherein the axis of abscissas represents density gradation level per minimum recording pixel, and the axis of ordinates represents optical density D per minimum recording pixel, and the density gradation characteristic is structured to be a straight line mostly or a curved line. In this case, the optical density D is mean optical density in the case where all minimum recording pixels are recorded uniformly at the density gradation level per the same minimum recording pixel in a prescribed area.

Independently of whether to combine with an area modulation method or not, it is preferable that n is a fourth power root of N or more and it is more preferable that n is a cube root of N or more, when ink in n types each having different density is used and N represents the number of recording density gradation to be expressed. Though the greater the value of n is, the better density gradation expression with less granular appearance is possible, when n exceeds a value which is three times a fourth power root of N, n which is greater than the value only makes the apparatus structure complicated and it does not contribute to improvement of image quality.

In the vicinity of the minimum recording unit, it is preferable to have the number of density gradation which is not less than a square root of ½ of recording density gradation number N to be expressed.

When expressing recording density gradation number N to maintain spatial resolution of recorded images, it is preferable that the minimum recording density is not less than (a fourth power root of N)×80 dpi. When expressing macroscopically N density gradation by using ink in n types each having different density, the minimum recording density which is not less than [(square root of N)/n×80 dpi] make it possible to obtain images wherein the number of density gradation and spatial resolving power are well-balanced, which is preferable. Though the higher the minimum recording density is, the better the spatial resolving power is, when the minimum recording density exceeds [(square root of N)/n×640 dpi], the spatial resolving power differs little and no further effect is substantially obtained.

It is further preferable that each ink density satisfies the following relational expression.

Further, when density of ink in three types each having different density are represented respectively by $d_1$, $d_2$ and $d_3$ ($d_1<d_2<d_3$), relationship of $d_3-d_2>d_2d_1 \geq d_1$ is preferable.

Further, each ink density preferably satisfies the following relational expression.

$$d_n = d_{n-1} \cdot r (r<1)$$

In the expression above, $d_n$ is density of each ink and $d_n < d_{n+1}$ holds. The relationship of r=½ is more preferable.

In the foregoing, it is preferable that ink with the highest density is made to be of the density which is especially high. As an example of especially high density, there is an occasion where the maximum density is made to be especially great when comparing relationship in size between ($d_3-d_2$) including $d_3$ and $d_2-d_1$ with relationship in size between other terms ($d_2-d_1$ and $d_1$). Due to this, high density portions can be expressed with less ink efficiently, and it is possible to prevent problems of ink spreading caused by using a large amount of ink, and of insufficient density caused by prevention of ink spreading.

When ink in n types each having different density are used and a recording density gradation number is represented by N, it is preferable that minimum recording density a is in a range from [(square root of N)/n×80 dpi] to [(square root of N)/n×640 dpi].

(Sixth Embodiment)

Next, there will be explained about an ink jet recording method and an ink jet recording apparatus to which the invention of Structures 39, 40 and 41–49 are applied.

The basic structure of the ink jet recording apparatus in the present embodiment is the same as that in FIG. 9 used in the Second Embodiment, and ink in four types each having different optical density are used in the structure. In the present embodiment, recording density gradation number (N=) 256 is expressed and minimum recording density (a=) is made to be 640 dpi.

Incidentally, the present embodiment does not employ the structure like that employed in the second embodiment wherein recording with each γ corresponding to each X-ray energy intensity E and recording by using each ink having different optical density selectively are conducted. However, the present embodiment may also employ the aforesaid structure.

By conducting this recording, it is possible to obtain images with high image quality.

Though an example has been shown above, the number n of types of ink each having different optical density, the number N of recording density gradations and minimum recording density a are not limited to those shown above. When optical density of each ink is represented respectively by $d_4$, $d_3$ and $d_3$ $d_2$ and $d_1$ ($d_4<d_3<d_2<d_1$), it is preferable to satisfy the following relational expression.

$$d_4 - d_3 > d_3 - d_2 \geq d_2 - d_1$$

Further, each ink density preferably satisfies the following relational expression.

$$d_4 - d_3 > d_3 - d_2 \geq d_2 - d_1 \geq d_1$$

Further, each ink density preferably satisfies the following relational expression.

$$d_n = d_{n-1} \cdot r (r<1)$$

In the expression above, $d_n$ is optical density of each ink and $d_n < d_{n+1}$ holds. The relationship of r=½ is more preferable.

In the foregoing, it is preferable that ink with the highest density is made to be of the density which is especially high. As an example of especially high density, there is an occasion where the maximum density is made to be especially great when comparing relationship in size between ($d_1 - d_{n-1}$) including $d_1$ and $d_{n-1} - d_{n-2}$ with relationship in size between other terms. Due to this, high density portions can be expressed with less ink efficiently, and it is possible to prevent problems of ink spreading caused by using a large amount of ink, and of insufficient density caused by prevention of ink spreading.

(Seventh Embodiment)

Next, there will be explained about an ink jet recording method and an ink jet recording apparatus to which the invention of Structures 60 is applied.

The basic structure of the ink jet recording apparatus is the same as that in the Second Embodiment.

An ink jet recording method to record images by jetting ink based on image signals, wherein, ink in plural types each having different density are used, and when $\beta_1$ represents an inclination of a straight line connecting two points on the temperature gradation curve corresponding to density gradation levels $N_1$ and $N_2$ and $\beta_2$ represents an inclination of a straight line connecting two points on the temperature gradation curve corresponding to density gradation levels $N_3$ and $N_4$, both in the temperature gradation curve showing relationship between a density gradation level reproducible at the minimum recording unit and optical density D of an image formed corresponding to each density gradation level, relationship between $\beta_1$ and $\beta_2$ is shown by $\beta_1 \leq \beta_2$, provided, however, that $N_1 < N_2 < N_3 < N_4$ holds.

Figure 14:
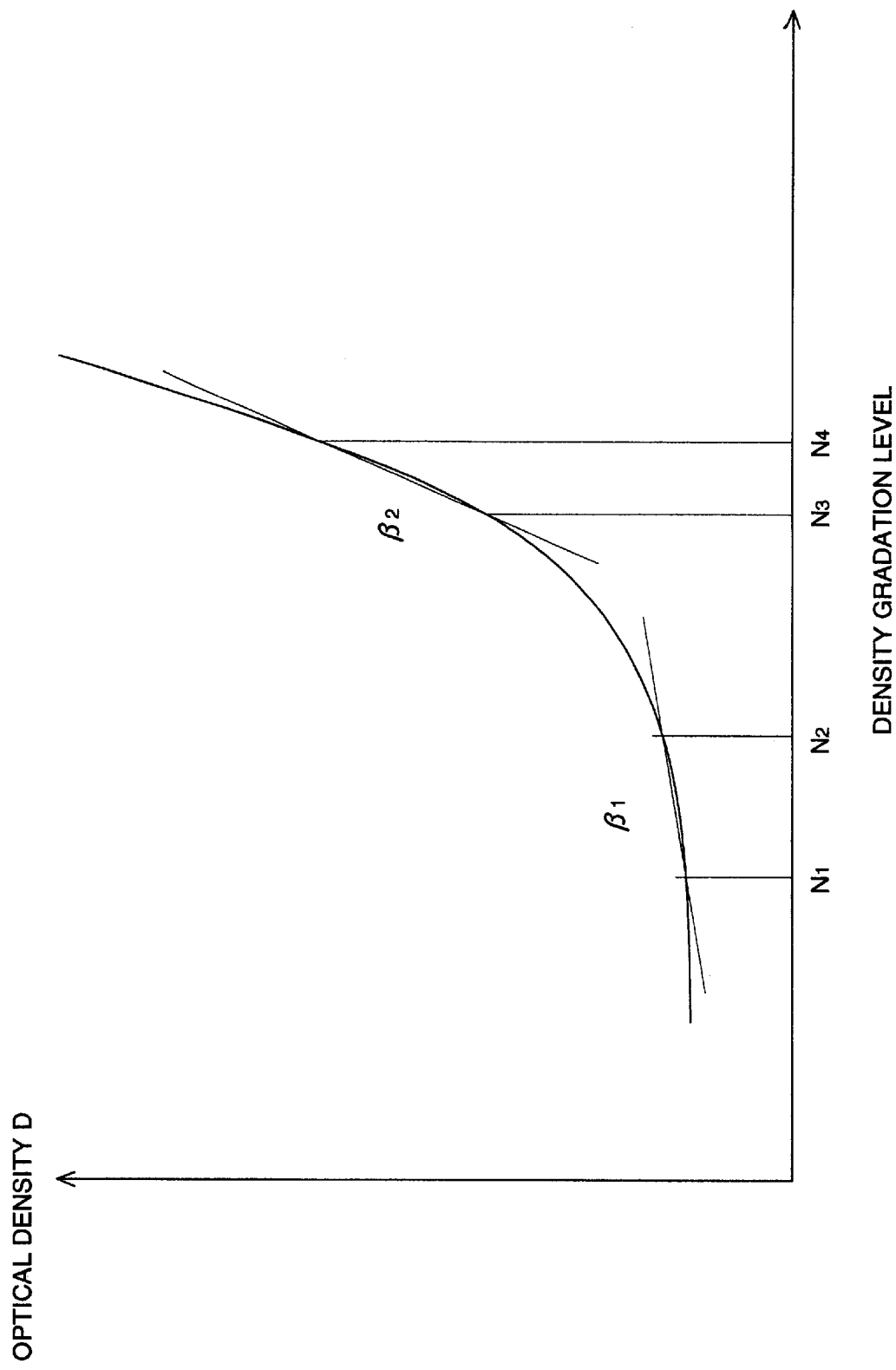
FIG. 14 is a diagram illustrating density gradation characteristics of an ink jet printer related to the invention.

In the ink jet recording method stated above, the ink jet recording apparatus is structured so that it may have characteristics shown in FIG. 14 for ink jet recording.

As explained in the Fifth Embodiment, the minimum recording unit is a rectangle whose center is a designed recording point and whose side is the minimum recording unit. Recording on the minimum recording unit includes recording by jetting a droplet or jetting plural droplets on the same spot, and impacting of plural droplets includes overlapping impacting of ink droplets in the same size or in different sizes by using the same nozzle, or overlapping impacting of ink droplets in the same size or in different sizes on the same spot by using different nozzles, or combination thereof.

In the density gradation expression per minimum recording pixel, density gradation characteristics wherein the axis of abscissas represents a density gradation level per minimum recording pixel and the axis of ordinates represents optical density D per minimum recording pixel may either be structured to be mostly a straight or be structured to be a curve, as shown with (a) and (b) in FIG. 15. Optical density D in this case is a mean optical density obtained when recording uniformly all minimum recording pixels at a density gradation level per the same minimum recording pixel in a prescribed area. In particular, the one wherein an inclination of a density gradation curve shows monotone increase as the density gradation level increases as shown by (b) in FIG. 15 is preferable. The monotone increase in this case may also include a portion which is constant, in addition to the portion which increases constantly. In other words, when $\beta_1$ represents an inclination of a straight line connecting two points on a density gradation curve corresponding to $N_{i-1}$ and $N_i$ and when $\beta_2$ represents an inclination of a straight line connecting two points on a density gradation curve corresponding to $N_{i+1}$ and $N_{i+2}$ when density gradation levels $N_{i-1}$, $N_i$, $N_{i+1}$ and $N_{i+2}$ are in the relationship of $N_{i-1}<N_i<N_{i+1}<N_{i+2}$, $\beta_1 \leq \beta_2$ holds.

By giving the density gradation characteristic of this kind, it is possible to make the number of density gradations in a low density portion where density resolving power of human eyes is higher to be greater than that in a high density portion where density resolving power of human eyes is lower. Therefore, even the relatively small number of density gradations can also be utilized efficiently, and smoothness of density change in a low density portion can be realized. When the density gradation characteristic per minimum recording pixel is structured as shown with (b) in FIG. 15, and thereby the macroscopic density gradation is expressed by the use of, for example, a dithering method or an error diffusion method, it is possible to easily obtain macroscopic density gradation characteristics wherein density gradation characteristics per minimum recording pixel are reflected.

Figure 16:
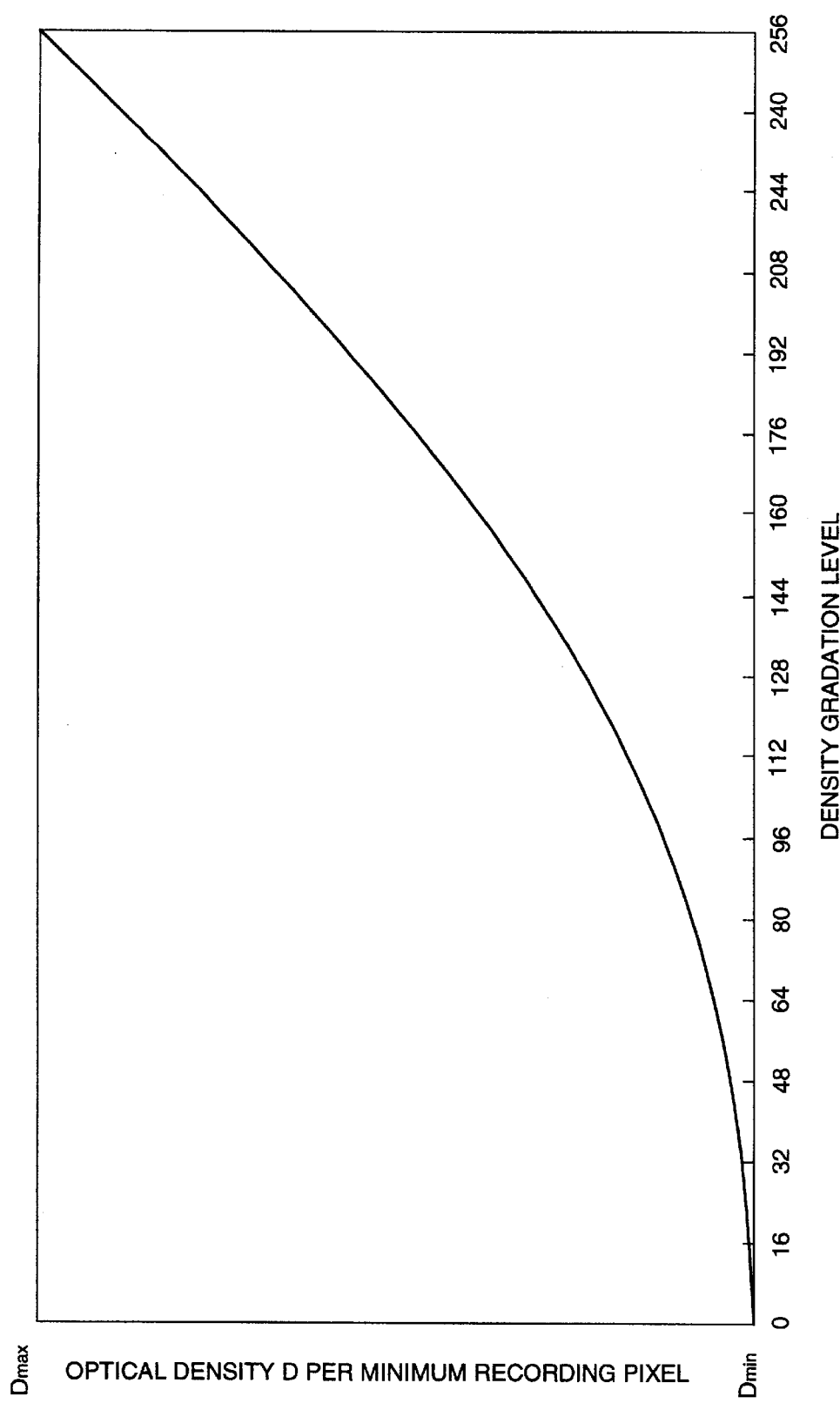
FIG. 16 is a diagram illustrating an example of density gradation characteristics relating to the invention.
Figure 17:
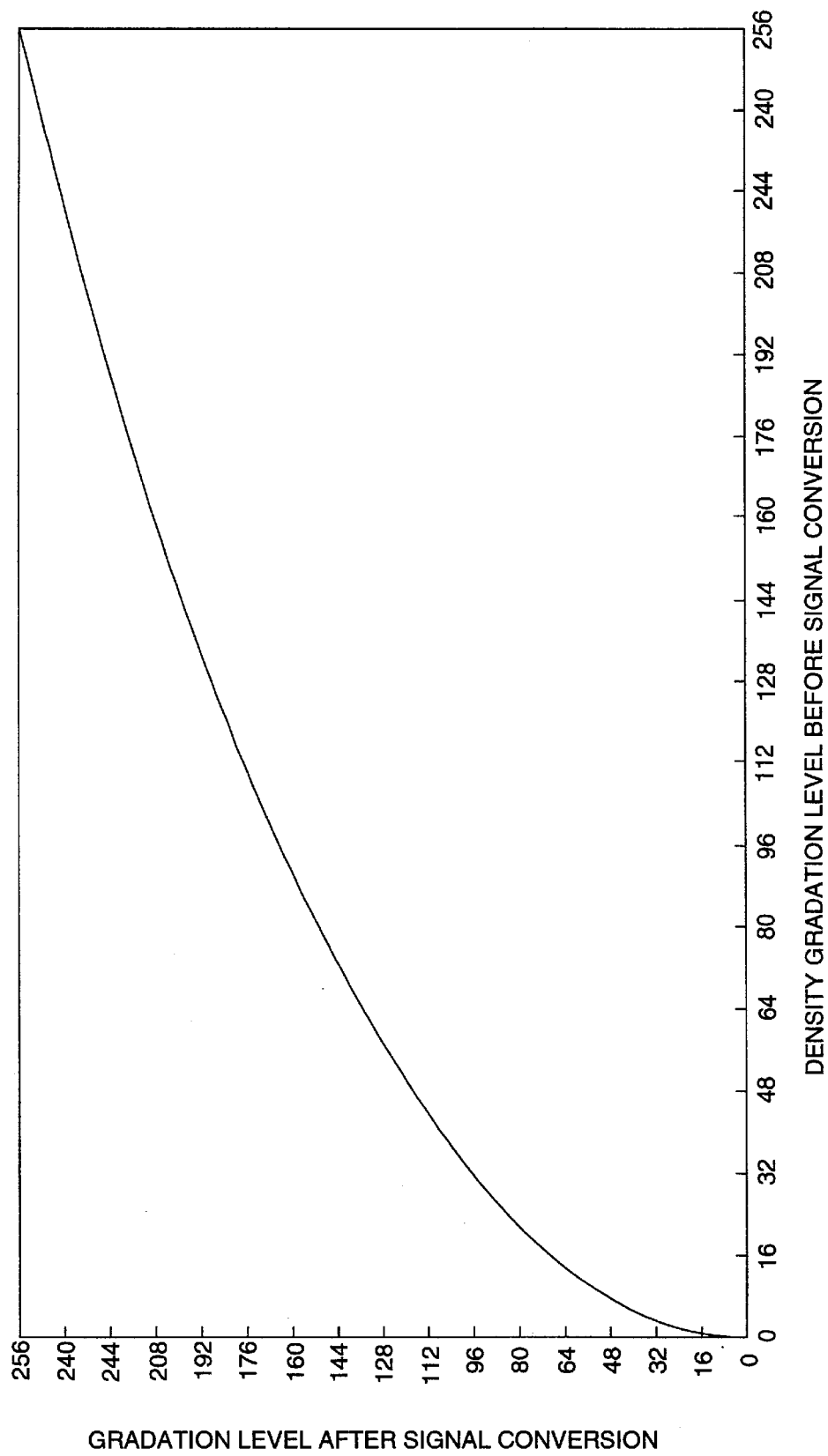
FIG. 17 is a diagram illustrating an example of image processing relating to the invention.

As density gradation characteristics of an ink jet recording means, just giving the characteristics stated above is acceptable, but it is necessary to consider, when conducting image processing, that the characteristics are given. To make handling of image signals easy, it is preferable that the density gradation characteristic of the ink jet recording apparatus is linear. So, by recording with density gradation characteristics shown in FIG. 17 after conducting signal conversion whose inclination negating density gradation characteristics shown in FIG. 16 is shown in FIG. 17, it is possible to structure the density gradation characteristics of the ink jet recording means so that they may be linear apparently. The signal processing function of this kind may be given either in an ink jet recording means or to an image processing means.

If signal conversion shown in FIG. 17 is conducted when the macroscopic density gradation number expressible by an ink jet recording means is smaller than the number of density gradations of image signals obtained by an image acquiring means, or than the number of density gradations of image signals after image processing, it is possible to make the density resolving power on the low density portion to be higher than that on the high density portion, which is preferable. This effect will be explained as follows, referring to an example wherein the number of density gradations of image signals obtained by an image acquiring means is 32 and the number of recording density gradations expressible by an ink jet recording means is 16.

Figure 18:
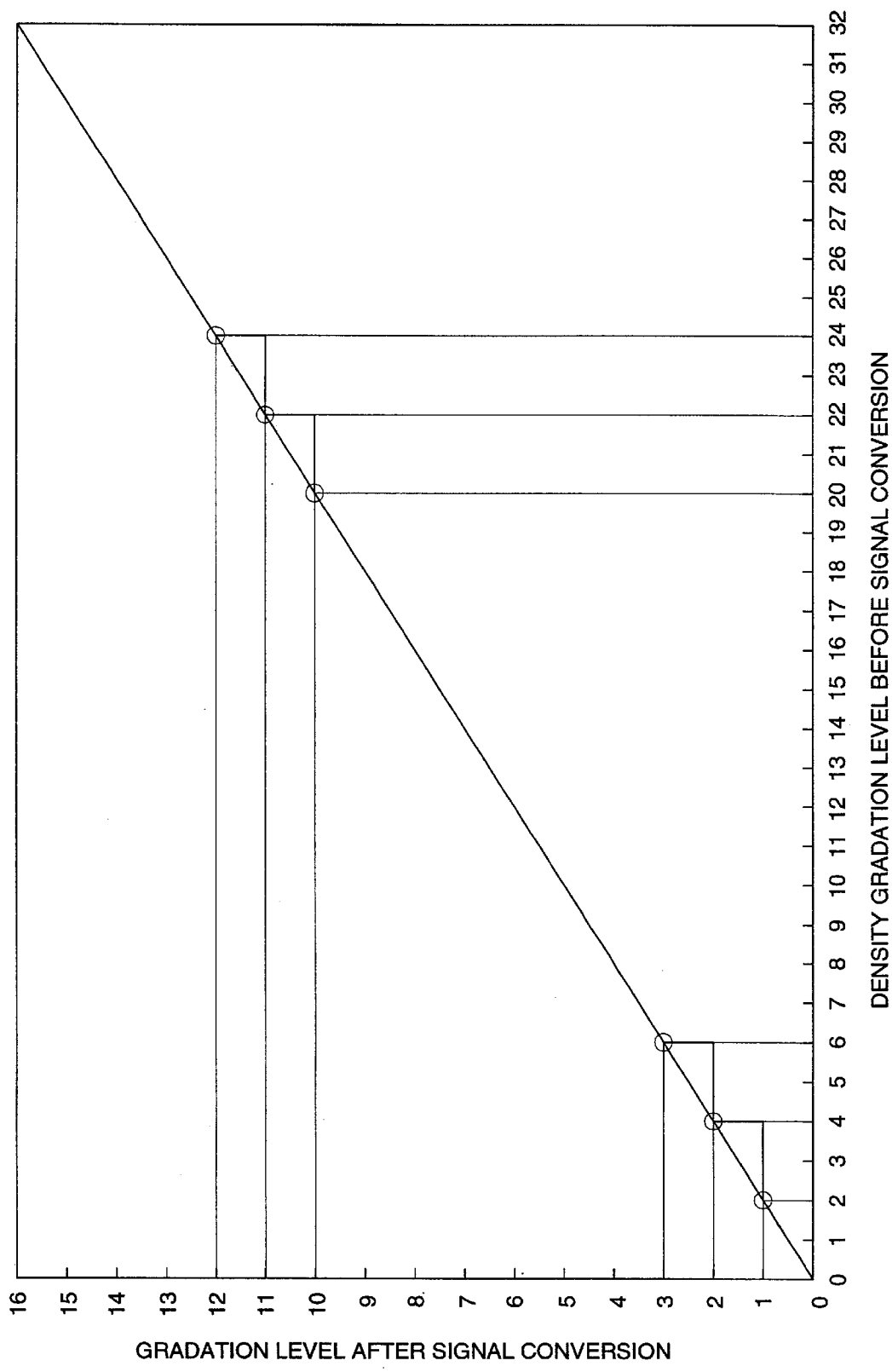
FIG. 18 is a diagram illustrating an example of image processing relating to the invention.
Figure 19:
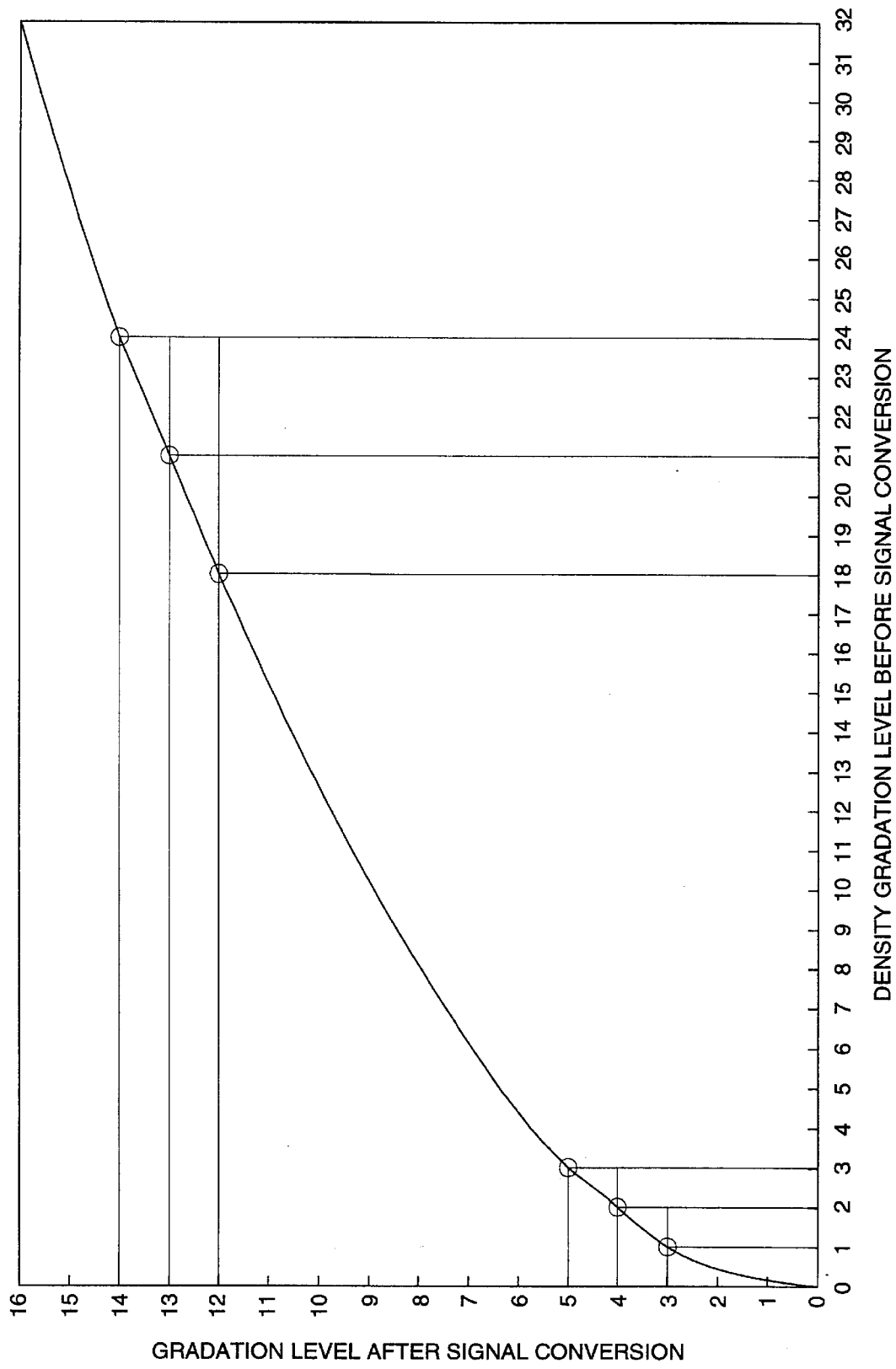
FIG. 19 is a diagram illustrating an example of image processing relating to the invention.

FIG. 18 shows gradation conversion characteristics in the case of converting from density gradation number 32 to recording density gradation number 16 in linear relationship, in which density resolving power after signal conversion is one half that before signal conversion in any density gradation level. On the other hand, when 32 density gradation is converted to 16 density gradation with conversion characteristics shown in FIG. 19, density resolving power in a low density portion is not deteriorated, and density resolving power in a high density portion is lowered to one third of that before conversion. Therefore, density resolving power on a low density portion is made higher than that on a high density portion.

With regard to the density gradation curve per minimum recording pixel, the characteristics of $\beta_1 \leq \beta_2$ when $\beta_1$ represents an inclination of a straight line connecting two points on the density gradation curve corresponding to $N_{i-1}$ and $N_i$ and $\beta_2$ represents an inclination of a straight line connecting two points on the density gradation curve corresponding to $N_{i+1}$ and $N_{i+2}$ when density gradation levels $N_{i-1}$, $N_i$, $N_{i+1}$ and $N_{i+2}$ are in the relationship of $N_{i-1}<N_i<N_{i+1}<N_{i+2}$, are obtained by selecting the combination satisfying the aforesaid relationship from density gradations expressible per minimum recording pixel. When using plural types of ink each having different density, and when making a difference of ink density to be greater for the higher ink density, it is possible to reduce wasteful combinations which are not selected from expressible density gradations, which is preferable. For example, it is preferable that each ink density satisfies the following relational expression;

$$d_n - d_{n-1} > d_{n-1} > d_{n-2} \geq \ldots \geq d_2 - d_1 - d_1 \text{ ($n$ represents integers of 4 and over)}$$

wherein, d represents each ink density and $d_n < d_{n+1}$ holds.

Further, it is preferable that each ink density satisfies the following relational expression;

$$d_n - d_{n-1} > d_{n-1} > d_{n-2} \geq \ldots \geq d_2 - d_1 \geq d_1 \text{ ($n$ represents integers of 4 and over)}$$

In the case of four types of ink each having different density wherein each of density is represented by each of $d_1$, $d_2$, $d_3$ and $d_4$ ($d_1<d_2<d_3<d_4$), $d_4-d_3>d_3-d_2 \geq d_2-d_1 \geq d_1$ is preferable.

In the case of four types of ink each having different density wherein each of density is represented by each of $d_1$, $d_2$ and $d_3$ ($d_1<d_2<d_3$), $d_3-d_2>d_2-d_1 \geq d_1$ is preferable.

Further, it is preferable that each ink density satisfies the following relational expression;

$$d_n = d_{n-1} \cdot r (r<1)$$

In the expression above, d represents each ink density and $d_n < d_{n+1}$ holds. The relationship of $r = \frac{1}{2}$ is more preferable.

In the foregoing, it is preferable that ink with the highest density is made to be of the density which is especially high. As an example of especially high density, there is an occasion where the maximum density is made to be especially great when comparing relationship in size between $(d_n - d_{n+1})$ including $d_n$ and $d_{n+1} - d_{n2}$ with relationship in size between other terms. Due to this, high density portions can be expressed with less ink efficiently, and it is possible to prevent problems of ink spreading caused by using a large amount of ink, and of insufficient density caused by prevention of ink spreading.

The relationship of each ink density stated above makes it possible to express density gradations efficiently.

EXAMPLE

Example 1

The present example is one to which the inventions of Structures 1 and 18 are applied.

Figure 20:
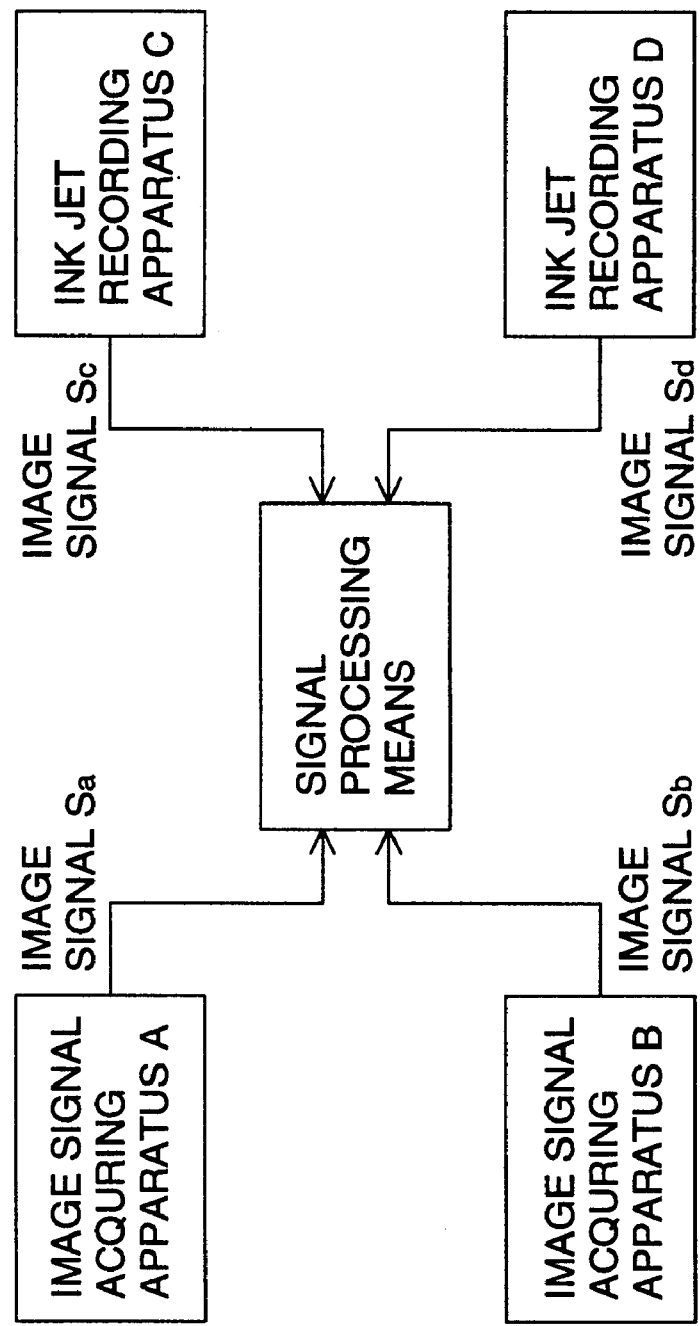
FIG. 20 is a diagram illustrating an example of the total arrangement relating to the invention.

As shown in FIG. 20, two different image acquiring apparatuses A and B and two different ink jet recording apparatuses C and D were connected with a signal processing means. An image processing means was composed of a computer available on the market, and SCSI interface board was used for each of image data.

Figure 21:
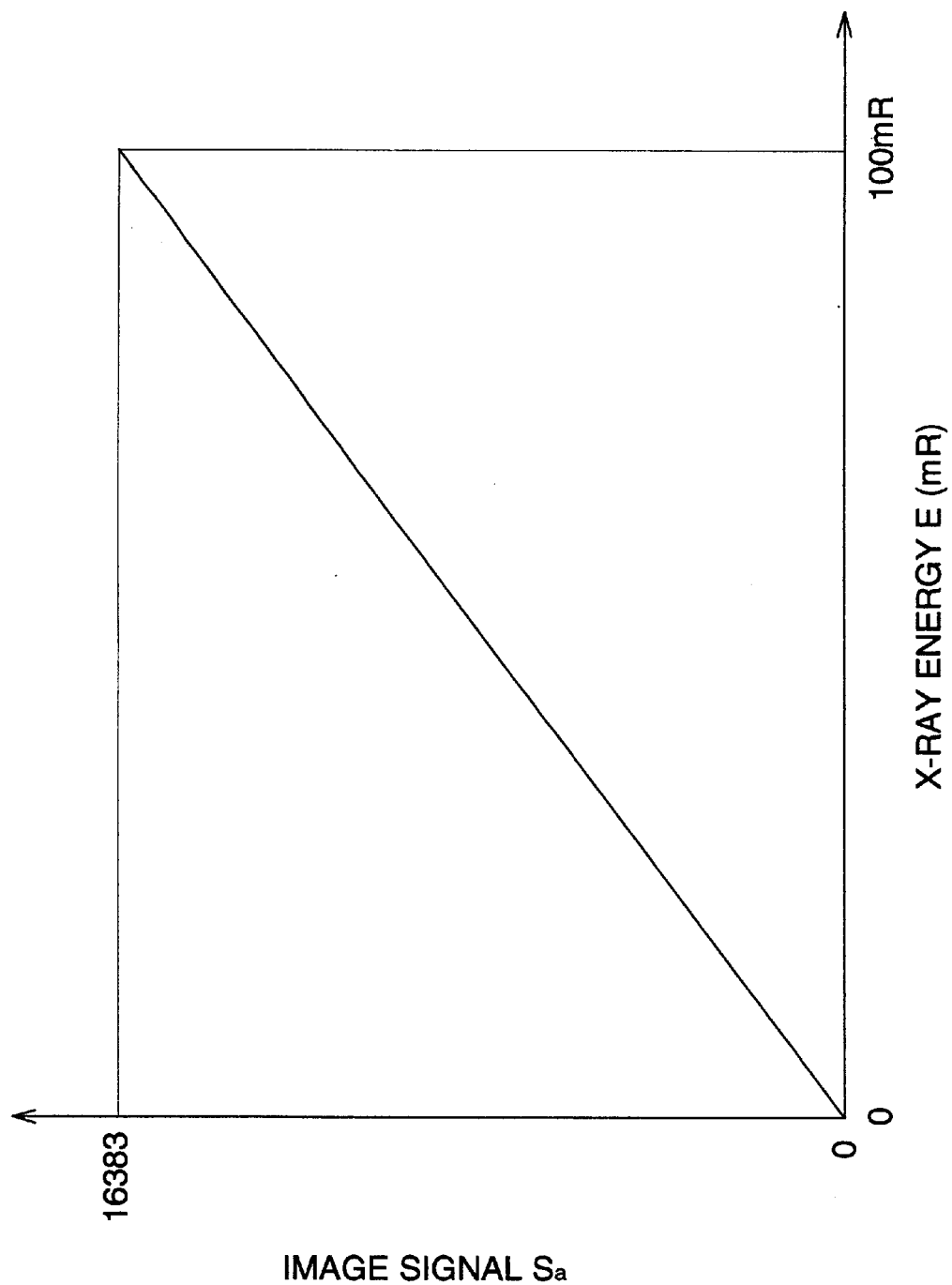
FIG. 21 is a diagram illustrating an example of input and output characteristics of an input means relating to the invention.

The image acquiring apparatus A is an apparatus which converts X-ray energy transmitted through an object into digital signals by a flat panel detector (hereinafter referred to as FPD) composed of a two-dimensional semiconductor detector. The density gradation number of image signal Sa obtained is 16384 (=14 bit, 0–16383), and it is in a linear relationship with X-ray energy E (unit mR) arrived at the detector as shown in FIG. 21, to be expressed by the following expression;

$$Sa=Ka \cdot E + Ma$$

wherein, Ka and Ma represent a constant. In the present example, Ka was made to be 1638.3 and Ma was made to be 0 so that signal values of 0–16383 may be assigned for X-ray amount of 0–10 mR.

Figure 22:
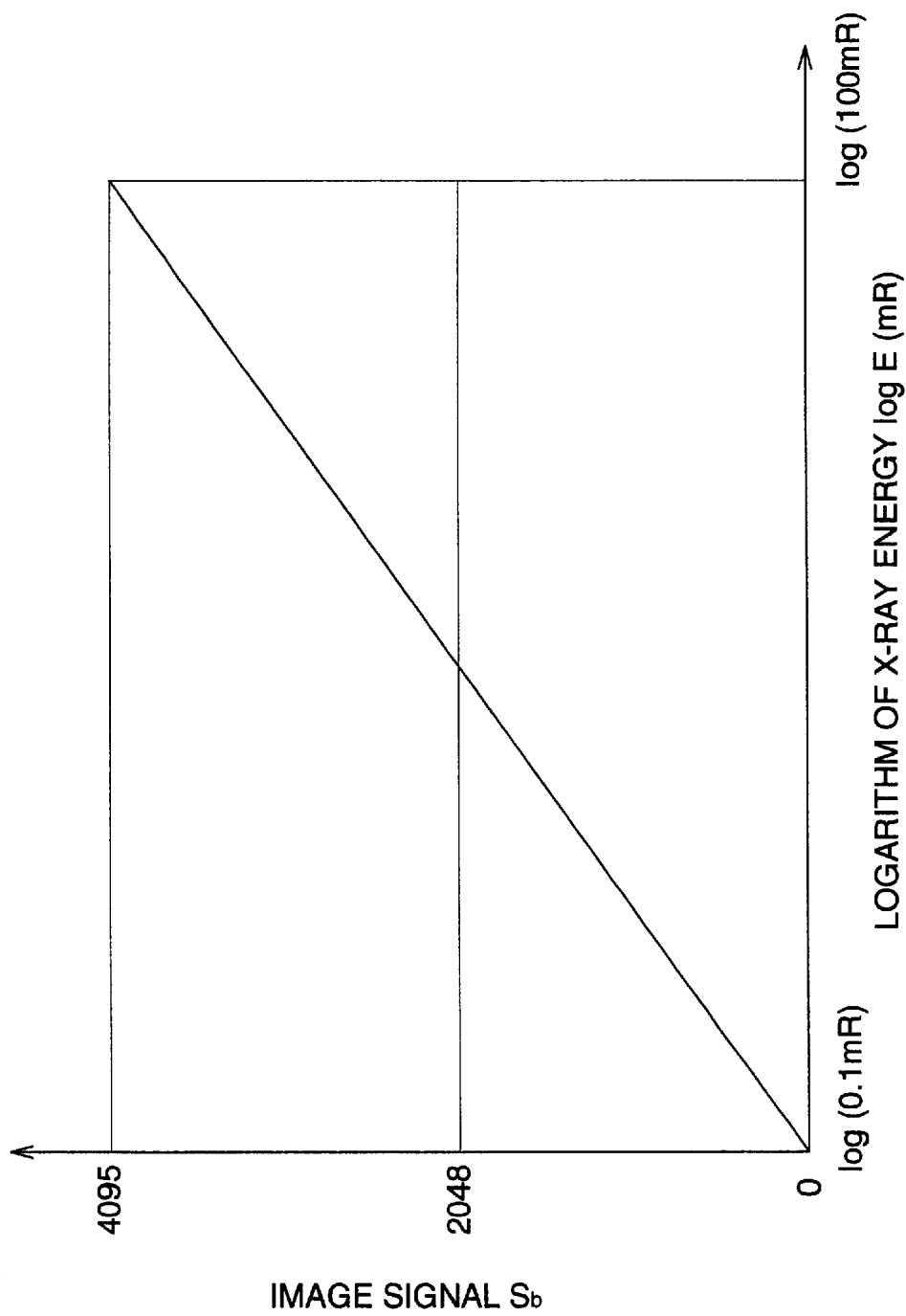
FIG. 22 is a diagram illustrating an example of input and output characteristics of an input means relating to the invention.

The image acquiring apparatus B is an apparatus which converts X-ray energy transmitted through an object into digital signals by detecting the X-ray energy with a stimulable phosphor detector. The density gradation number of image signal Sb obtained is 4095 (=12 bit, 0–4095), and it is in a linear relationship with X-ray energy E arrived at the detector as shown in FIG. 22, to be expressed by the following expression;

$$Sb=Kb \cdot \log(E/Eob) = Kb \cdot \log(E) + Mb$$

wherein, Eob represents standard energy, and Kb and Mb (=−Kb Log (Rob)) represent a constant. In the present example, Eob was made to be 0.1 mR, Kb was made to be 1365 and Mb was made to be 1365 so that signal values of 0–4095 may be assigned for X-ray amount in three figures from 0.1 mR to 100 mR.

In header information of the image signals stated above, there are included a sign to identify which of acquiring apparatuses A and B was used to obtain the signals and a sign to identify which of ink jet recording apparatuses C and D should be used for recording.

Figure 23:
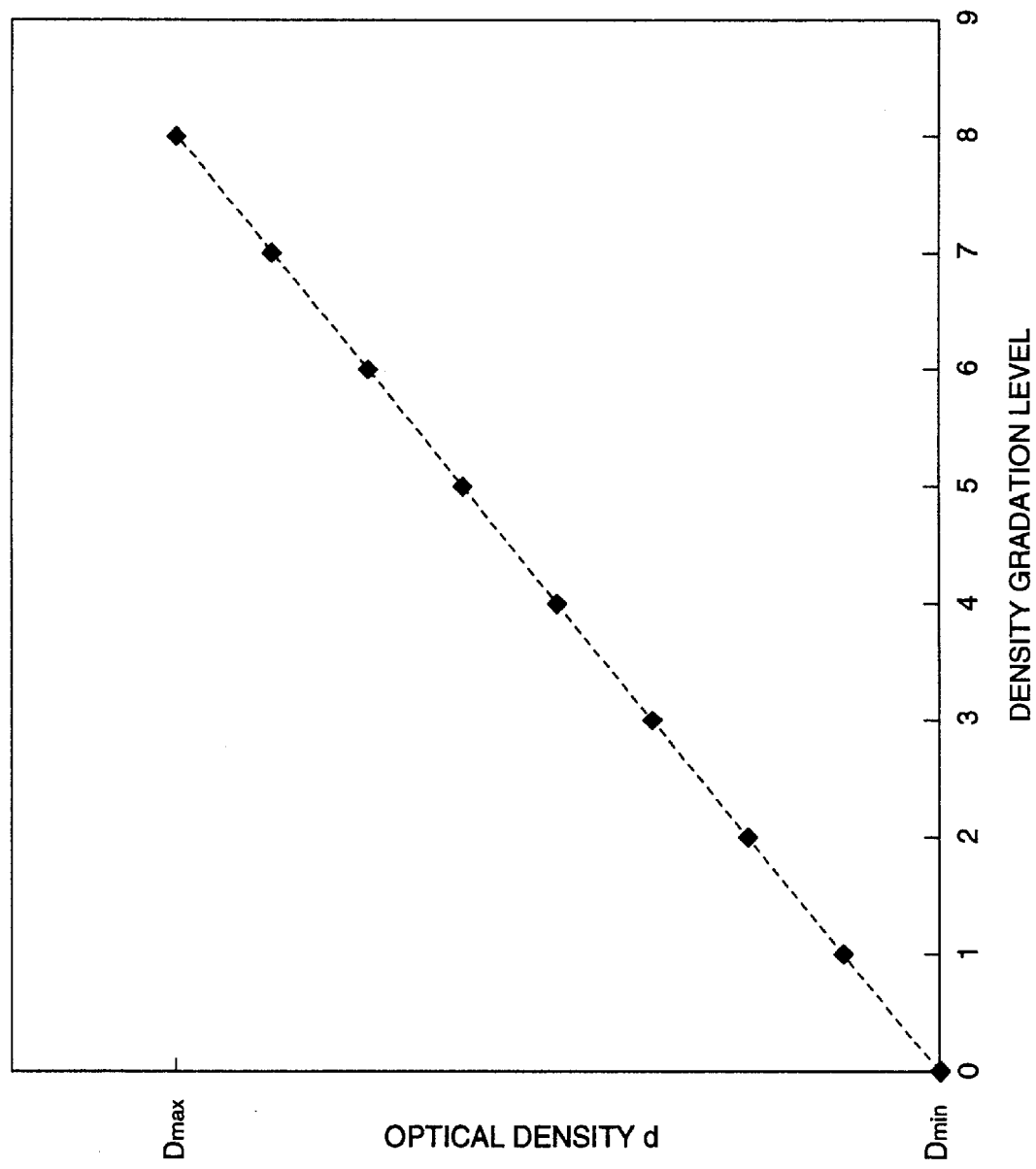
FIG. 23 is a diagram illustrating an example of density gradation characteristics relating to the invention.

Ink jet recording apparatus C was structured so that up to three droplets of black ink in two types each having different density (density ratio: 1:3) may be recorded for each minimum recording pixel at the minimum recording density of 240 dpi (minimum recording unit: 106 μm). There are 16 combinations of ink per minimum recording pixel, and from them, there were selected 9 combinations wherein the relationship of the optical density with density gradation level per minimum recording pixel is almost linear as shown in FIG. 23. Further, 1024 density gradations were expressed macroscopically through an error diffusion method, and an arrangement was made so that macroscopic optical density D to be recorded may be in the linear relationship with image signal Sc to be inputted in ink jet recording apparatus C (density gradation number: 1024=10 bit, 0–1023), and it may be expressed by the following expression.

$$D=(D\max-D\min) \times Sc/1023 + D\min$$

Figure 25:
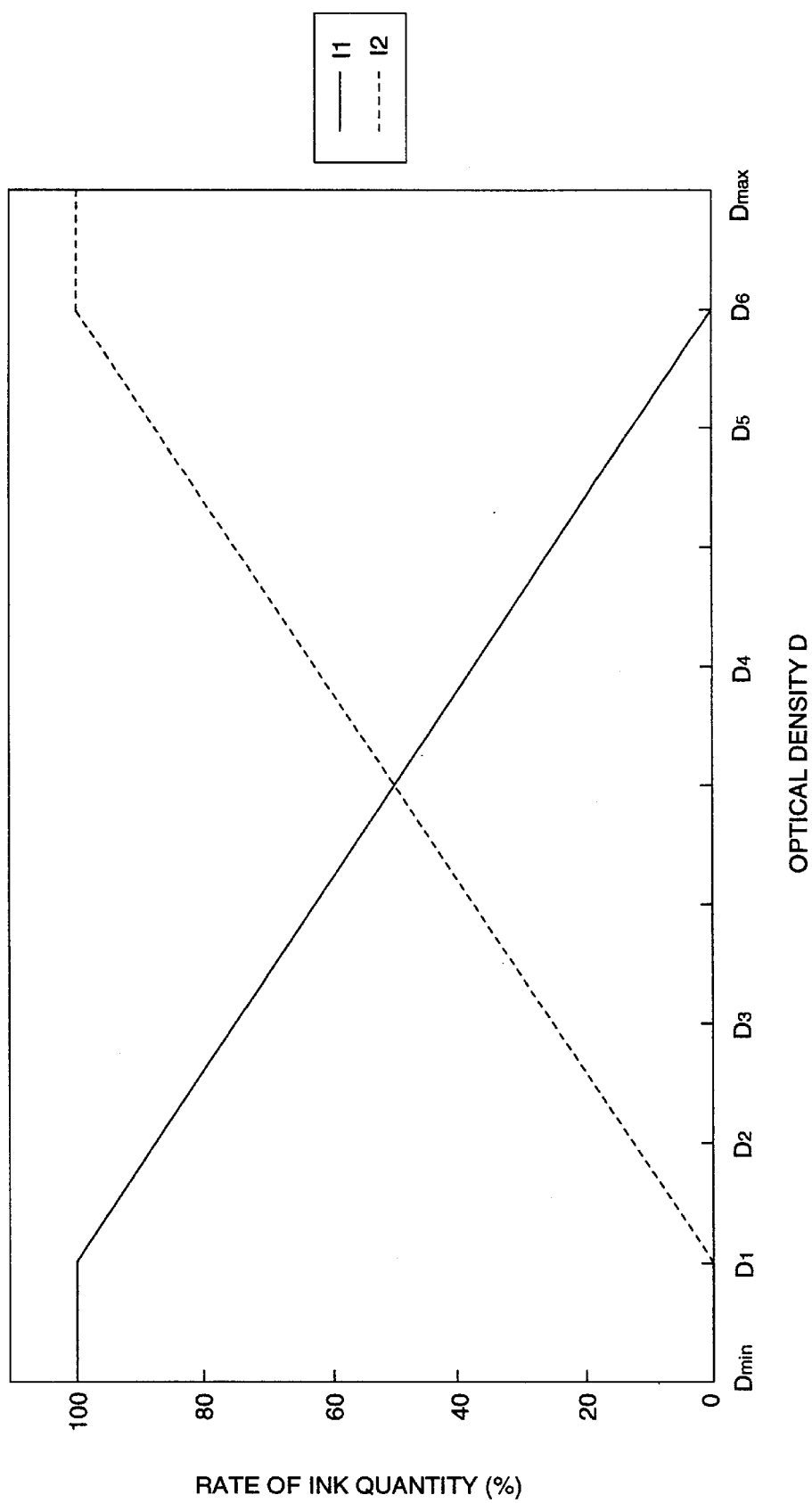
FIG. 25 is a diagram illustrating an example of relationship between a rate of ink quantity and optical density relating to the invention.

In the expression above, the macroscopic optical density D is a mean optical density which is shown when the same macroscopic density gradation levels are recorded uniformly on the prescribed area. Dmin represents optical density of a recording medium, and it was made to be 0.15, while Dmax was made to be 3.15. A rate of usage of ink in two types I and I to be used for macroscopic optical density D is shown in FIG. 25.

Figure 26:
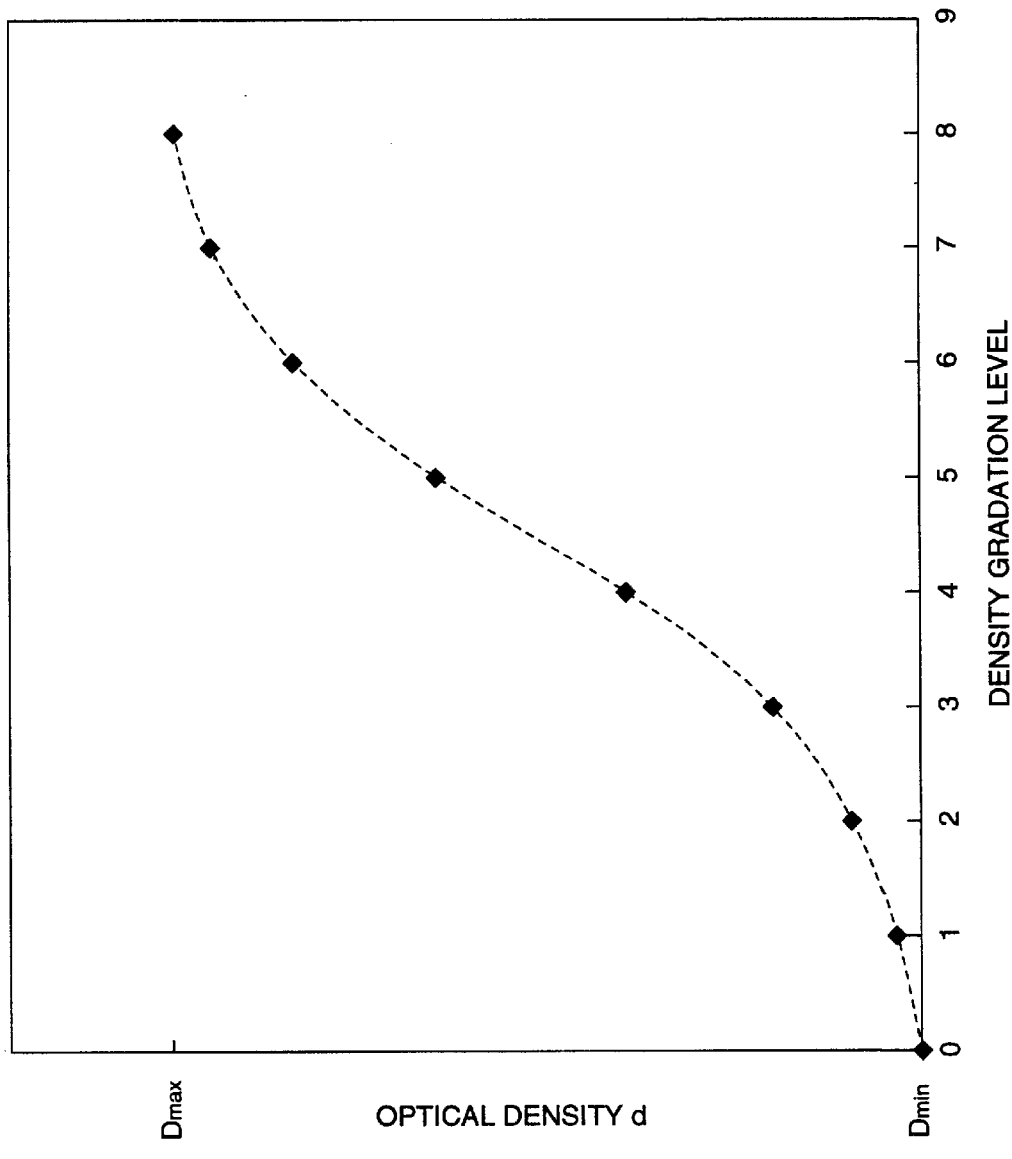
FIG. 26 is a diagram illustrating an example of density gradation characteristics relating to the invention.

Ink jet recording apparatus D was structured so that up to three droplets of black ink in two types each having different density (density ratio: 1:3) may be recorded for each minimum recording pixel at the minimum recording density of 240 dpi (minimum recording unit: 106 μm). There are 16 combinations of ink per minimum recording pixel, and from them, there were selected 9 combinations wherein the relationship of the optical density with density gradation level per minimum recording pixel is one shown in FIG. 26.

Figure 27:
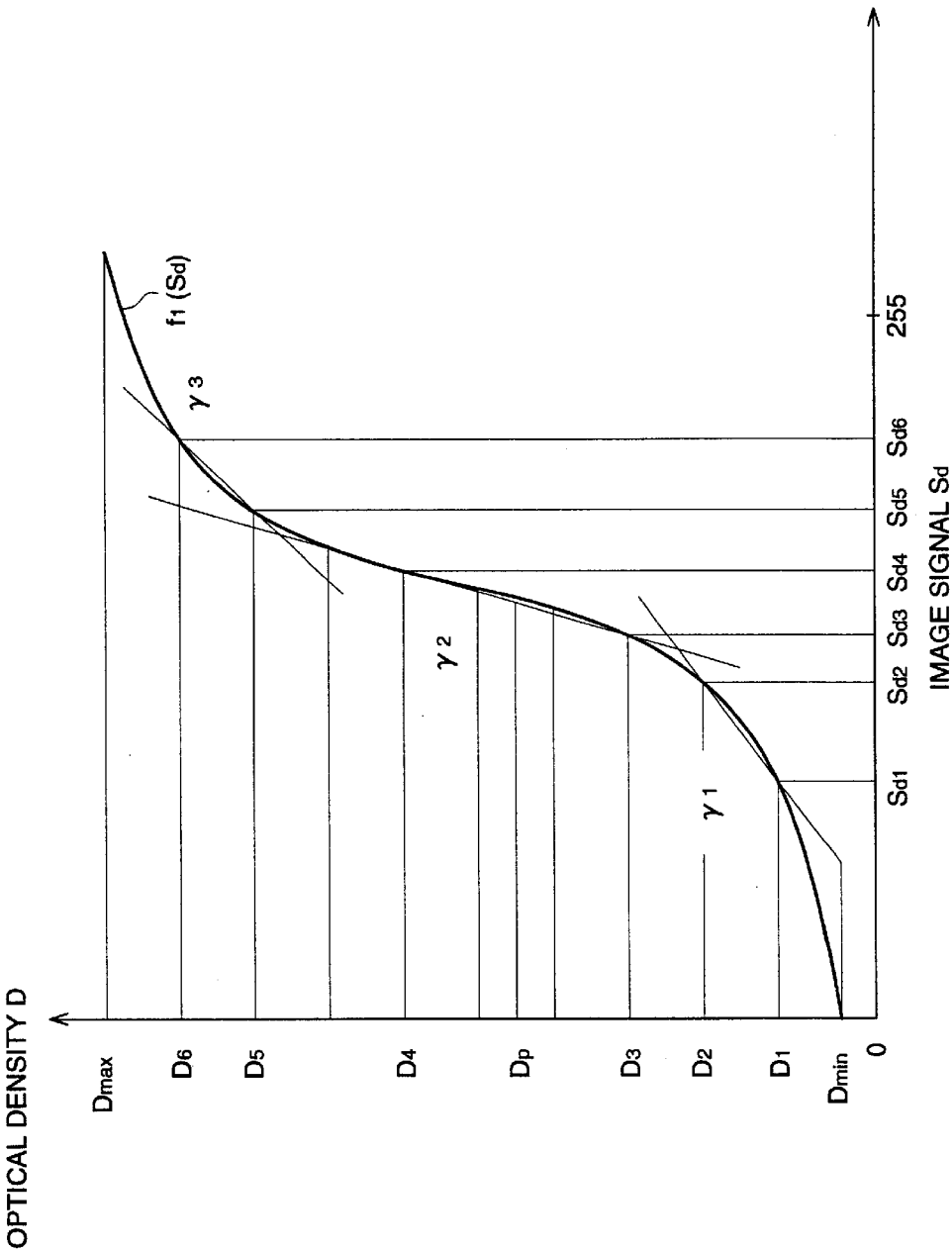
FIG. 27 is a diagram illustrating an example of input and output characteristics of an ink jet printer relating to the invention.

Further, 256 density gradations were expressed macroscopically through an error diffusion method, and an arrangement was made so that macroscopic optical density D to be recorded may show function f1 (Sd) as shown in FIG. 27, for image signal Sd to be inputted in ink jet recording apparatus D (density gradation number: 256=8 bit, 0–255). In this case, Dmin is optical density of a recording medium which is 0.15, while Dmax is 3.15, including $\gamma_1=1.1/85$, $\gamma_2=2.2/85$ and $\gamma_3=1.7/85$. When the following expression holds, $$Dp=0.45 \, D\max + 0.55 \, D\min$$

the curve was made to be convex downward in the range of Dmin<D<Dp, the curve was made to be convex upward in the range of Dp<D<Dmax, and a point corresponding to Dp was made to be a point of inflection. A rate of usage of ink in two types I and I to be used for macroscopic optical density D is shown in FIG. 25.

Figure 28:
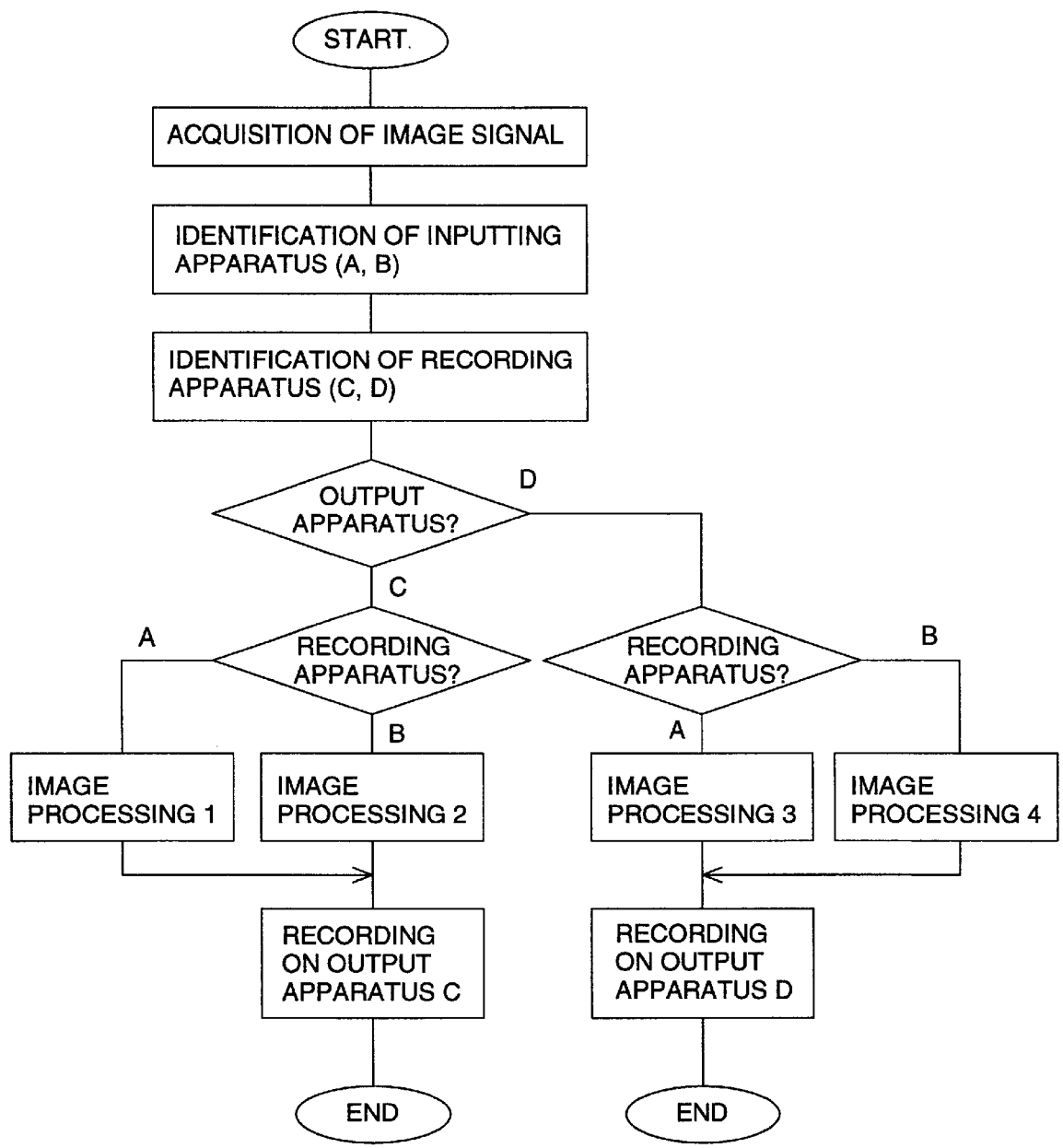
FIG. 28 is a diagram illustrating an example of a processing flow relating to the invention.

FIG. 28 shows a flow chart of the present example. Image signals are obtained by image acquiring apparatus A or image acquiring apparatus B based on intensity of X-rays transmitted through an object. In the present example, a front view of a chest region of a human body was radiographed under the conditions of X-ray tube voltage of 125 kVp, X-ray tube focal point#detector distance of 2 m, tube current of 200 mA and of irradiation time of 16 msec.

In this case, a sign to identify a previously established ink jet recording apparatus to which an output is made is written in a header of image data together with a sign to identify an image acquiring apparatus. An image processing means which has received image signals Sa or Sb reads a header of image data, and discriminates between an image acquiring apparatus by which an image was obtained and an ink jet recording apparatus to which an output is made. For the combination of image acquiring apparatuses (A, B) and ink jet recording apparatuses (C, D), each appropriate image processing (1)–(4) is conducted, and the, the image signal after the processing is sent to the prescribed ink jet recording means, and image recording is conducted on a transparent recording medium. Contents of image processing (1)–(4) are shown below.

Image Processing (1) (Image Inputting Means A, ink Jet Recording Apparatus C)
Following conversion is made.

$$S=1365 \times \log(Sa/163.83)+1365$$

$$Sc=f_2(S) \times 1023/4095$$

Figure 29:
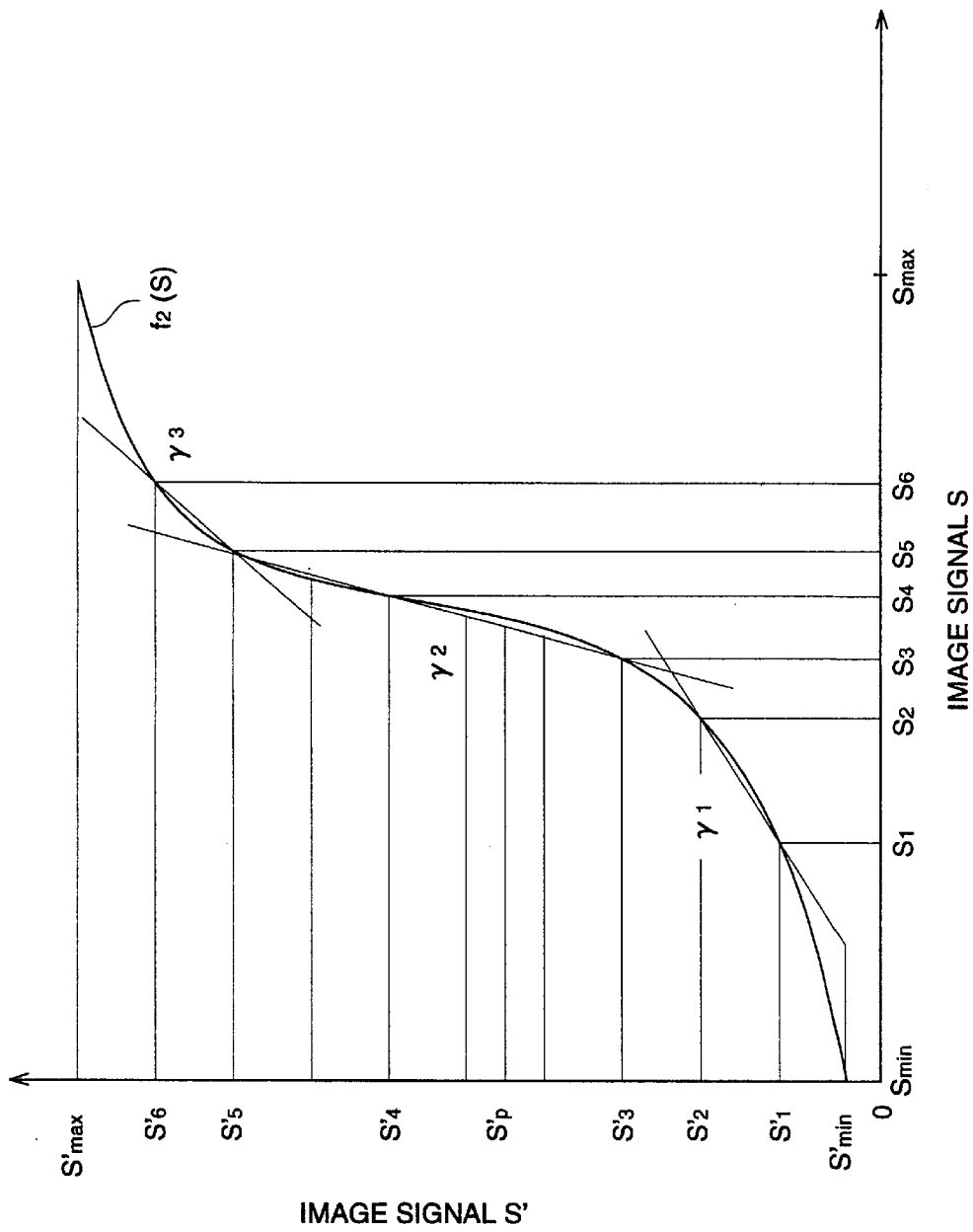
FIG. 29 is a diagram illustrating an example of image processing relating to the invention.

In the foregoing, $f_2$ is a function form shown in FIG. 29. In this case, Smin=S'min=0, Smax=S'max=4095, $\gamma_1$=1.1, $\gamma_2$=2.2 and $\gamma_3$=1.7 hold. Further, under the condition of S'p=0.45 S'max+0.55 S'min, the curve was made to be convex downward in the range of S'min<S'<S'p, the curve was made to be convex upward in the range of S'p<S'<S'max, and a point corresponding to S'p was made to be a point of inflection.

Image Processing (2) (Image Acquiring Apparatus B, Ink Jet Recording Apparatus C)
Following conversion is made.

$$Sc=f_2(Sb) \times 1023/4095$$

In the foregoing, $f_2$ is a function form shown in FIG. 29.

Image Processing (3) (Image Acquiring Apparatus A, Ink Jet Recording Apparatus D)
Following conversion is made for Sa.

$$Sd=85 \times \log(Sa/163.83)+85$$

Image Processing (4) (Image Acquiring Apparatus B, Ink Jet Recording Apparatus D)
Following conversion is made for Sb.

$$Sd'=Sb \times 255/4095$$

Example 2

The present example is one to which the inventions of Structures 1 and 18 are applied.

Figure 30:
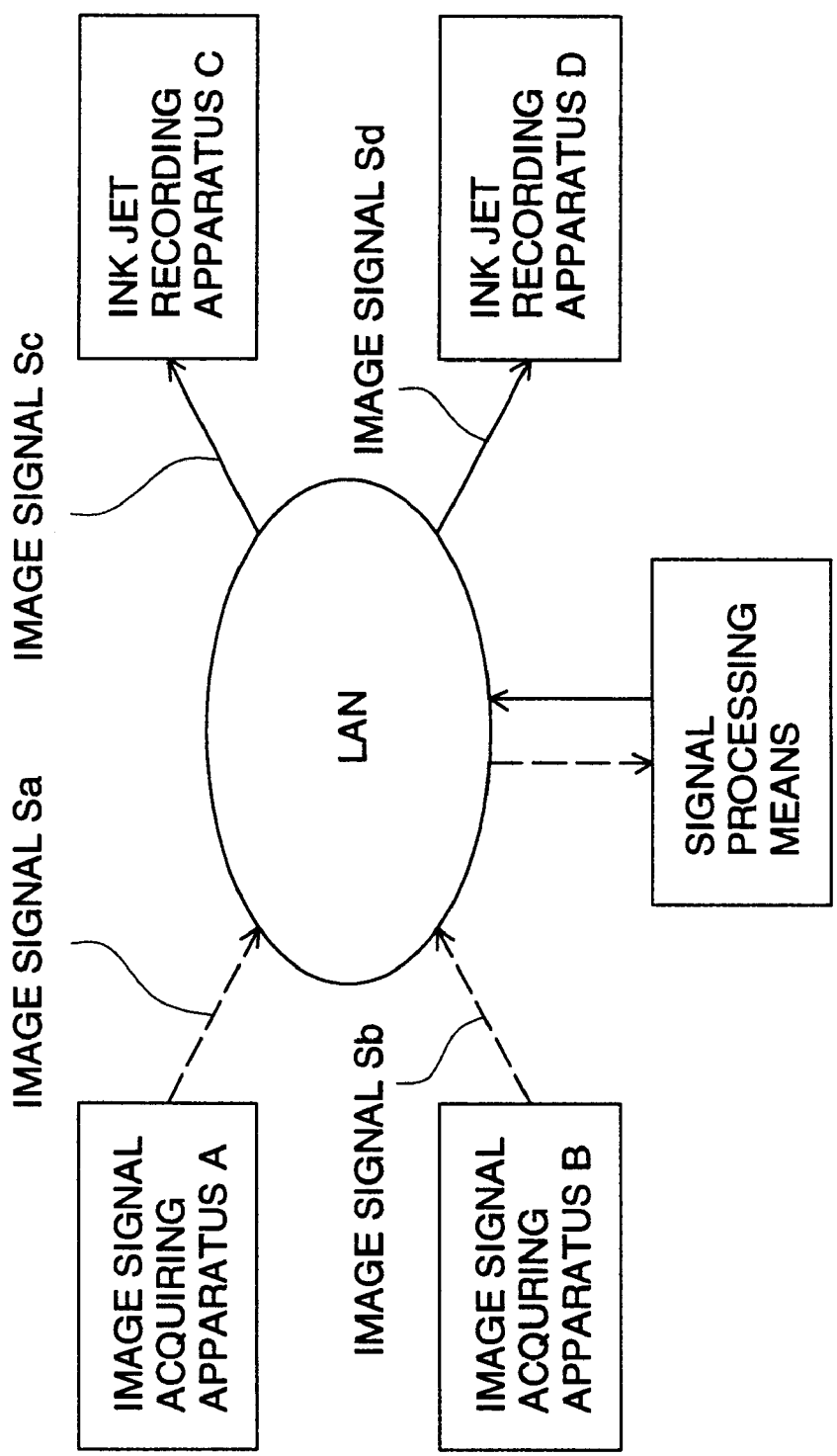
FIG. 30 is a diagram illustrating an example of the total arrangement relating to the invention.

Example 2 is the same as Example 1, with the exception that an image acquiring apparatus, an image processing means and an ink jet recording apparatus are connected through a local area network (LAN) composed of Ethernet as shown in FIG. 30.

Figure 31:
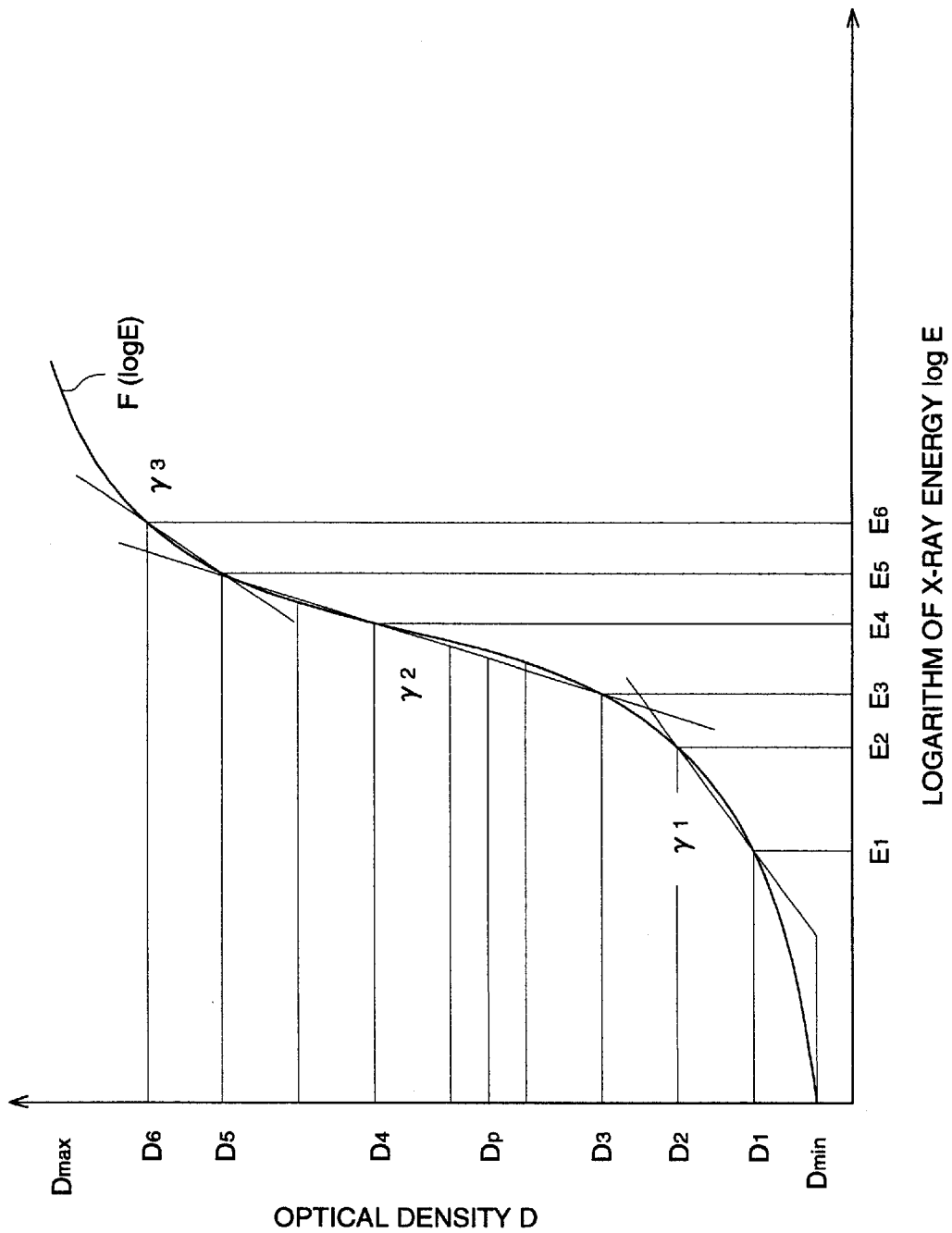
FIG. 31 is a diagram illustrating a characteristic curve related to the invention.

In Example 1 and Example 2, it was possible to make an image hard copy wherein function F (log E) for X-ray energy E transmitted through an object with macroscopic optical density D of recorded image turns into a monotone increase function shown in FIG. 31, even when an image was obtained by any of image acquiring apparatuses A and B and even when recording was conducted by any of ink jet recording apparatuses C and D. In this case, Dmin is optical density of a recording medium which is 0.15 and Dmax is 3.15, and $\gamma_1$=1.1, $\gamma_2$=2.2 and $\gamma_3$=1.7 hold. Under the assumption of the following expression, $$Dp=0.45 \, Dmax+0.55 \, Dmin$$

the curve is convex downward in the range of Dmin<D<Dp, the curve is convex upward in the range of Dp<D<Dmax, and a point corresponding to Dp is a point of inflection.

As a result, the number of recording density gradations within a density range of $D_1 \leq D \leq D_2$ was 93 on ink jet recording apparatus C, and it was 23 on ink jet recording apparatus D. Further, the number of density gradations within a density range of DDD was 139 on ink jet recording apparatus C, and it was 34 on ink jet recording apparatus D.

Comparative Example

Figure 32:
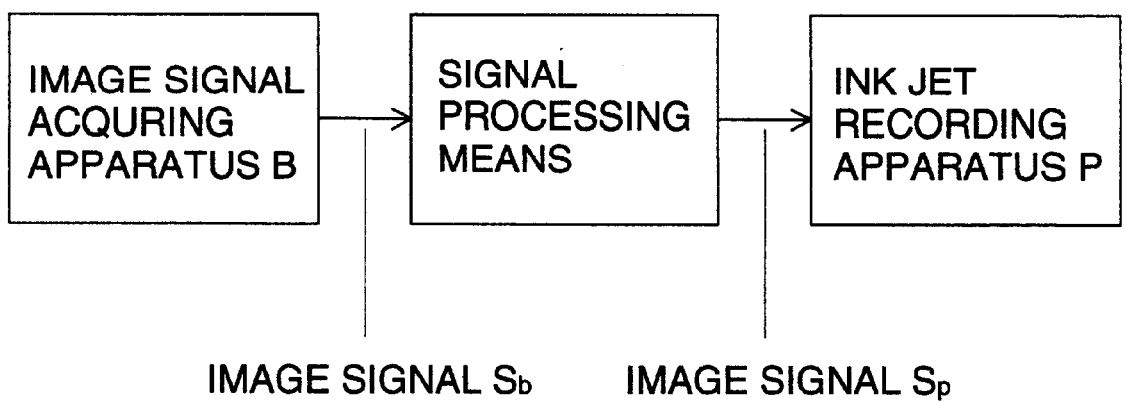
FIG. 32 is a diagram illustrating an example of the total arrangement relating to the invention.
Figure 33:
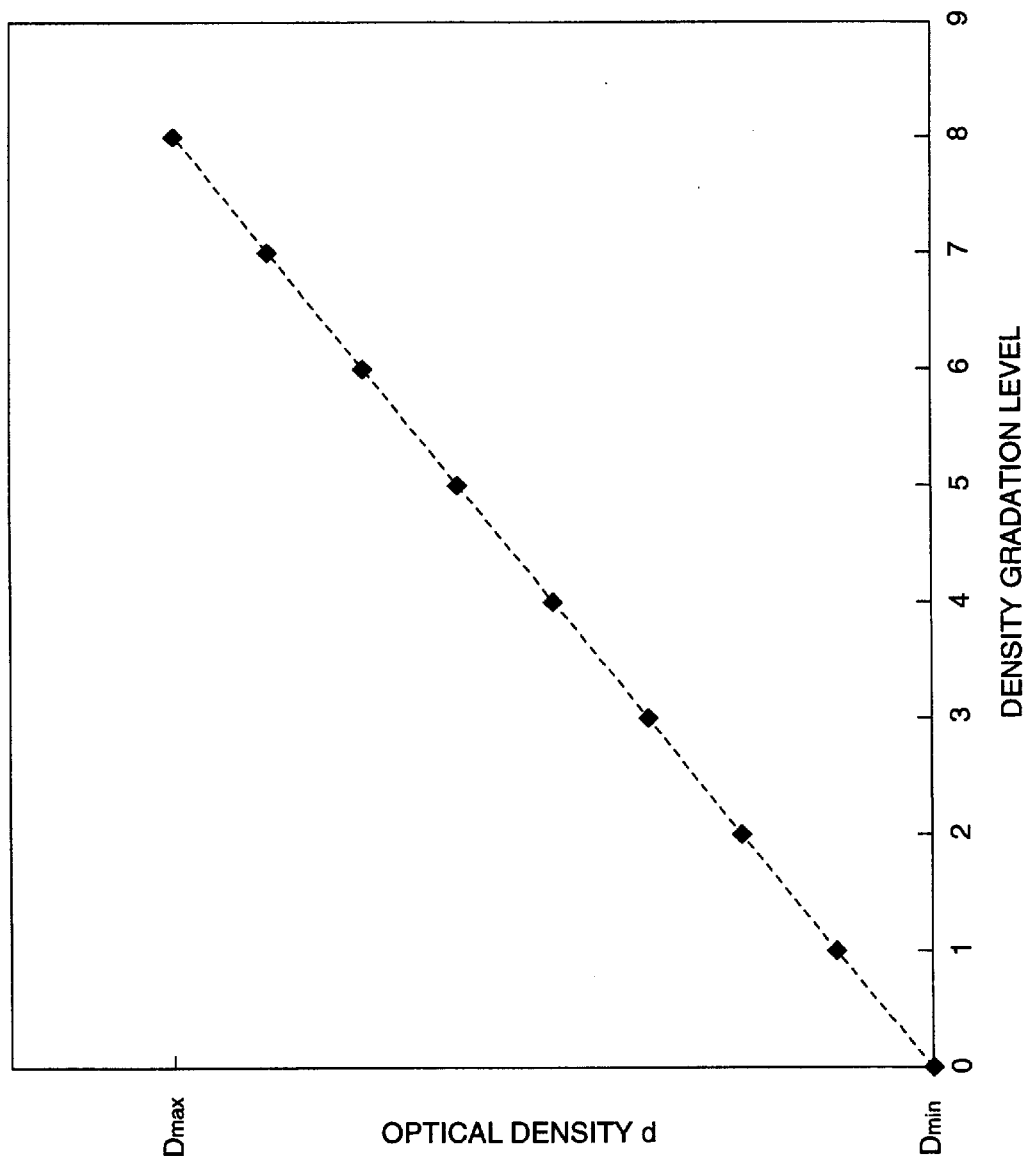
FIG. 33 is a diagram illustrating an example of density gradation characteristics relating to the comparative example.
Figure 34:
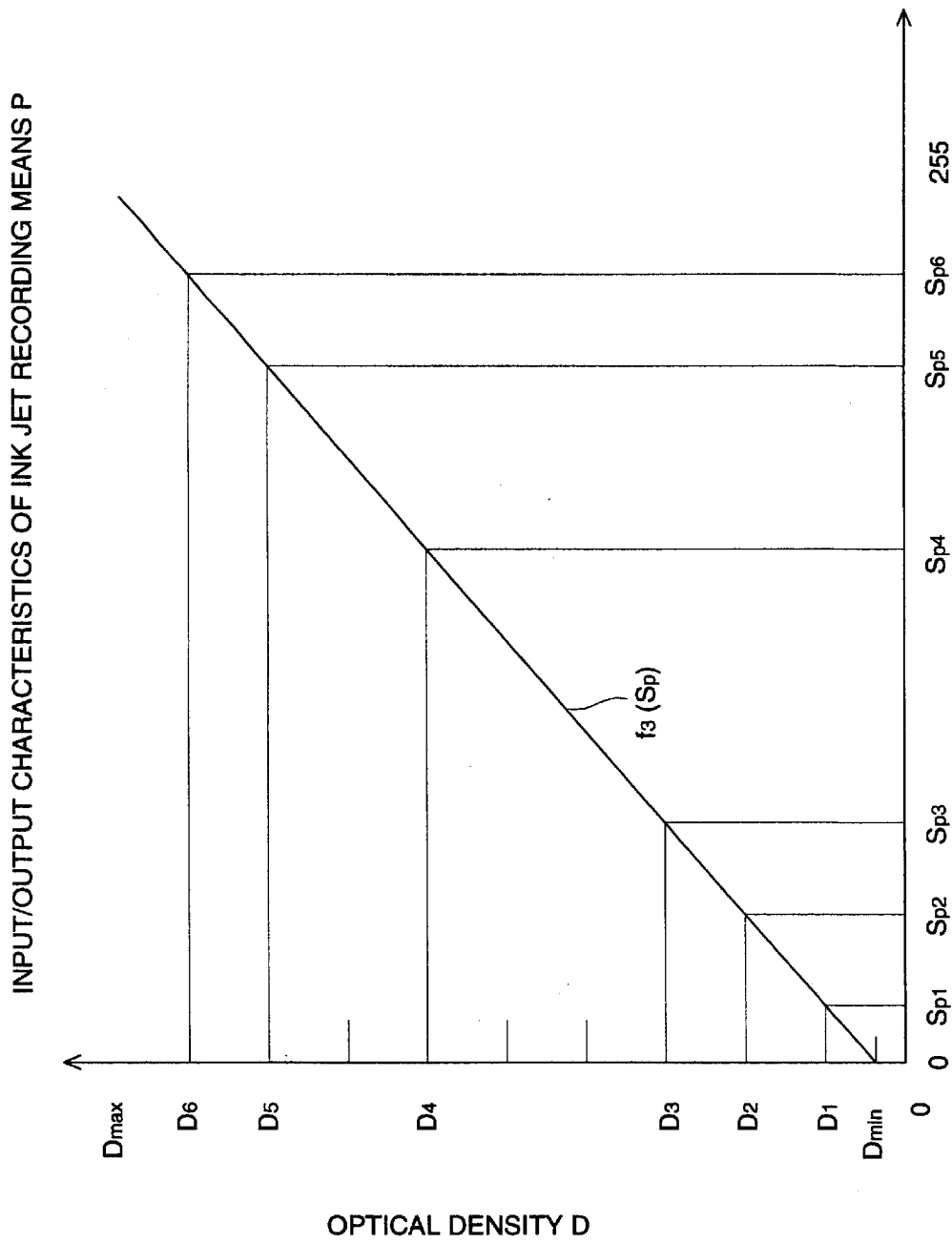
FIG. 34 is a diagram illustrating an example of image processing relating to the comparative example.

There was employed the following structure which is the same as a conventional ink jet recording method. As shown in FIG. 32, an image was obtained from image acquiring apparatus B in the same way as in Example 1 with the exception that image acquiring apparatus B and ink jet recording apparatus P were connected to a signal processing means, and then, recording was conducted by ink jet recording apparatus P after conducting image processing (5). Ink jet recording apparatus P was structured so that up to three droplets of black ink in two types each having different optical density (optical density ratio: 1:3) may be recorded for each minimum recording pixel at the minimum recording density of 240 dpi (minimum recording unit: 106 $\mu$m). There are 16 combinations of ink per minimum recording pixel, and from them, there were selected 9 combinations wherein the relationship of the optical density with density gradation level per minimum recording pixel is one shown in FIG. 33. Further, 256 density gradations were expressed macroscopically through an error diffusion method, and an arrangement was made so that macroscopic optical density D to be recorded may show function $f_3$ (Sp) as shown in FIG. 34, for image signal Sp to be inputted in ink jet recording apparatus P (density gradation number: 256=8 bit, 0–255). In this case, Dmin is optical density of a recording medium which is 0.15, while Dmax is 3.15, including $\gamma_1$=1.0/85, $\gamma_2$=1.0/85 and $\gamma_3$=1.0/85. The contents of image processing (5) are as follows.

Image Processing (5)
The following conversion is conducted.

$$Sp=Sb \times 255/4095$$

Figure 35:
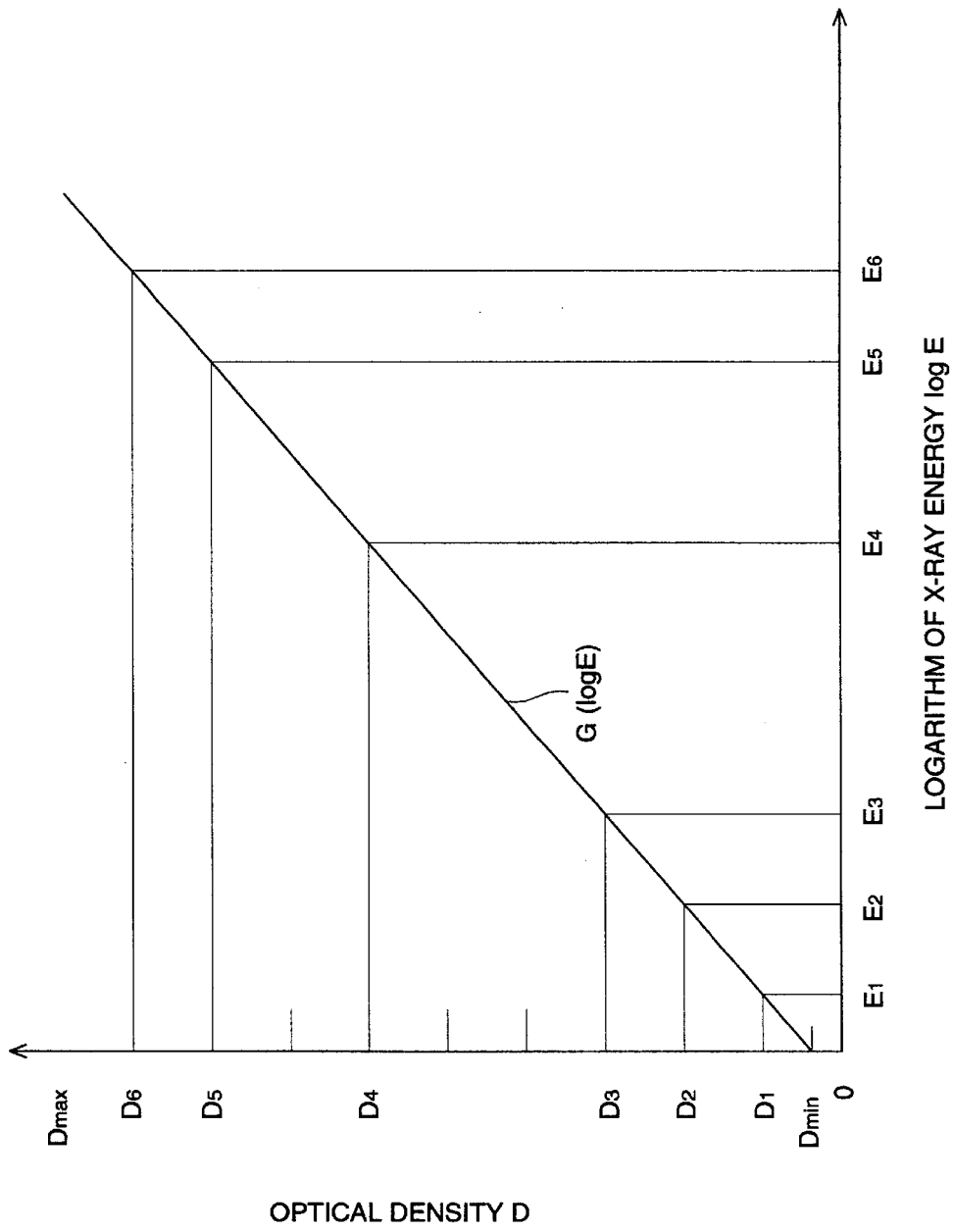
FIG. 35 is a diagram illustrating a characteristic curve related to the comparative example.

In Comparative Example 1, it was possible to obtain an image hard copy wherein function G (log E) for energy E transmitted through an object with macroscopic optical density D of recorded image turns into a monotone increase function shown in FIG. 35. In this case, Dmin is optical density of a recording medium which is 0.15 and Dmax is 3.15, and $\gamma_1$=2.0, $\gamma_2$=2.0 and $\gamma_3$=2.0 hold.

As a result, the number of recording density gradations within a density range of $D_1 \leq D \leq D_2$ was 25 and the number of density gradations within a density range of $D_3 \leq D \leq D_4$ was 76.

Comparative Example 2

Figure 36:
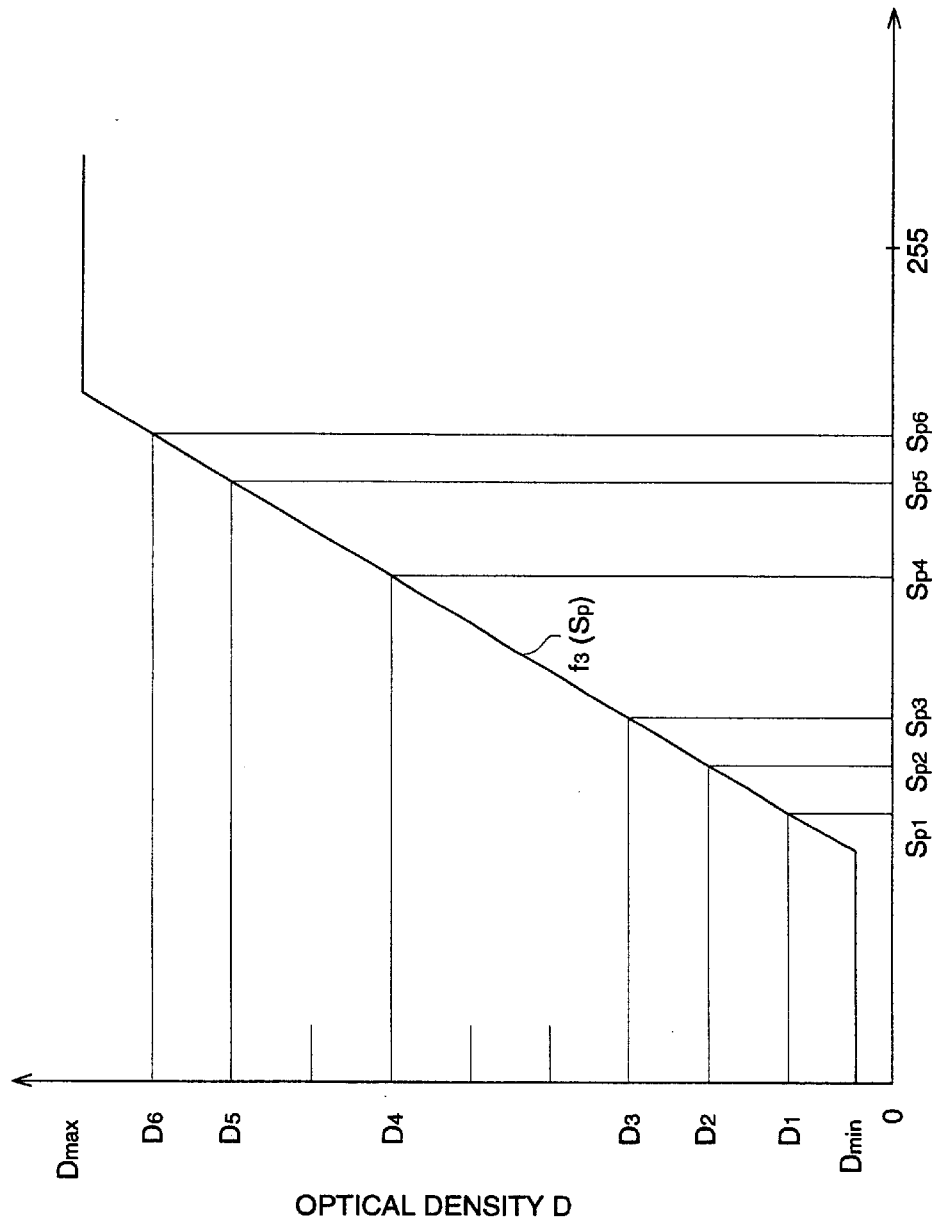
FIG. 36 is a diagram illustrating an example of image processing relating to the comparative example.

An image was obtained from image acquiring apparatus B in the same way as in Example 1 with the exception that ink jet recording apparatus P1 was connected in place of ink jet recording apparatus P, and then, recording was conducted by ink jet recording apparatus P1 after conducting image processing (5). Ink jet recording apparatus P1 was made to be of the same structure as that in ink jet recording apparatus P with the exception that macroscopic optical density D to be recorded for image signal Sp (density gradation number: 256=8 bit, 0–255) to be inputted in ink jet recording apparatus P was made to turn into function $f_3$ (Sp) shown in FIG. 36. In this case, Dmin is optical density of a recording medium which is 0.15, while Dmax is 3.15, including $\gamma_1$=2.0/85, $\gamma_2$=2.0/85 and $\gamma_3$=2.0/85. The contents of image processing (5) are as follows.

Image Processing (5)
The following conversion is conducted.

$$Sp=Sb \times 255/4095$$

Figure 37:
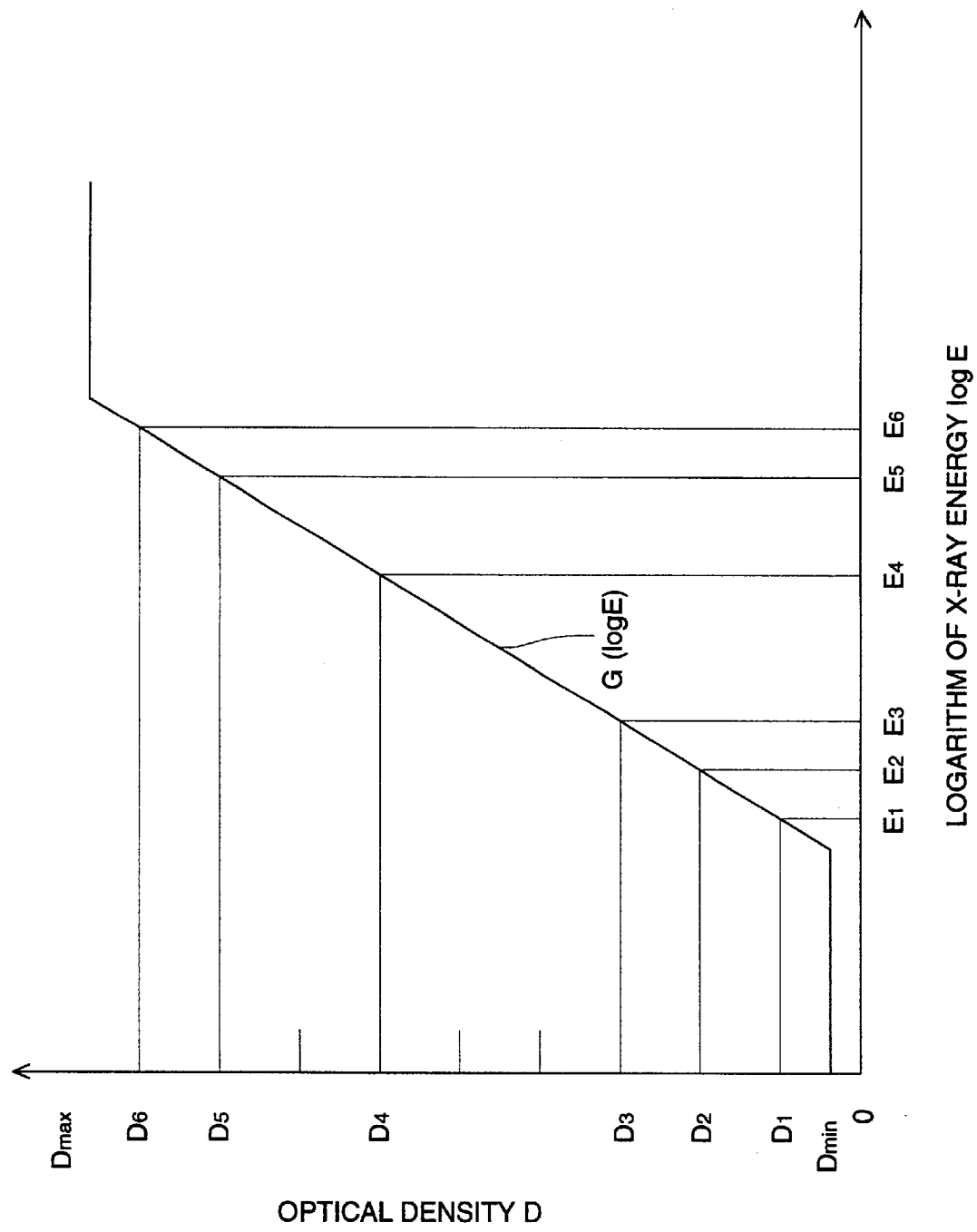
FIG. 37 is a diagram illustrating a characteristic curve related to the comparative example.
Figure 38:
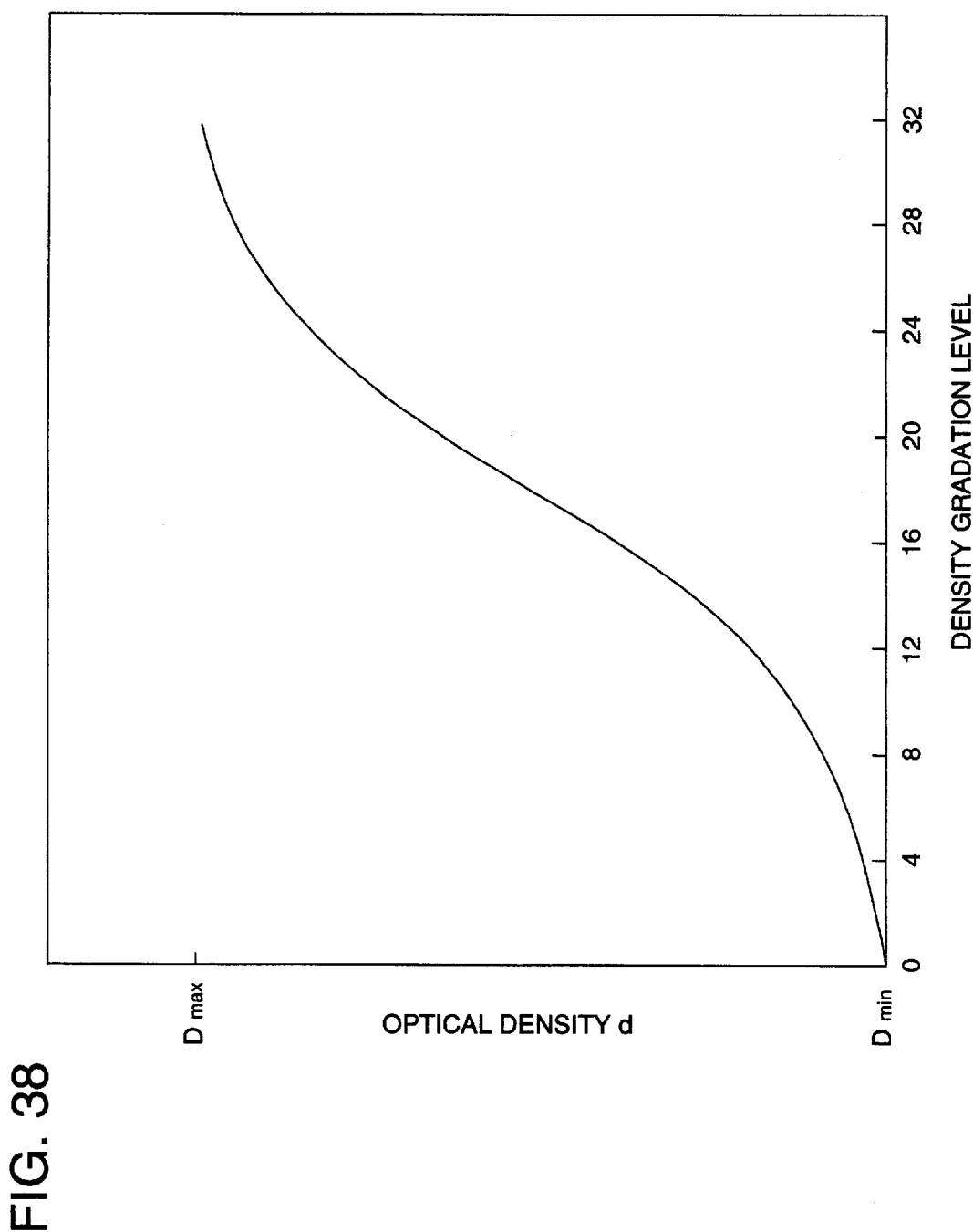
FIG. 38 is a diagram illustrating an example of density gradation characteristics relating to the comparative example.

In Comparative Example 2, it was possible to obtain an image hard copy wherein function G (log E) for energy E transmitted through an object with macroscopic optical density D of recorded image turns into a monotone increase function shown in FIG. 37. In this case, Dmin is optical density of a recording medium which is 0.15 and Dmax is 3.15, and $\gamma_1=2.0$, $\gamma_2=2.0$ and $\gamma_3=2.0$ hold.

As a result, the number of recording density gradations within a density range of $D_1 \leq D \leq D_2$ was 12 and the number of recording density gradations within a density range of $D_3 \leq D \leq D_4$ was 38.

Example 3

The present example is one to which the inventions of Structures 1, 18, 41 and 49 are applied.

Figure 39:
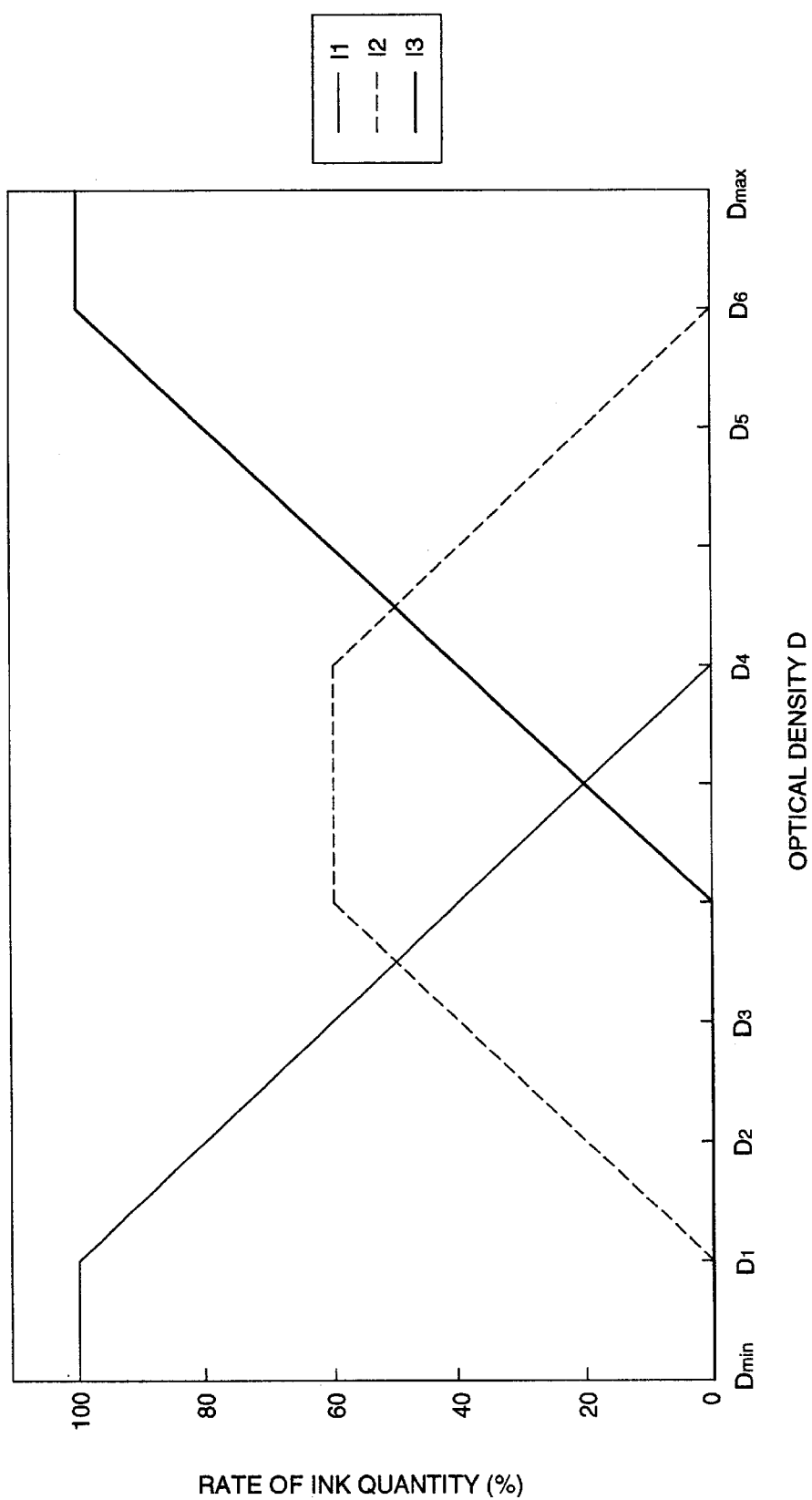
FIG. 39 is a diagram illustrating an example of relationship between a rate of ink quantity and optical density relating to the invention.

An image was obtained from image acquiring apparatus B in the same way as in Example 1 with the exception that ink jet recording apparatus D1 was connected in place of ink jet recording apparatus D, and the image was recorded by the ink jet recording apparatus D1 after image processing (4). In this case, ink jet recording apparatus D1 was structured so that up to three droplets of black ink $I_1$, $I_2$ and $I_3$ in three types each having different density (optical density ratio: 1:2:3) may be recorded for each minimum recording pixel at the minimum recording density of 360 dpi (minimum recording unit: 70 μm). There are 64 combinations of ink per minimum recording pixel, and from them, there were selected 38 combinations wherein the relationship of the optical density with density gradation level per minimum recording pixel is one shown in FIG. 37. Further, 256 density gradations were expressed macroscopically through an error diffusion method, and an arrangement was made so that macroscopic optical density D to be recorded may show function $f_1$ (Sd) as shown in FIG. 27, for image signal Sd (density gradation number: 256=8 bit, 0–255) to be inputted in ink jet recording apparatus $D_1$. In this case, Dmin is optical density of a recording medium which is 0.15, while Dmax is 3.15, including $\gamma_1=1.1/85$, $\gamma_2=2.2/85$ and $\gamma_3=1.7/85$. When the following expression holds, $$Dp=0.45\ Dmax+0.55\ Dmin$$

the curve was made to be convex downward in the range of Dmin<D<Dp, the curve was made to be convex upward in the range of Dp<D<Dmax, and a point corresponding to Dp was made to be a point of inflection. A rate of usage of ink in three types $I_1$, $I_2$ and $I_3$ to be used for macroscopic optical density D is shown in FIG. 39.

Example 4

The present example is one to which the inventions of Structures 41 and 49 are applied.

An image was obtained from image acquiring apparatus B in the same way as in Example 3 with the exception that ink jet recording apparatus D2 was connected in place of ink jet recording apparatus D1, and the image was recorded by the ink jet recording apparatus D2 after image processing (4). In this case, the ink jet recording apparatus D2 was structured to be the same as that in the ink jet recording apparatus D1 with the exception that minimum recording density is 480 dpi (minimum recording unit 53 μm).

Example 5

The present example is one to which the inventions of Structures 1, 18, 39, 40, 41 and 49 are applied.

Figure 40:
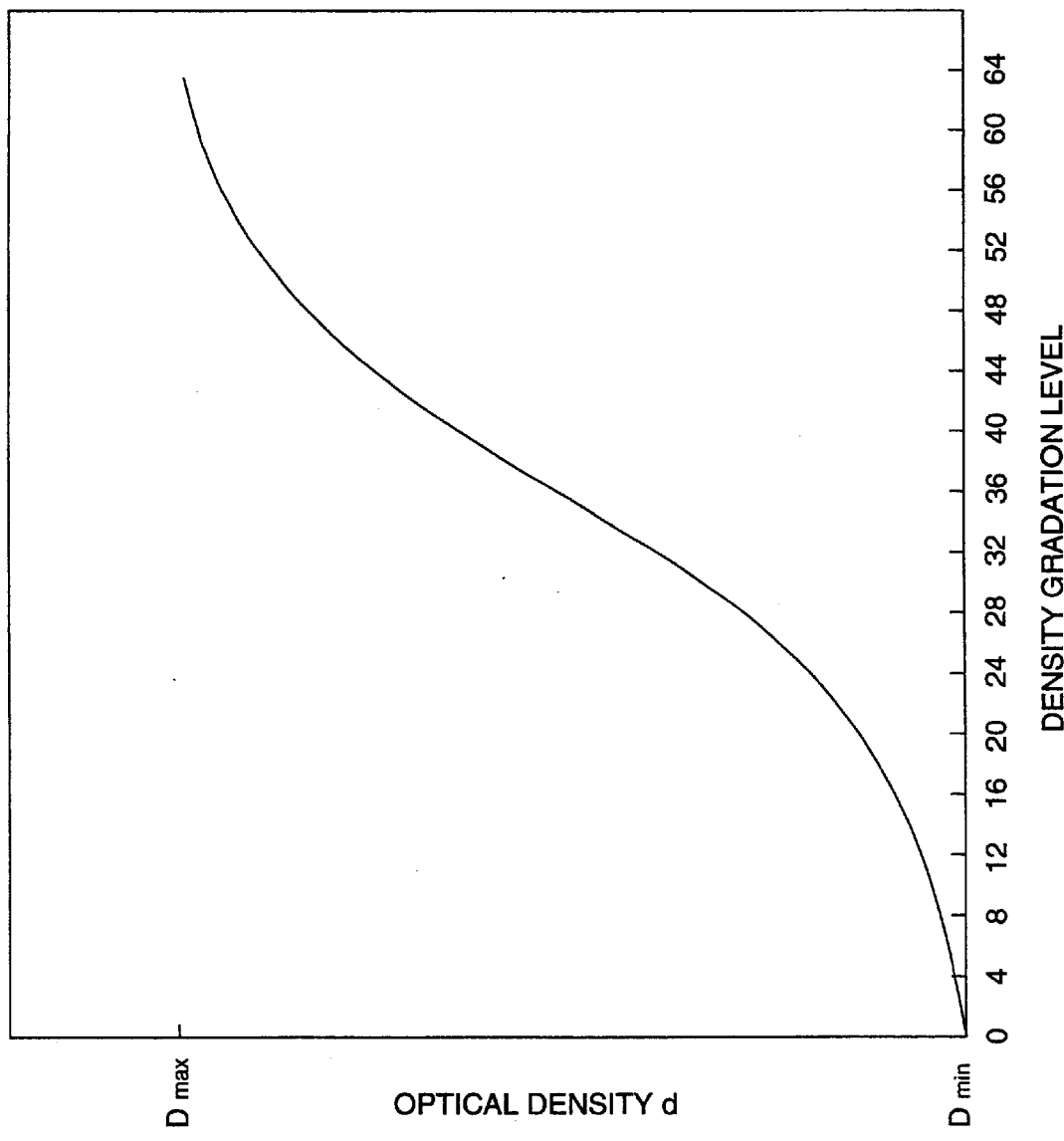
FIG. 40 is a diagram illustrating an example of density gradation characteristics relating to the invention.

An image was obtained from image acquiring apparatus B in the same way as in Example 3 with the exception that ink jet recording apparatus D3 was connected in place of ink jet recording apparatus D1, and the image was recorded by the ink jet recording apparatus D3 after image processing (4). In this case, ink jet recording apparatus D2 was structured so that up to two droplets of black ink $I_1$, $I_2$, $I_3$ and $I_4$ in four types (optical density ratio: 1:2:3:4) may be recorded for each minimum recording pixel at the minimum recording density of 480 dpi (minimum recording unit: 53 μm). There are 81 combinations of ink per minimum recording pixel, and from them, there were selected 65 combinations wherein the relationship of the optical density with density gradation level per minimum recording pixel is one shown in FIG. 40.

Figure 41:
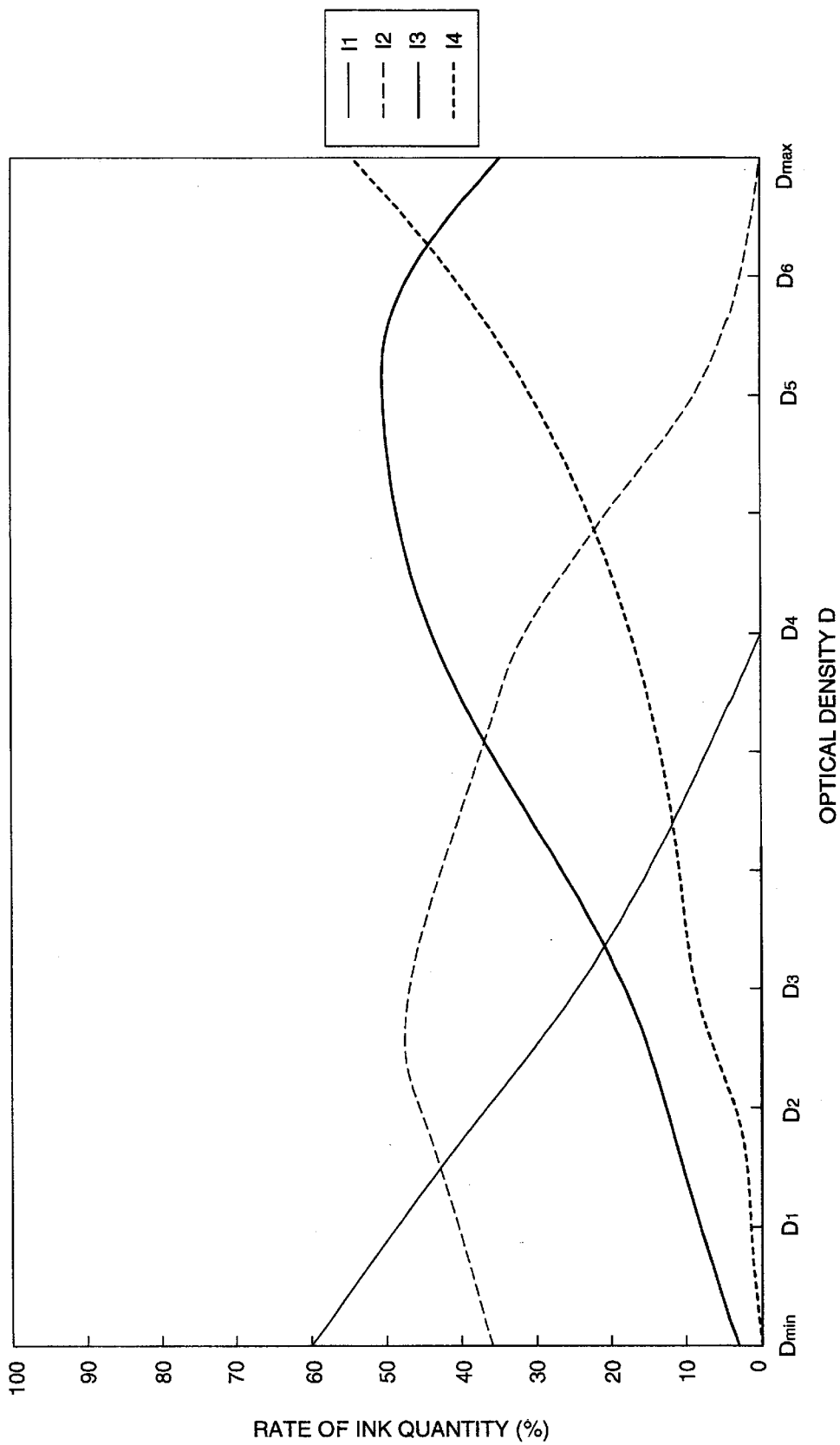
FIG. 41 is a diagram illustrating an example of relationship between a rate of ink quantity and optical density relating to the invention.

Further, 256 density gradations were expressed macroscopically through a dithering method by using super pixels composed of 2×2 minimum recording pixels, and an arrangement was made so that macroscopic optical density D to be recorded may show function $f_1$ (Sd) as shown in FIG. 27, for image signal Sd (density gradation number: 256=8 bit, 0–255) to be inputted in ink jet recording apparatus D3. In this case, Dmin is optical density of a recording medium which is 0.15, while Dmax is 3.15, including $\gamma_1=1.1/85$, $\gamma_2=2.2/85$ and $\gamma_3=1.7/85$. When the following expression holds, $$Dp=0.45\ Dmax+0.55\ Dmin$$

the curve was made to be convex downward in the range of Dmin<D<Dp, the curve was made to be convex upward in the range of Dp<D<Dmax, and a point corresponding to Dp was made to be a point of inflection. A rate of usage of ink in two types $I_1$, $I_2$, $I_3$ and $I_4$ for macroscopic optical density D is shown in FIG. 41, and a rate of usage of ink in four types $I_1$–$I_4$ in optical density $D_1$–$D_6$ is shown in Table 1.

Example 6

The present example is one to which the inventions of Structures 39, 40, 41 and 49 are applied.

Present example, ink $I_4$ having the highest density was not used in a density range of $D_1$<D<$D_2$, but 50% or more of the ink $I_4$ having the highest density was used in a density range of $D_5$<D<$D_6$. A rate of usage of ink in four types $I_1$–$I_4$ in optical density $D_1$–$D_6$ is shown in Table 3.

Example 13

The present example is one to which the invention of Structure 24 is applied.

An image was obtained from image acquiring apparatus B in the same way as that in Comparative Example 1 with the exception that ink jet recording apparatus P2 was connected in place of ink jet recording apparatus P, and the image was recorded by the ink jet recording means P2 after image processing (5) was conducted.

Figure 42:
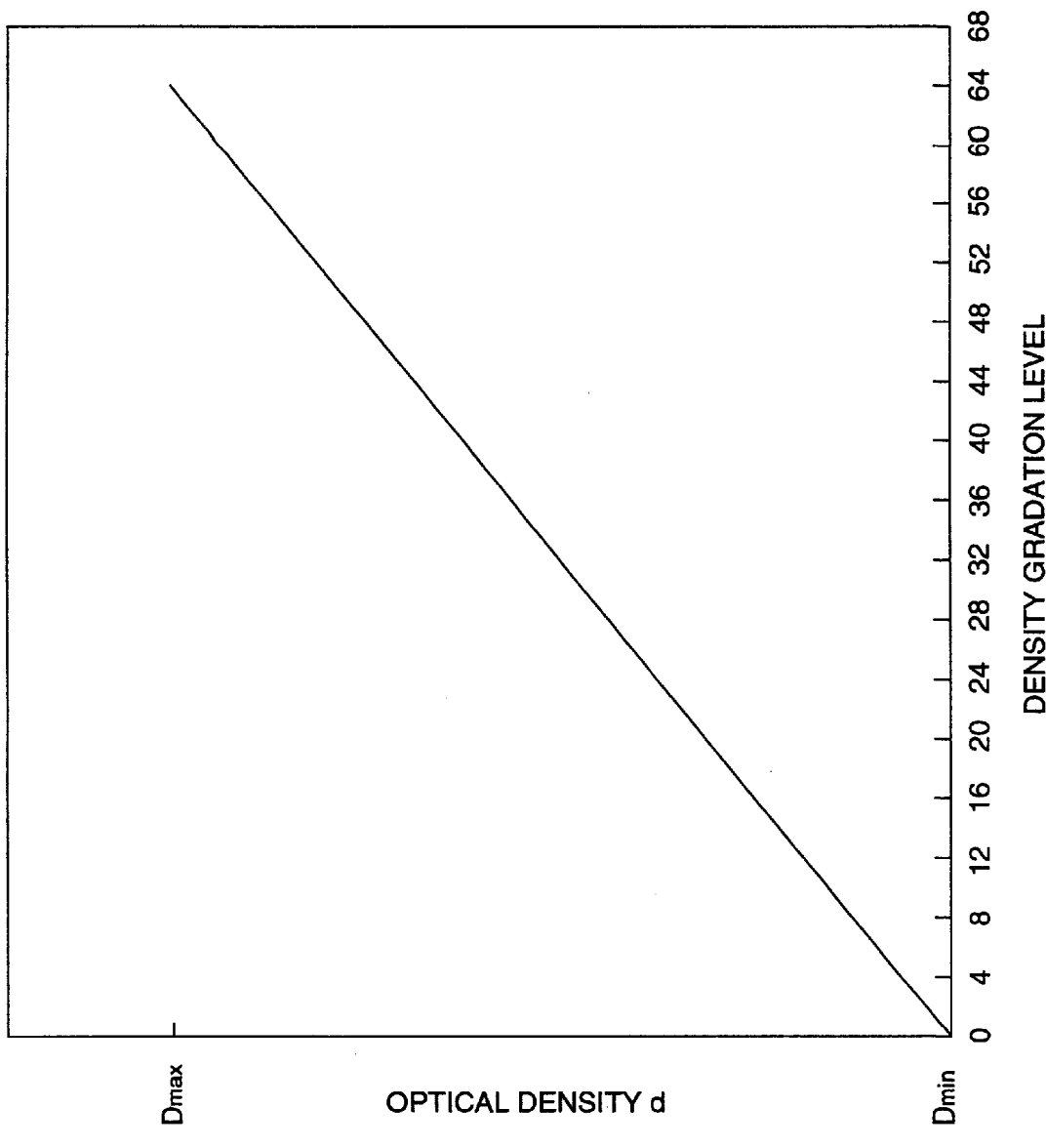
FIG. 42 is a diagram illustrating an example of density gradation characteristics relating to the invention.

In this case, ink jet recording apparatus P2 was structured so that up to two droplets of black ink $I_1$, $I_2$, $I_3$ and $I_4$ in four types (optical density ratio: 1:2:3:4) may be recorded for each minimum recording pixel at the minimum recording density of 480 dpi (minimum recording unit: 53 μm). There are 81 combinations of ink per minimum recording pixel, and from them, there were selected 65 combinations wherein the relationship of the optical density with density gradation level per minimum recording pixel is one shown in FIG. 42.

Further, 256 density gradations were expressed macroscopically through a dithering method by using super pixels composed of 2×2 minimum recording pixels, and an arrangement was made so that macroscopic optical density D to be recorded may show function $f_3$ (Sd) as shown in FIG. 34, for image signal Sd (density gradation number: 256=8 bit, 0–255) to be inputted in ink jet recording apparatus P2. In this case, Dmin is optical density of a recording medium which is 0.15, while Dmax is 3.15, including $\gamma_1=1.0/85$, $\gamma_2=1.0/85$ and $\gamma_3=1.0/85$.

Example 7

The present example is one to which the inventions of Structures 39, 40, 41 and 49 are applied.

Figure 24:
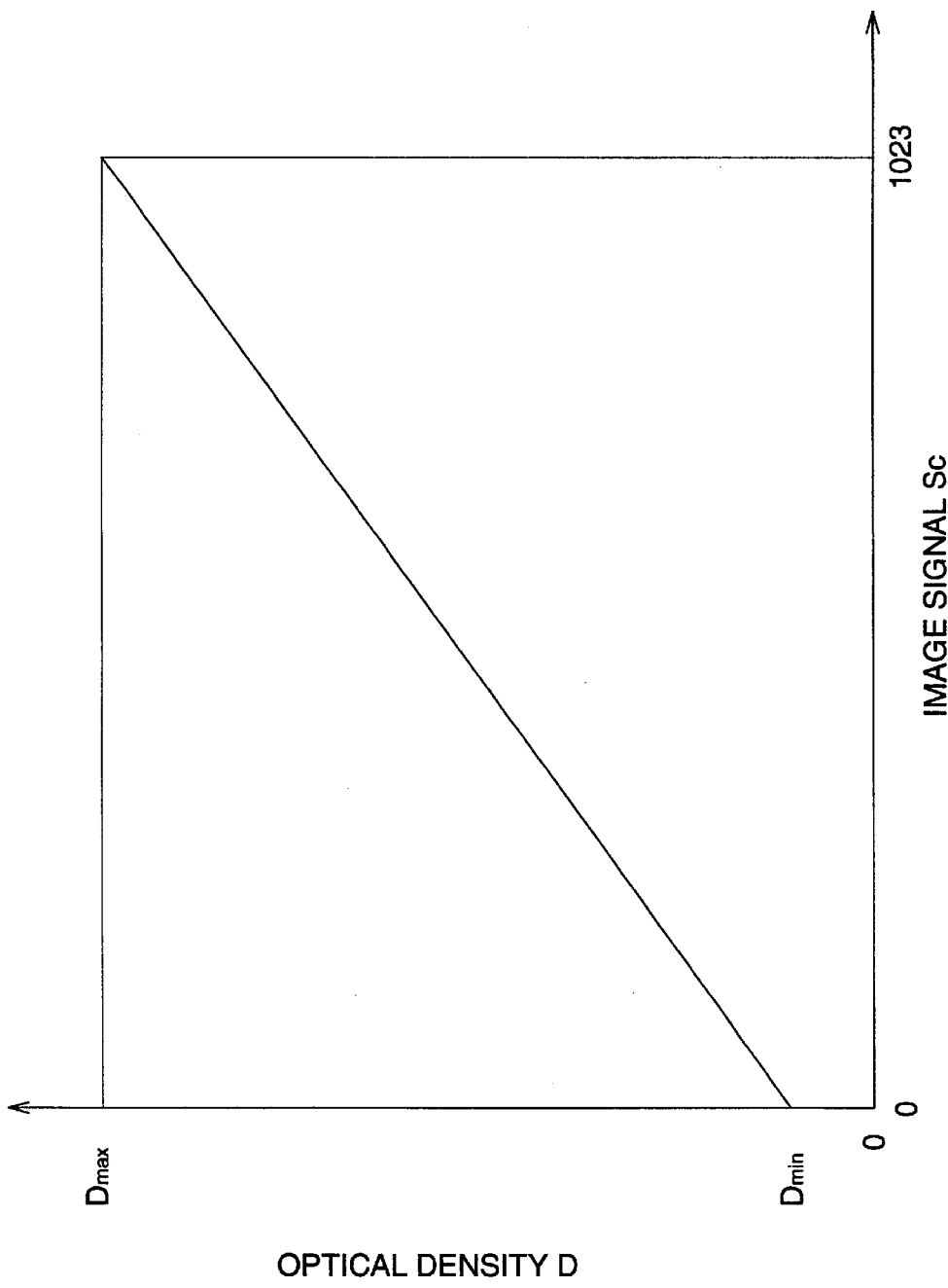
FIG. 24 is a diagram illustrating an example of input and output characteristics of an ink jet printer relating to the invention.

An image was obtained from image acquiring apparatus B in the same way as in Example 1 with the exception that ink jet recording apparatus C1 was connected in place of ink jet recording apparatus C, and the image was recorded by the ink jet recording apparatus C1 after image processing (2). In this case, ink jet recording apparatus C1 was structured so that up to two droplets of black ink $I_1$, $I_2$, $I_3$ and $I_4$ in four types (optical density ratio: 1:2:3:4) may be recorded for each minimum recording pixel at the minimum recording density of 480 dpi (minimum recording unit: 53 μm). There are 81 combinations of ink per minimum recording pixel, and from them, there were selected 33 combinations wherein the relationship of the optical density with density gradation level per minimum recording pixel is a linear form. Further, 129 density gradations per super pixel were expressed through a dithering method by using super pixels composed of 2×2 minimum recording pixels, and 1024 density gradations were further expressed macroscopically through an error diffusion method. Macroscopic optical density D to be recorded for image signals Sc (density gradation number: 1024=10 bit, 0–1023) which are inputted in ink jet recording apparatus C1 was made to be in a linear relationship as shown in FIG. 24 and to satisfy the following expression.

$$D=(D\max-D\min)\times Sc/1023+D\min.$$

In this case, Dmin is optical density of a recording medium which is 0.15, while Dmax is 3.15. A rate of usage of ink in two types $I_1$, $I_2$, $I_3$ and $I_4$ for macroscopic optical density D is shown in FIG. 41, and a rate of usage of ink in four types $I_1$–$I_4$ in optical density $D_1$–$D_6$ is shown in Table 1.

Example 8

The present example is one to which the inventions of Structures 39, 40, 41 and 49 are applied.

An image was obtained from image acquiring apparatus B in the same way as in Example 7 with the exception that ink jet recording apparatus C2 was connected in place of ink jet recording apparatus C1, and the image was recorded by the ink jet recording apparatus C2 after image processing (2). In this case, ink jet recording apparatus C2 was structured so that up to two droplets of black ink $I_1$, $I_2$, $I_3$ and $I_4$ in four types (optical density ratio: 1:2:3:4) may be recorded for each minimum recording pixel at the minimum recording density of 720 dpi (minimum recording unit: 35 μm). There are 81 combinations of ink per minimum recording pixel, and from them, there were selected 65 combinations wherein the relationship of the optical density with density gradation level per minimum recording pixel is a linear relationship.

Further, 1024 density gradations were expressed macroscopically through an error diffusion method. Other points are the same as those in ink jet recording apparatus C1.

Example 9

The present example is one to which the inventions of Structures 39, 40, 41 and 49 are applied.

An image was obtained from image acquiring apparatus B in the same way as in Example 7 with the exception that ink jet recording apparatus C3 was connected in place of ink jet recording apparatus C1, and the image was recorded by the ink jet recording apparatus C3 after image processing (2). In this case, ink jet recording apparatus C1 was structured so that up to two droplets of black ink $I_1$, $I_2$, $I_3$ and $I_4$ in four types (optical density ratio: 1:2:3:4) may be recorded for each minimum recording pixel at the minimum recording density of 720 dpi (minimum recording unit: 35 μm). There are 81 combinations of ink per minimum recording pixel, and from them, there were selected 65 combinations wherein the relationship of the optical density with density gradation level per minimum recording pixel is a linear relationship.

Further, 257 density gradations per super pixel were expressed through a dithering method by using super pixels composed of 2×2 minimum recording pixels, and 1024 density gradations were further expressed macroscopically through an error diffusion method. Other points are the same as those in ink jet recording apparatus C1.

Example 10

The present example is one to which the inventions of Structures 39, 40, 41 and 49 are applied.

An image was obtained from image acquiring apparatus B in the same way as in Example 7 with the exception that ink jet recording apparatus C4 was connected in place of ink jet recording apparatus C1, and the image was recorded by the ink jet recording apparatus C4 after image processing (2). In this case, ink jet recording apparatus C4 was structured so that up to three droplets of black ink $I_1$, $I_2$, $I_3$ and $I_4$ in four types (optical density ratio: 1:2:3:4) may be recorded for each minimum recording pixel at the minimum recording density of 720 dpi (minimum recording unit: 35 μm). There are 256combinations of ink per minimum recording pixel, and from them, there were selected 129 combinations wherein the relationship of the optical density with density gradation level per minimum recording pixel is a linear relationship.

Further, 1024 density gradations were expressed macroscopically through a dithering method by using super pixels composed of 3×3 minimum recording pixels. Other points are the same as those in ink jet recording apparatus C1.

Example 11

The present example is one to which the invention of Structure 24 is applied.

Figure 43:
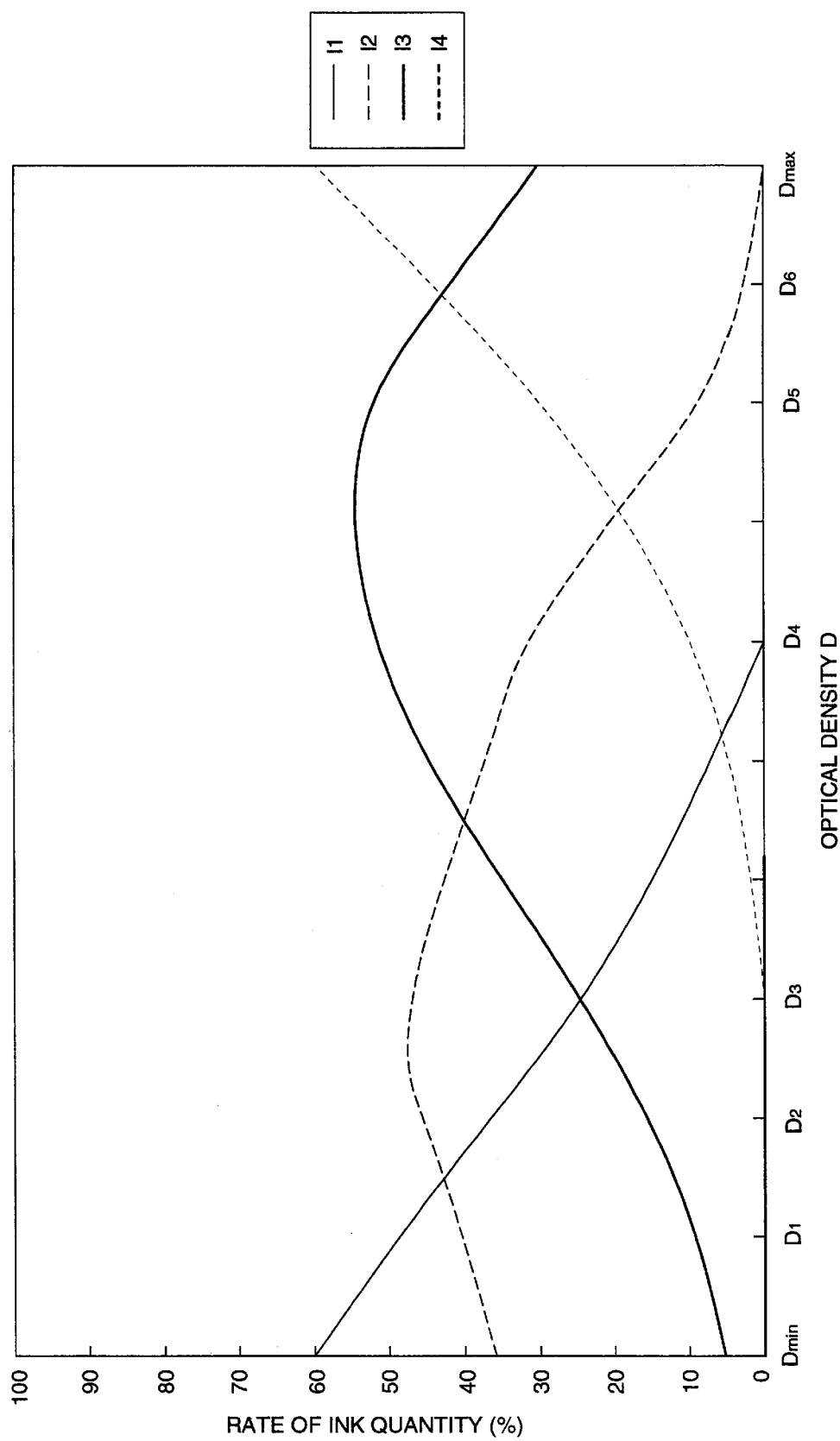
FIG. 43 is a diagram illustrating an example of relationship between a rate of ink quantity and optical density relating to the invention.

Images were recorded in the same way as that in Example 7 with the exception that a rate of usage of ink in four types $I_1$–$I_4$ (optical density is in relationship of $I_1<I_2<I_3<I_4$) is like what is shown in FIG. 43. In the present example, ink $I_4$ having the highest density was not used in a density range of $D_1<D<D_2$. A rate of usage of ink in four types $I_1$–$I_4$ in optical density $D_1$–$D_6$ is shown in Table 2.

Example 12

The present example is one to which the invention of Structure 24 is applied.

Figure 44:
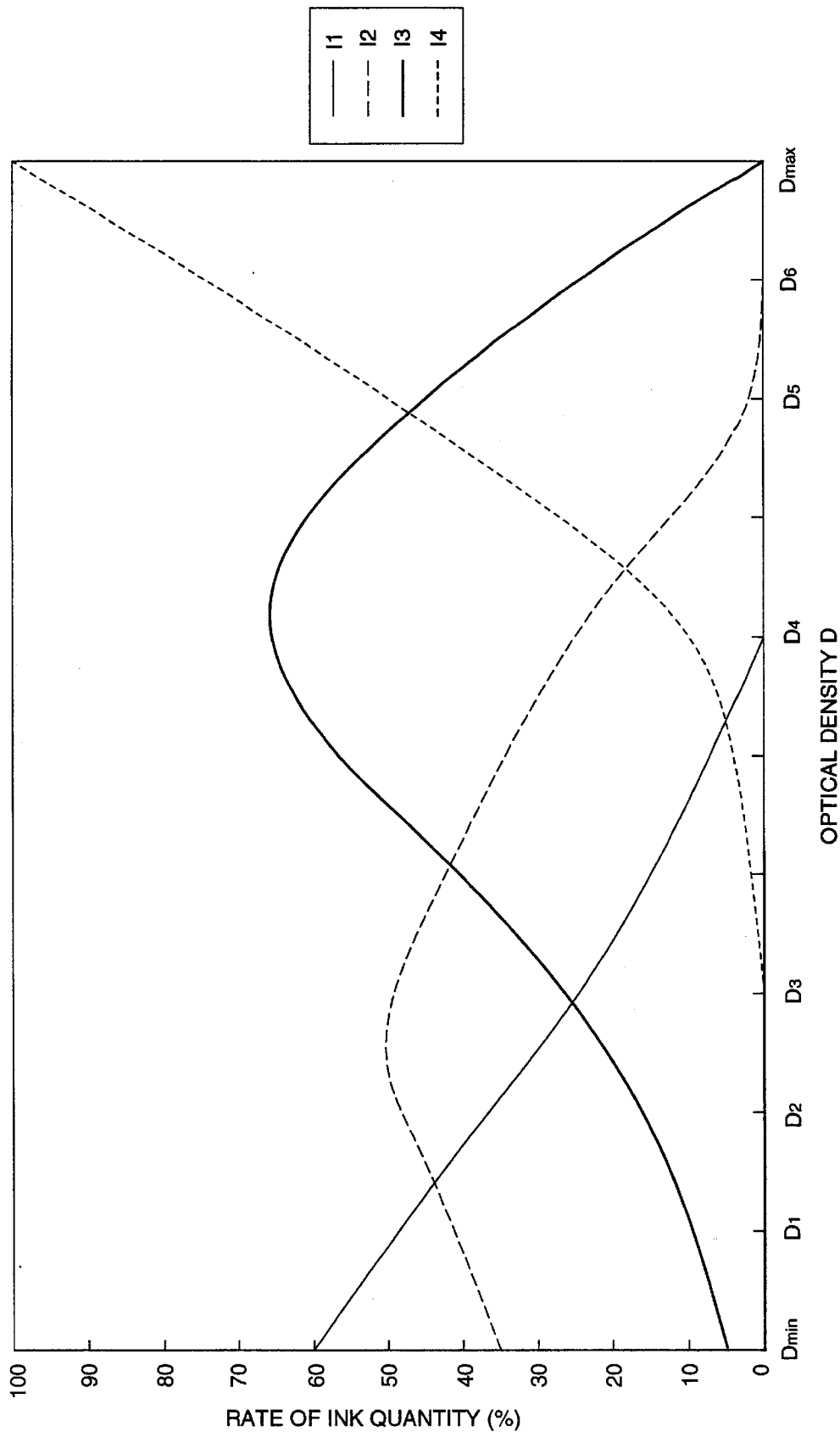
FIG. 44 is a diagram illustrating an example of relationship between a rate of ink quantity and optical density relating to the invention.

Images were recorded in the same way as that in Example 7 with the exception that a rate of usage of ink in four types $I_1$–$I_4$ (optical density is in relationship of $I_1<I_2<I_3<I_4$) is like what is shown in FIG. 44. In the present example, ink $I_4$ having the highest density was not used in a density range of $D_1<D<D_2$, but 50% or more of the ink $I_4$ having the highest density was used in a density range of $D_5<D<D_6$. A rate of usage of ink in four types $I_1$–$I_4$ in optical density $D_1$–$D_6$ is shown in Table 3.

Example 13

The present example is one to which the invention of Structure 24 is applied.

Figure 45:
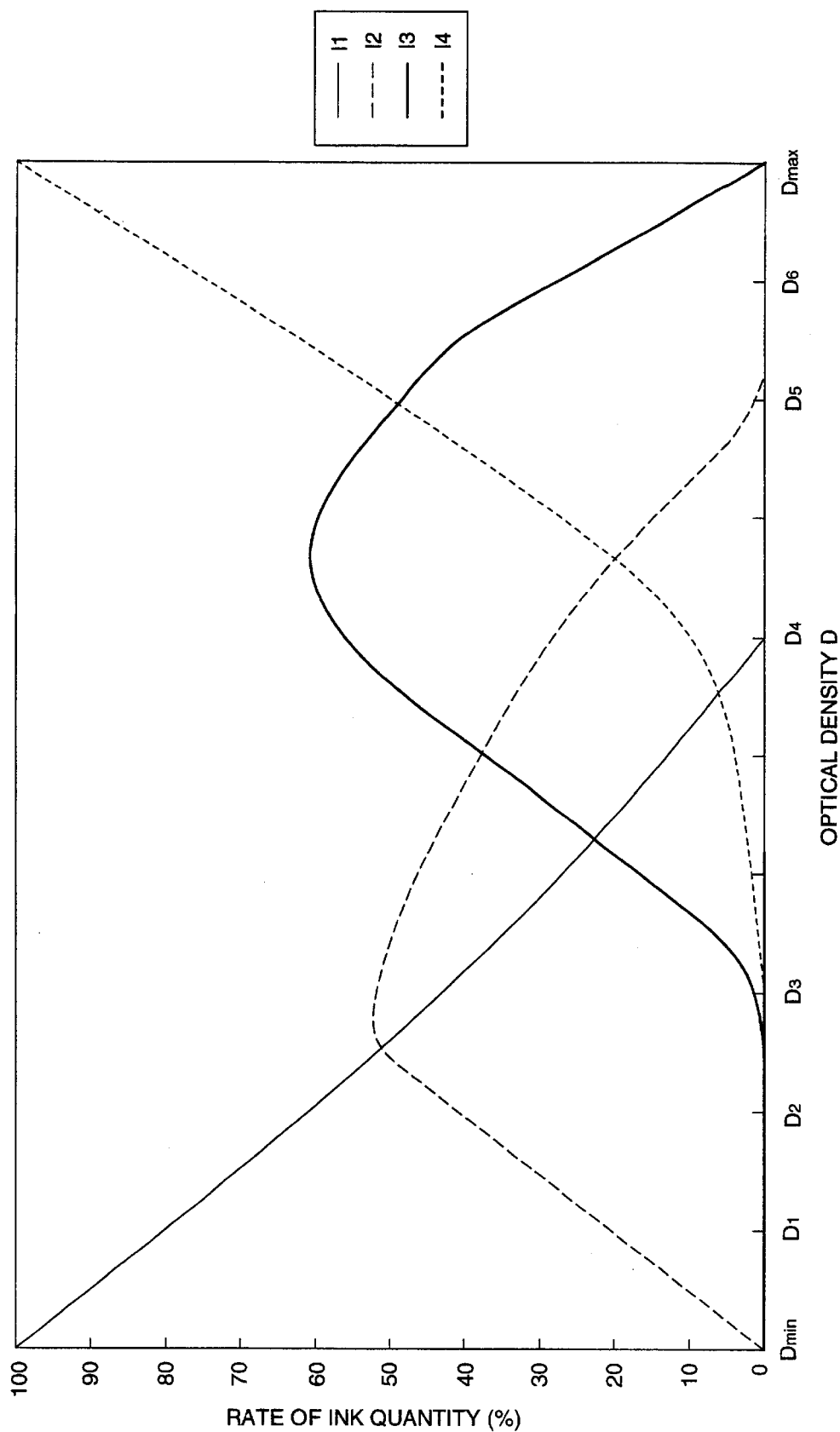
FIG. 45 is a diagram illustrating an example of relationship between a rate of ink quantity and optical density relating to the invention.

Images were recorded in the same way as that in Example 7 with the exception that a rate of usage of ink in four types $I_1$–$I_4$ (optical density is in relationship of $I_1<I_2<I_3<I_4$) is like what is shown in FIG. 45. In the present example, ink $I_4$ having the highest density was not used in a density range of $D_1<D<D_2$, but 50% or more of ink $I_1$ having the lowest density was used in that density range. Further, in density area of $D_5<D<D_6$, 50% or more of ink $I_4$ having the highest density was used. A rate of usage of ink in four types $I_1$–$I_4$ in optical density $D_1$–$D_6$ is shown in Table 4.

Example 14

The present example is one to which the inventions of Structures 1, 18, 39, 40, 41, 49 and 60 are applied.

Images were obtained from image acquiring apparatus B in the same method as in Example 8 with the exception that ink jet recording apparatus E was connected in place of ink jet recording apparatus C2, and the images were recorded by the ink jet recording apparatus E.

Figure 46:
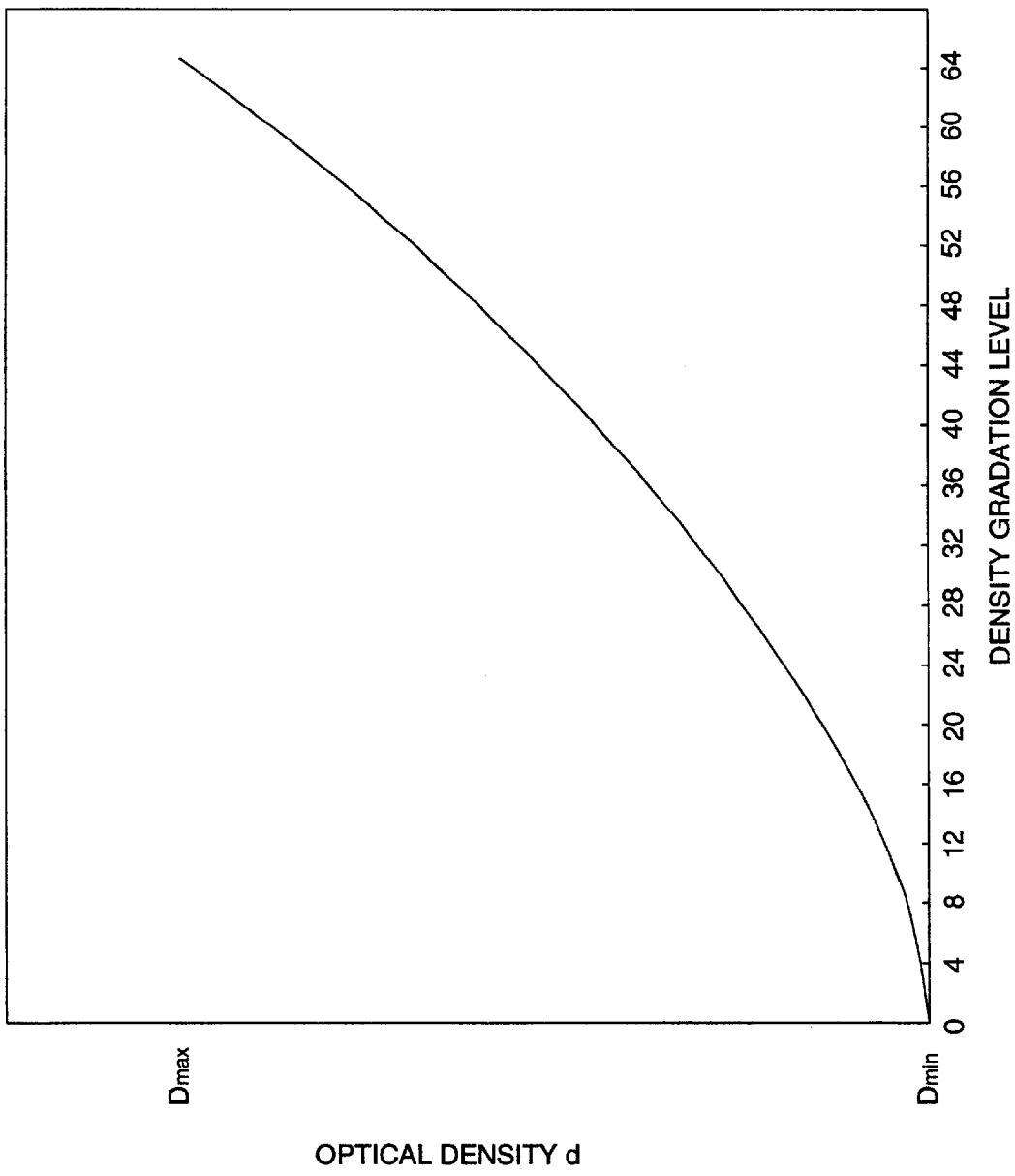
FIG. 46 is a diagram illustrating an example of density gradation characteristics relating to the invention.
Figure 47:
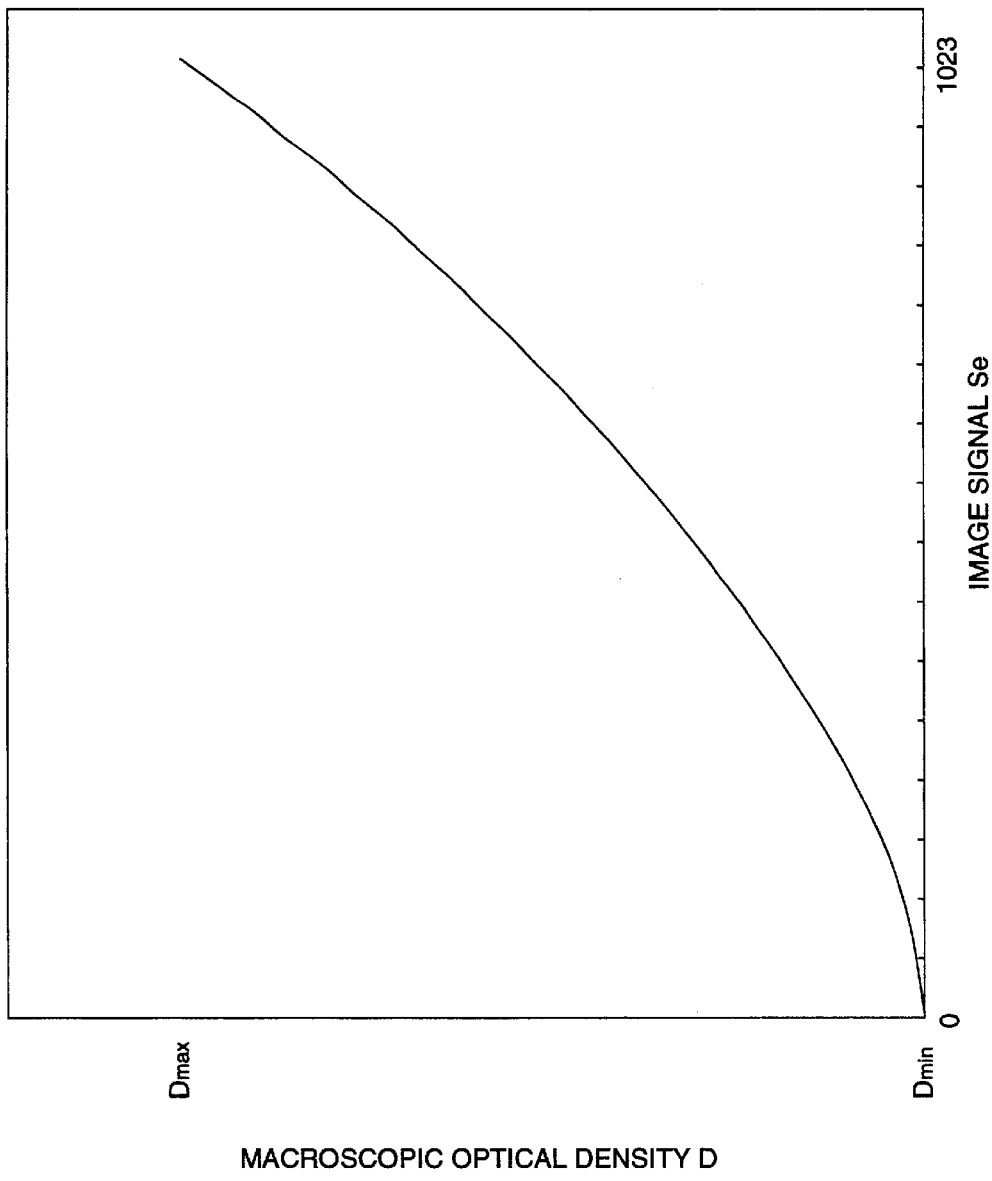
FIG. 47 is a diagram illustrating an example of a characteristic curve relating to the invention.

Ink jet recording apparatus E was structured so that up to two droplets of black ink $I_1$, $I_2$, $I_3$ and $I_4$ in four types (optical density ratio: 1:2:3:4) may be recorded for each minimum recording pixel at the minimum recording density of 720 dpi (minimum recording unit: 35 μm). There are 81 combinations of ink per minimum recording pixel, and from them, there were selected 65 combinations wherein the relationship of the optical density with density gradation level per minimum recording pixel was relationship shown in FIG. 46. Further, 1024 density gradations were expressed macroscopically at input/output characteristics shown in FIG. 47 through an error diffusion method. Other points are the same as those in ink jet recording apparatus C1.

Image processing (6) is as follows.

Image Processing (6) (Image Acquiring Apparatus B, Ink Jet Recording Apparatus E)

The following conversion is conducted.

$$Se'=f_2(Sb)$$

$$Se=f_4(Se')$$

Figure 48:
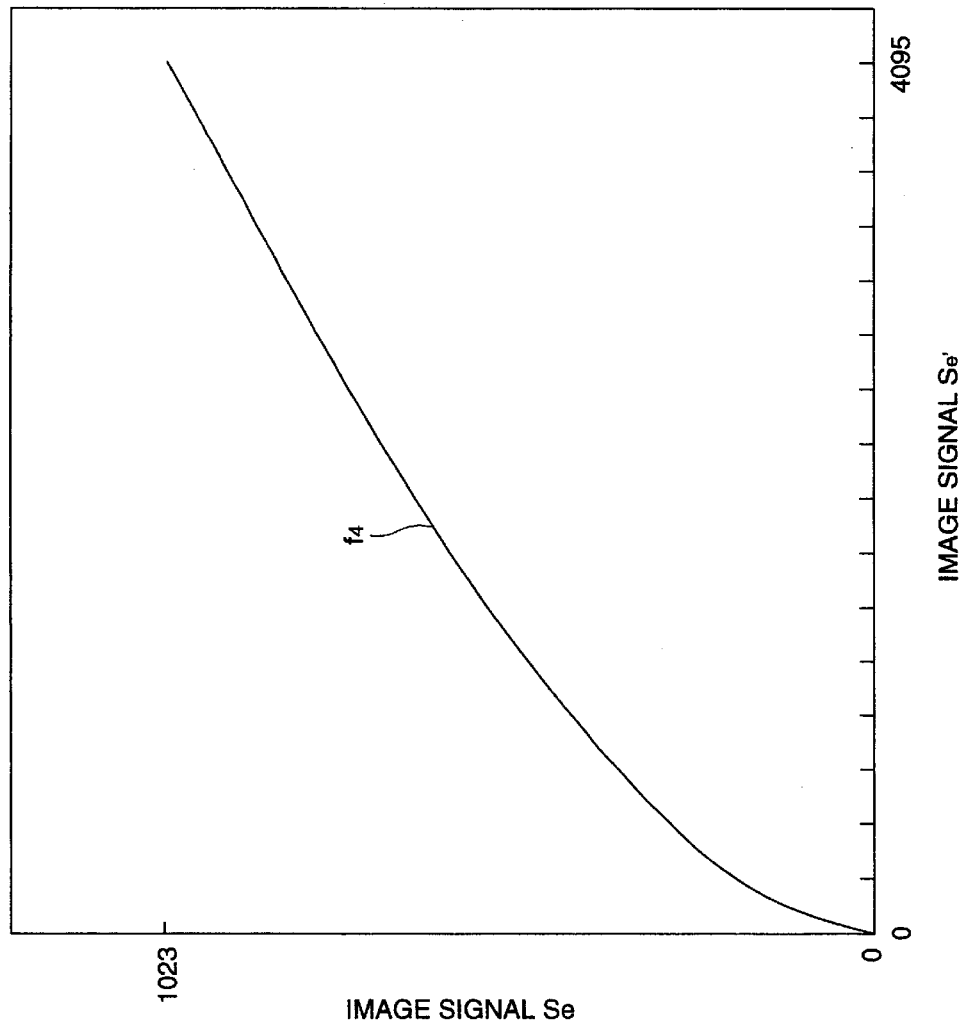
FIG. 48 is a diagram illustrating an example of image processing relating to the invention.
Figure 49:
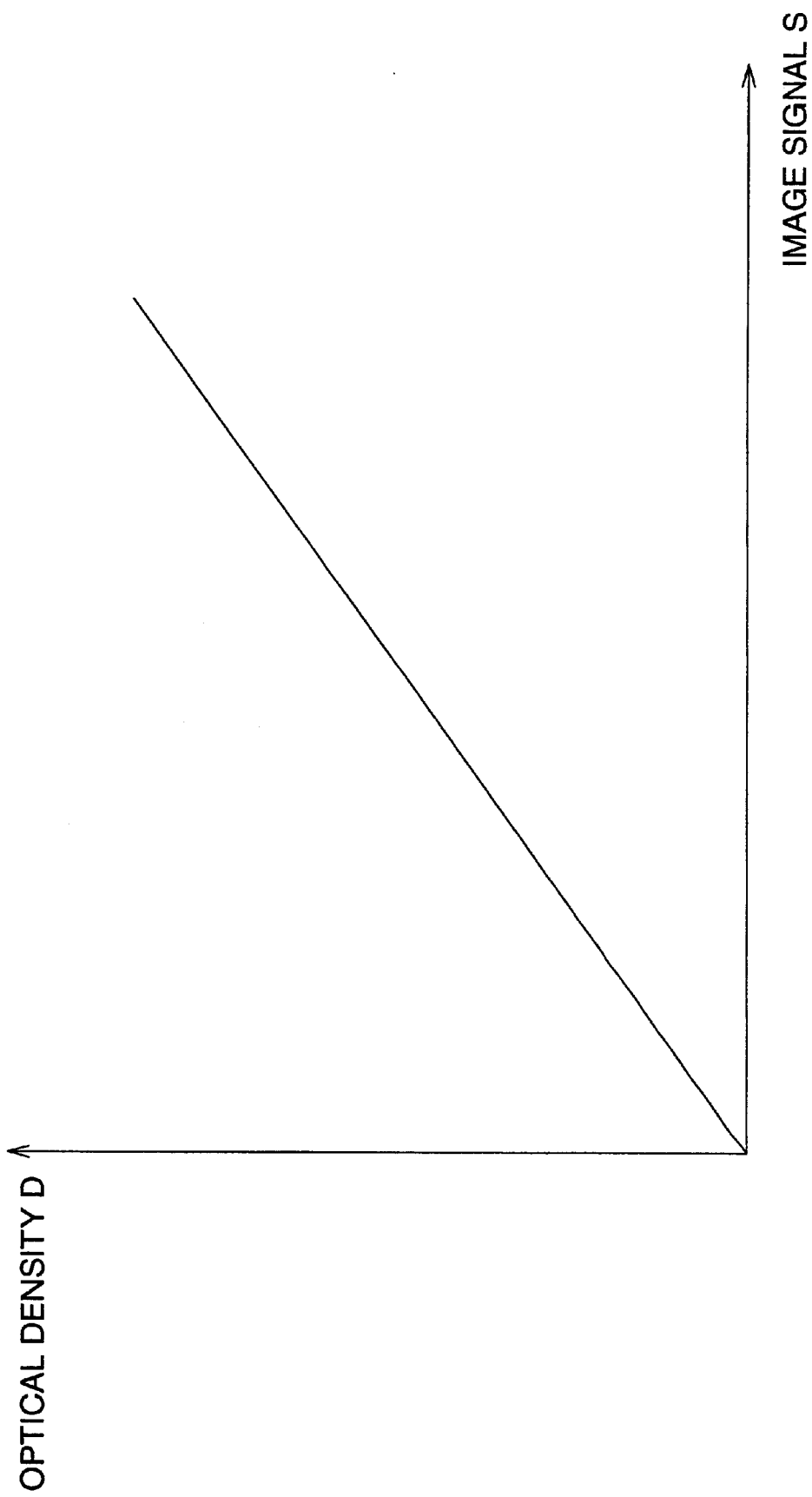
FIG. 49 is a diagram illustrating output characteristics of a conventional ink jet printer.
Figure 50:
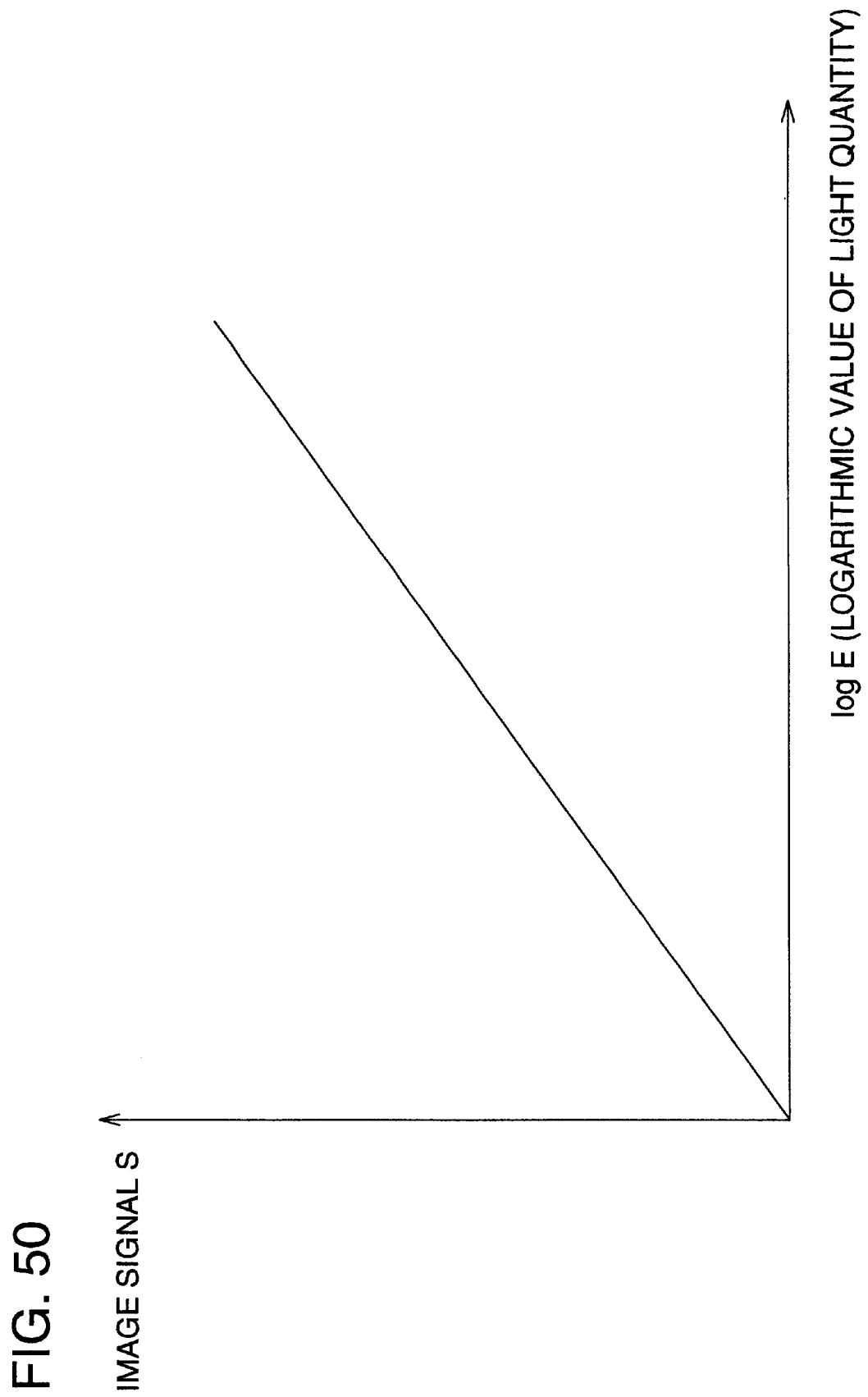
FIG. 50 is a diagram illustrating input characteristics of a conventional acquiring apparatus.
Figure 51:
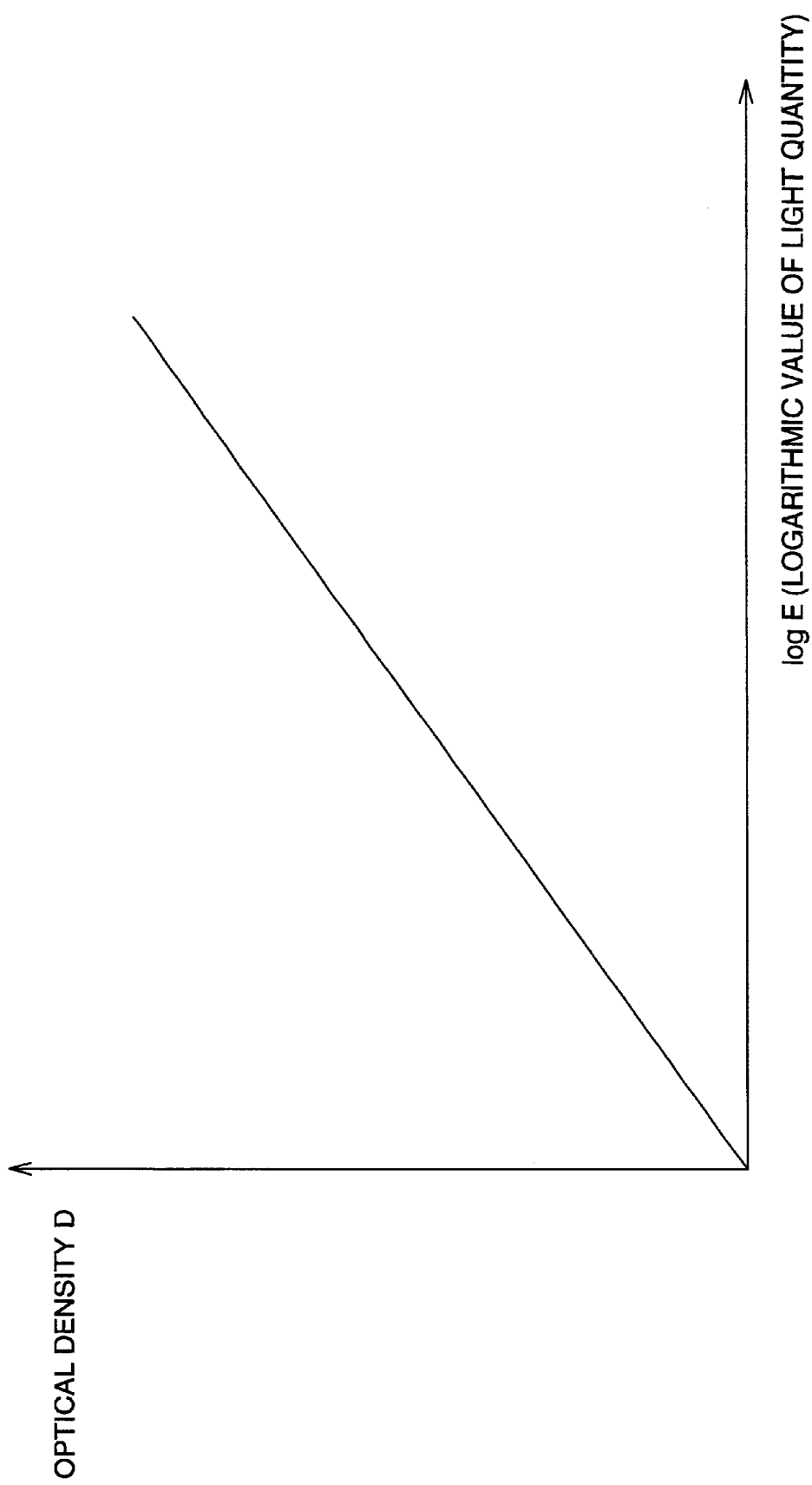
FIG. 51 is a diagram illustrating a characteristic curve relating to a prior art.

In the aforesaid expression, $f_2$ is a function shown in FIG. 29. As shown in FIG. 48, $f_4$ is an inverse function having characteristics shown in FIG. 47, and it simultaneously conducts conversion from 12 bit to 10 bit. Due to this, macroscopic optical density D recorded for Se' turns out to be linear.

Even in Example 13, it was possible to make an image hard copy wherein-function F (log E) for X-ray energy E transmitted through an object with macroscopic optical density D of recorded image turns into a monotone increase function shown in FIG. 31.

Further, the number of recording density gradations for the density range of $D_1 \leq D \leq D_2$ turned out to be 122, while, the number of density gradations for the density range of $D_3 \leq D \leq D_4$ turned out to be 115.

Images obtained from Examples 1–14 and Comparative Examples were compared.

In each example, hard copies for chest images of 10 subjects were prepared, and 10 appraisers evaluated, under visual check, suitability for smoothness of density change under a diaphragm and contrast, graininess and sharpness on a lung region, on each hard copy. Evaluation values in each example are shown in Table 5. The evaluation value is the sum total of the number of items evaluated as "suitable", and the evaluation number of 100 represents an occasion wherein all of 10 appraisers evaluated as "suitable" for all of 10 hard copies.

In Comparative Example 1, evaluation values for the contrast on the lung region were low, although smoothness of density change for the region under the diaphragm was evaluated to be excellent. In Comparative Example 2, evaluation values for smoothness of density change for the region under the diaphragm were low although contrast on the lung region was evaluated to be excellent. Contrary to this, in Examples 1 and 2, contrast on the lung region was evaluated to be excellent and smoothness of density change under the diaphragm was also evaluated to be excellent, because the number of recording density gradations in the density range of $D_1 \leq D \leq D_2$ was sufficient. In particular, its effect is great when ink jet recording apparatus C was used.

In Examples 3–5, and Examples 7–10, graininess was sharply improved when the number of density gradations per minimum recording unit was increased by increasing the number of optical density of ink, which was different from Examples 1 and 2. In addition, when the minimum recording density is enhanced, sharpness is improved and graininess is also improved slightly.

In Example 6, graininess and sharpness were improved when the number of density gradations per minimum recording density was increased by increasing the optical density number of ink and when the minimum recording density was raised, which was different from Example 1.

In Examples 11–13, graininess was further improved when a rate of usage of ink was devised, which was different from Example 7.

In Example 14, smoothness of recording density change was further improved when the number of density gradations in a density range of $D_1 \leq D \leq D_2$ was further increased, which was different from Example 8.

Even in the case of examples wherein inventions of Structures 2–20 are applied, effects are exhibited as is apparent from Examples 11–13. Even in the case of the example wherein the invention of Structures 27 is applied, effects are exhibited as is apparent from Examples 11–13.

Owing to the inventions described in Structures 24 and 27, it is possible to obtain images with high image quality which are excellent in contrast and have smooth density change, when reproducing images by using an ink jet printer based on energy of inputted electromagnetic wave.

Owing to the inventions described in Structures 24 and 27, it is possible to obtain images with high image quality which are excellent in graininess and sharpness, by using ink in plural types each having different density effectively based on energy of inputted electromagnetic wave when using an ink jet printer.

The inventions described in Structures 39, 40, 41 and 49 make it possible to obtain images with high image quality which are excellent in graininess and sharpness, in ink jet recording. In the invention described in Structure 60, it is possible to make temperature change between density gradations to be smooth while keeping the high recording density gradation number, and to reproduce images with high image quality wherein density change is smooth.

What is claimed is:

1. An ink-jet recording apparatus, comprising:
   an acquiring device to input an image signal obtained by converting energy of electromagnetic waves transmitting through a subject or energy of electromagnetic waves reflected from a subject for each predetermined region;

an ink head to jet ink stored therein; and a controller to control the ink head so as to jet ink based on the image signal acquired by the acquiring device onto a recording medium on which an image is recorded, wherein when an intensity of the energy of electromagnetic waves of a predetermined region is E and an optical density of the image recorded on the recording medium based on the image signal is D, the controller conducts the image recording such that a characteristic curve representing a change of the optical density D for a logarithm of the energy intensity E becomes a monotone increasing function or a monotone decreasing function, wherein, energy intensities $E_1$ to $E_6$ are selected to be $E_1<E_2<E_3<E_4<E_5<E_6$ and each energy intensity $E_i$ is defined to be an energy intensity corresponding to an optical density $D_i$ represented the following formula, $$D_i=k_i \cdot D_{max}+(1-k_i)\cdot D_{min},$$

where i is an integer of 1 to 6, when the characteristic curve is the monotone increasing function, $k_1=0.1, k_2=0.2, k_3=0.3, k_4=0.6, k_5=0.8,$ and $k_6=0.9$, and when the characteristic curve is the monotone decreasing function, $k_1=0.9, k_2=0.8, k_3=0.6, k_4=0.3, k_5=0.2,$ and $k_6=0.1$, wherein when $\gamma_1, \gamma_2$ and $\gamma_3$ are defined on the characteristic curve such that an inclination of a line connecting points corresponding to $E_1$ and $E_2$ is $\gamma_1$, an inclination of a line connecting points corresponding to $E_3$ and $E_4$ is $\gamma_2$, and an inclination of a line connecting points corresponding to $E_5$ and $E_6$ is $\gamma_3$, the characteristic curve is determined so as to satisfy the following formulas:

$$|\gamma_1|<|\gamma_2| \text{ and } |\gamma_3|<|\gamma_2|, \text{ and}$$

wherein the image recording for the energy intensity E between $E_1$ and $E_2$ is conducted based on $\gamma_1$, the image recording for the energy intensity E between $E_3$ and $E_4$ is conducted based on $\gamma_2$, and the image recording for the energy intensity E between $E_5$ and $E_6$ is conducted based on $\gamma_3$.

2. The ink-jet recording apparatus of claim 1, wherein the controller conducts the image recording such that the characteristic curve representing the change of the optical density D for the logarithm of the energy intensity E becomes the simple increasing function.

3. The ink-jet recording apparatus of claim 1, wherein the controller conducts the image recording such that the characteristic curve representing the change of the optical density D for the logarithm of the energy intensity E becomes the simple decreasing function.

4. The ink-jet recording apparatus of claim 1, wherein the characteristic curve representing a change of the optical density D for a logarithm of the energy intensity E is the monotone decreasing function, the controller comprises a converter to convert an image signal S into an image signal S' and the converter makes a converting curve representing a change of the after-conversion image signal S' for the image signal S to be a monotone increasing function, wherein image signals $S_1$ to $S_6$ are selected to be $S_1<S_2<S_3<S_4<S_5<S_6$, and when $\alpha_1, \alpha_2$ and $\alpha_3$ are defined on the characteristic curve such that an inclination of a line connecting points corresponding to $S_1$ and $S_2$ is $\alpha_1$, an inclination of a line connecting points corresponding to $S_3$ and $S_4$ is $\alpha_2$, and an inclination of a line connecting points corresponding to $S_5$ and $S_6$ is $\alpha_3$, the characteristic curve is determined so as to satisfy the following formulas:

$$|\alpha_1|<|\alpha_2| \text{ and } |\alpha_3|<|\alpha_2|, \text{ and}$$

wherein the image conversion for the image signal S between $S_1$ and $S_2$ is conducted based on $\alpha_1$, the image conversion for the image signal S between $S_3$ and $S_4$ is conducted based on $\alpha_2$, and the image conversion for the image signal S between $S_5$ and $S_6$ is conducted based on $\alpha_3$.

5. The ink-jet recording apparatus of claim 1, wherein the characteristic curve representing a change of the optical density D for a logarithm of the energy intensity E is the monotone decreasing function, the controller comprises a converter to convert an image signal S into an image signal S' and the converter makes a converting curve representing a change of the after-conversion image signal S' for the image signal S to be a monotone decreasing function, and wherein image signals $S_1$ to $S_6$ are selected to be $S_1<S_2<S_3<S_4<S_5<S_6$, and when $\alpha_1, \alpha_2$ and $\alpha_3$ are defined on the characteristic curve such that an inclination of a line connecting points corresponding to $S_1$ and $S_2$ is $\alpha_1$, an inclination of a line connecting points corresponding to $S_3$ and $S_4$ is $\alpha_2$, and an inclination of a line connecting points corresponding to $S_5$ and $S_6$ is $\alpha_3$, the characteristic curve is determined so as to satisfy the following formulas:

$$|\alpha_1|<|\alpha_2| \text{ and } |\alpha_3|<|\alpha_2|, \text{ and}$$

wherein the image conversion for the image signal S between $S_1$ and $S_2$ is conducted based on $\alpha_1$, the image conversion for the image signal S between $S_3$ and $S_4$ is conducted based on $\alpha_2$, and the image conversion for the image signal S between $S_5$ and $S_6$ is conducted based on $\alpha_3$.

6. The ink-jet recording apparatus of claim 2, wherein the image recording is conducted with the number of density gradation steps of 16 or more in a range of $D_1 \leq D \leq D_2$.

7. The ink-jet recording apparatus of claim 2, wherein the image recording is conducted with the number of density gradation steps of 32 or more in a range of $D_3 \leq D \leq D_4$.

8. The ink-jet recording apparatus of claim 1, wherein the characteristic curve comprises a portion convex downward.

9. The ink-jet recording apparatus of claim 1, wherein the characteristic curve comprises a portion convex upward.

10. The ink-jet recording apparatus of claim 1, wherein the characteristic curve comprises a portion convex upward and another portion convex downward.

11. The ink-jet recording apparatus of claim 1, wherein the characteristic curve comprises a point of inflection.

12. The ink-jet recording apparatus of claim 1, wherein the electromagnetic waves are X-rays transmitting through the subject.

13. The ink-jet recording apparatus of claim 12, wherein the image signals have a linear relationship with the intensity of the energy of X-rays.

14. The ink-jet recording apparatus of claim 12, wherein the image signals have a linear relationship with the logarithm of the intensity of the energy of X-rays.

15. The ink-jet recording apparatus of claim 1, wherein the range of $D_3<D<D_4$ is a range within which an image of the subject exists.

16. The ink-jet recording apparatus of claim 1, wherein the range of $D_5<D<D_6$ is a range within which an image of the subject does not exist.

17. The ink-jet recording apparatus of claim 3, wherein the image recording is conducted with the number of density gradation steps of 16 or more in a range of $D_1 \leq D \leq D_2$.

18. The ink-jet recording apparatus of claim 3, wherein the image recording is conducted with the number of density gradation steps of 32 or more in a range of $D_3 \leq D \leq D_4$.

19. The ink-jet recording apparatus of claim 2, wherein the characteristic curve representing a change of the optical density D for a logarithm of the energy intensity E is the monotone increasing function, and when the energy intensity E is within a range of $E_1<E<E_2$, the image recording is conducted with ink other than ink having a maximum density.

20. The ink-jet recording apparatus of claim 19, wherein when the energy intensity E is within a range of $E_5<E<E_6$, the image recording is conducted by using ink having a maximum density with an amount of 50% or more of the total amount of ink used for the image recording.

21. The ink-jet recording apparatus of claim 19, wherein when the energy intensity E is within a range of $E_1<E<E_2$, the image recording is conducted by using ink having a minimum density with an amount of 50% or more of the total amount of ink used for the image recording.

22. The ink-jet recording apparatus of claim 3, wherein the characteristic curve representing a change of the optical density D for a logarithm of the energy intensity E is the monotone decreasing function, and when the energy intensity E is within a range of $E_5<E<E_6$, the image recording is conducted with ink other than ink having a maximum density.

23. The ink-jet recording apparatus of claim 22, wherein when the energy intensity E is within a range of $E_1<E<E_2$, the image recording is conducted by using ink having a maximum density with an amount of 50% or more of the total amount of ink used for the image recording.

24. The ink-jet recording apparatus of claim 22, wherein when the energy intensity E is within a range of $E_5<E<E_6$, the image recording is conducted by using ink having a minimum density with an amount of 50% or more of the total amount of ink used for the image recording.

25. An ink-jet recording method, comprising:

forming an image by jetting ink onto a recording medium based on image signals obtained by converting by converting energy of electromagnetic waves transmitting through a subject or energy of electromagnetic waves reflected from a subject for each predetermined region;

wherein when an intensity of the energy of electromagnetic waves of a predetermined region is E and an optical density of the image recorded on the recording medium based on the image signal is D, the image recording is conducted such that a characteristic curve representing a change of the optical density D for a logarithm of the energy intensity E becomes a monotone increasing function or a monotone decreasing function, wherein, energy intensities $E_1$ to $E_6$ are selected to be $E_1<E_2<E_3<E_4<E_5<E_6$ and each energy intensity $E_i$ is defined to be an energy intensity corresponding to an optical density $D_i$ represented the following formula, $$D_i = k_i \cdot D_{max} + (1-k_i) \cdot D_{min},$$

where i is an integer of 1 to 6, when the characteristic curve is the monotone increasing function, $k_1=0.1$, $k_2=0.2$, $k_3=0.3$, $k_4=0.6$, $k_5=0.8$, and $k_6=0.9$, and when the characteristic curve is the monotone decreasing function, $k_1=0.9$, $k_2=0.8$, $k_3=0.6$, $k_4=0.3$, $k_5=0.2$, and $k_6=0.1$, wherein when $\gamma_1$, $\gamma_2$ and $\gamma_3$ are defined on the characteristic curve such that an inclination of a line connecting points corresponding to $E_1$ and $E_2$ is $\gamma_1$, an inclination of a line connecting points corresponding to $E_3$ and $E_4$ is $\gamma_2$, and an inclination of a line connecting points corresponding to $E_5$ and $E_6$ is $\gamma_3$, the characteristic curve is determined so as to satisfy the following formulas:

$$|\gamma_1|<|\gamma_2| \text{ and } |\gamma_3|<|\gamma_2|, \text{ and}$$

wherein the image recording for the energy intensity E between $E_1$ and $E_2$ is conducted based on $\gamma_1$, the image recording for the energy intensity E between $E_3$ and $E_4$ is conducted based on $\gamma_2$, and the image recording for the energy intensity E between $E_5$ and $E_6$ is conducted based on $\gamma_3$.

26. The ink-jet recording method of claim 25, wherein the characteristic curve representing a change of the optical density D for a logarithm of the energy intensity E is the monotone increasing function, and when the energy intensity E is within a range of $E_1<E<E_2$, the image recording is conducted with ink other than ink having a maximum density.

27. The ink-jet recording method of claim 25, wherein the characteristic curve representing a change of the optical density D for a logarithm of the energy intensity E is the monotone increasing function, and when the energy intensity E is within a range of $E_5<E<E_6$, the image recording is conducted with ink other than ink having a maximum density.

* * * * *